(12) United States Patent
Bellinger

(10) Patent No.: US 6,957,139 B2
(45) Date of Patent: Oct. 18, 2005

(54) SYSTEM FOR CONTROLLING DRIVETRAIN COMPONENTS TO ACHIEVE FUEL EFFICIENCY GOALS

(75) Inventor: Steven M. Bellinger, Columbus, IN (US)

(73) Assignee: Cummins, Inc., Columbus, IN (US)

( * ) Notice: Subject to any disclaimer, the term of this patent is extended or adjusted under 35 U.S.C. 154(b) by 154 days.

(21) Appl. No.: 10/364,263

(22) Filed: Feb. 11, 2003

(65) Prior Publication Data

US 2004/0002806 A1 Jan. 1, 2004

Related U.S. Application Data

(60) Division of application No. 10/080,049, filed on Feb. 21, 2002, now Pat. No. 6,546,329, which is a division of application No. 09/616,752, filed on Jul. 14, 2000, now Pat. No. 6,436,005, which is a continuation-in-part of application No. 09/502,641, filed on Feb. 11, 2000, now Pat. No. 6,387,011, which is a continuation-in-part of application No. 09/099,545, filed on Jun. 18, 1998, now Pat. No. 6,042,505.

(51) Int. Cl.$^7$ ............................................. B60T 7/12
(52) U.S. Cl. ................... 701/104; 701/101; 701/103; 701/109; 477/111
(58) Field of Search ................. 701/101, 102, 701/103, 104, 109; 477/111, 109

(56) References Cited

U.S. PATENT DOCUMENTS

| | | | |
|---|---|---|---|
| 4,217,867 A | 8/1980 | Madsen et al. | 123/352 |
| 4,252,096 A | 2/1981 | Kennedy | 123/370 |
| 4,353,272 A | 10/1982 | Schneider et al. | 477/43 |
| 4,403,584 A | 9/1983 | Suzuki et al. | 123/406.23 |
| 4,656,587 A | 4/1987 | Osanai et al. | 701/60 |
| 4,674,459 A | 6/1987 | Blocher et al. | 123/436 |
| 4,731,727 A | 3/1988 | Rauch et al. | 701/123 |
| 4,805,579 A | 2/1989 | Toshimitsu et al. | 123/492 |

(Continued)

FOREIGN PATENT DOCUMENTS

| | | |
|---|---|---|
| AU | 4712589 A | 6/1990 |
| DE | 2811 574 A1 | 9/1979 |
| DE | 31 28 080 | 7/1981 |
| DE | 197 01 320 | 1/1997 |
| GB | 2 084 524 | 9/1980 |
| JP | 58 038354 A | 3/1983 |
| JP | 59 180046 A | 10/1984 |
| JP | 60 143132 A | 7/1985 |
| JP | 05 312255 A | 11/1993 |
| WO | WO 85/01256 A1 | 3/1985 |
| WO | WO 89/01421 | 8/1988 |

OTHER PUBLICATIONS

EPO Search Report Under Section 17 dated Apr. 2, 2002 (2 sheets).

Caterpillar, "Lower Gears Engine RPM Limit," Programming Cat Electronic Truck Engines, pp. 51–55(Aug. 3, 1996).

Detroit Diesel Corporation, "Progressive Shift," DDEC III Application and Installation, pp. 19–1–19–3 (Mar. 3, 1995).

Society of Automotive Engineers, SAE J1939/71, p. 22 (Aug. 1997).

*Primary Examiner*—Tony M. Argenbright
*Assistant Examiner*—Johnny H. Hoang
(74) *Attorney, Agent, or Firm*—Barnes & Thornburg

(57) ABSTRACT

A system for controlling a vehicle drivetrain in a fuel-efficient manner includes a control computer operable to define a contour from substantially zero engine load to substantially full engine load, wherein the contour may correspond to a fuel-efficient path from no-load to full-load engine operating conditions. With change gear transmissions, the control computer is operable to control transmission shift points about the contour. With continuous variable transmissions the control computer is operable to modify the effective gear ratio thereof to maintain engine operation on or about the contour. In either case, fuel efficient operation may be optimized.

25 Claims, 49 Drawing Sheets

U.S. PATENT DOCUMENTS

| | | | |
|---|---|---|---|
| 4,905,544 A | 3/1990 | Ganoung | 74/858 |
| 4,914,597 A | 4/1990 | Moncelle et al. | 701/95 |
| 4,933,850 A | 6/1990 | Wheeler | 364/424.1 |
| 4,945,870 A | 8/1990 | Richeson | 123/90.11 |
| 4,964,318 A | 10/1990 | Ganoung | 74/859 |
| 5,019,986 A | 5/1991 | Londt et al. | 364/426.04 |
| 5,025,380 A | 6/1991 | Wataya et al. | 701/103 |
| 5,083,277 A | 1/1992 | Shutler | 364/431.02 |
| 5,126,940 A | 6/1992 | Haubner | 364/424.1 |
| 5,129,288 A | 7/1992 | Sasaki et al. | 74/866 |
| 5,189,621 A | 2/1993 | Onari et al. | 701/102 |
| 5,245,541 A | 9/1993 | Tomomatsu et al. | 364/424.1 |
| 5,257,193 A | 10/1993 | Kusaka et al. | 701/110 |
| 5,259,357 A | 11/1993 | Shimizu et al. | 123/638 |
| 5,303,163 A | 4/1994 | Ebaugh et al. | 700/274 |
| 5,319,559 A | 6/1994 | Kusaka et al. | 364/431.07 |
| 5,377,112 A | 12/1994 | Brown, Jr. et al. | 364/488 |
| 5,445,014 A | 8/1995 | Fiorenza, II et al. | 73/117.3 |
| 5,447,138 A | 9/1995 | Barnes | 123/446 |
| 5,457,633 A | 10/1995 | Palmer et al. | 364/431.09 |
| 5,517,410 A | 5/1996 | Nakagawa et al. | 701/51 |
| 5,612,873 A | 3/1997 | Ogawa | 701/51 |
| 5,627,438 A | 5/1997 | Barrett | 318/139 |
| 5,738,606 A | 4/1998 | Bellinger | 477/111 |
| 5,832,401 A | 11/1998 | Ueda et al. | 701/55 |
| 5,954,617 A | 9/1999 | Horgan et al. | 477/107 |
| 5,995,895 A | 11/1999 | Watt et al. | 701/51 |
| 6,042,505 A * | 3/2000 | Bellinger | 477/111 |
| 6,387,011 B1 * | 5/2002 | Bellinger | 477/111 |
| 6,436,005 B1 * | 8/2002 | Bellinger | 477/111 |

* cited by examiner

SYSTEM FOR CONTROLLING DRIVETRAIN COMPONENTS TO ACHIEVE FUEL EFFICIENCY GOALS

CROSS-REFERENCE TO RELATED U.S. PATENT APPLICATION

This is a divisional of U.S. application Ser. No. 10/080,049, filed Feb. 21, 2002, now U.S. Pat. No. 6,546,329, which is a divisional of U.S. application Ser. No. 09/616,752, filed Jul. now U.S. Pat. No. 6,436,005, which is a continution-in-part of U.S. Ser. No. 09/502,641, filed Feb. 11, 2000, now U.S. Pat. No. 6,387,011, which is a continution-in-part of U.S. Ser. No. 09/099,545, filed Jun. 18, 1998, now U.S. Pat. No. 6,042,505.

FIELD OF THE INVENTION

The present invention relates generally to systems for electronically controlling and managing the operation of drivetrain components including internal combustion engines and change gear transmissions, and more specifically to such systems for controlling such drivetrain components during gear shifting operations.

BACKGROUND OF THE INVENTION

Electronic control systems for managing the operation of internal combustion engines are well known and widely used in the automotive and tractor truck industries. Such systems are typically operable to control engine fueling as well as many other engine and/or vehicle operating conditions.

Designers of electronic engine control systems have heretofore devised numerous techniques for controlling engine fueling during various engine operating conditions, and one such technique is illustrated in FIG. 1. Referring to FIG. 1, a prior art technique for controlling engine fueling to thereby limit engine speed during manual gear shifting operations is illustrated, wherein such a technique is commonly referred to as progressive shift control. FIG. 1 shows a graph of engine RPM vs. vehicle speed, wherein a linear engine speed limit 10 is typically established by specifying a first engine speed limit RPM1 at a first vehicle speed VS1 and a second engine speed limit RPM2 at a second vehicle speed VS2. The engine speed limit 10 linearly increases from RPM1 to RPM2 between VS1 and VS2 and is held constant at RPM2 beyond VS2, wherein RPM2 is typically less than rated engine speed 12. Rated engine speed, also known as governed engine speed, is defined for purposes of the present invention as the engine speed at which the engine produces an advertised engine output horsepower or torque value.

The purpose of progressive shift control is to gradually increase available engine speed (and thus more engine power) as vehicle speed increases between VS1 and VS2, wherein typical values for VS1 and VS2 are 0.0 and 40 mph respectively. This engine speed limiting scheme accordingly encourages the vehicle operator to manually shift gears at lower engine speeds than may otherwise occur, particularly in the lower transmission gears, thereby resulting in fuel savings associated with more efficient engine operation. This feature is illustrated by gear shifting pattern 14 wherein three gear shifts are shown, each occurring at progressively increasing engine speed values.

While the progressive shift control feature 14 illustrated in FIG. 1 achieves the goal of encouraging vehicle operators to shift at lower engine speeds, it has certain drawbacks associated therewith. For example, under high engine load operating conditions, such as when traversing a grade and/or when hauling a heavily loaded trailer, providing a hard limit 10 on available engine speed can hinder the drivability of the vehicle. One example of such hindered drivability is shown by shifting pattern 16 of FIG. 1, which illustrates the effect on the shifting pattern 14 of a steep grade encountered by the same vehicle. Under such operating conditions, the limit 10 on engine speed causes the vehicle operator to shift sooner than would otherwise be preferred and the effect of the steep grade causes additional loss in both engine speed and vehicle speed over that of shifting pattern 14. Under severe operating conditions, the vehicle may accordingly have insufficient momentum to justify a shift to the next higher gear, thereby defeating the purpose of engine speed limit 10. What is needed under such conditions, is the ability to increase engine speed up to rated engine speed 12 before shifting to the next higher gear as illustrated by shifting pattern 18 in FIG. 1, wherein engine speed following a shift should ideally remain above a peak torque engine RPM 15. This scenario would improve grade climbing performance as well as the likelihood of successfully completing the shift, wherein both of these improvements result from additional kinetic energy present in the vehicle prior to the shift and from the increased engine power and response after the shift. However, while sufficient engine speed for grade climbing and the like is necessary, there is also a need for limiting engine output conditions during such grade climbing or other operation so as to maintain fuel efficient engine operation.

What is therefore needed is a system for controlling drivetrain components, which may include an internal combustion engine and a change gear transmission, to thereby achieve desired fuel economy goals while also allowing for additional engine output only when the need therefore legitimately exists.

SUMMARY OF THE INVENTION

The foregoing shortcomings of the prior art are addressed by the present invention. In accordance with one aspect of the present invention, a system for controlling a vehicle drivetrain comprises a memory having stored therein an engine output characteristics map for an internal combustion engine and a number of fuel consumption contours associated with the map, and means for establishing a region of the engine output characteristics map wherein engine operation is undesirable, the region defining a first border as a function of at least one of the fuel consumption contours and a second border intersecting the first border.

In accordance with another aspect of the present invention, a method of controlling a vehicle drivetrain comprises the steps of establishing in memory an engine output characteristics map for an internal combustion engine, defining a number of fuel consumption contours associated with the engine output characteristics map, defining a first border relative to the engine output characteristics map as a function of at least one of the fuel consumption contours, and defining a second border relative to the engine output characteristics map and intersecting the first border, the first and second borders defining a region of the engine output characteristics map wherein engine operation is undesirable.

In accordance with yet another aspect of the present invention, a system for controlling a vehicle drivetrain comprises a memory having stored therein an engine output characteristics map, a region thereof of undesirable engine operation and a number of fuel consumption contours associated with the engine characteristics map, the region having a first border defined as a function of at least one of the number of fuel consumption contours and a second border intersecting the first border, and a control computer controlling engine operation according to the engine output characteristics map while maintaining or encouraging engine operation outside the region.

In accordance with still another aspect of the present invention, a method of controlling a vehicle drivetrain comprises the steps of providing an engine output characteristics map for an internal combustion engine, providing a number of fuel consumption contours associated with the map defining a region of the engine output characteristics map of undesirable engine operation, the region having a first border defined as a function of at least one of the fuel consumption contours and a second border intersecting the first border, and controlling engine operation according to the engine output characteristics map while maintaining or encouraging engine operation outside the region.

In accordance with a further aspect of the present invention, a system for controlling a vehicle drivetrain comprises a memory having stored therein an engine output characteristics map of an internal combustion engine and a contour associated with the map extending from a low engine load value to a high engine load value thereof, means for determining at least one engine operating parameter, and a control computer responsive to the at least one engine operating parameter to control shift points of a transmission coupled to the engine as the at least one engine operating parameter approaches the contour.

In accordance with yet a further aspect of the present invention, a method of controlling a vehicle drivetrain comprises the steps of providing an engine output characteristics map for an internal combustion engine, establishing a contour in relation to the map extending from a low engine load point to a high engine load point thereof, determining an engine operating parameter, controlling upshift points of a transmission coupled to the engine if the engine operating parameter approaches the contour from a first side thereof, and controlling downshift points of the transmission if the engine operating parameter approaches the contour from a second opposite side thereof.

In accordance with still a further aspect of the present invention, a system for controlling a vehicle drivetrain comprises a memory having stored therein an engine output characteristics map of an internal combustion engine and a contour associated with the map extending from a low engine load value to a high engine load value thereof, means for determining at least one engine operating parameter, and a control computer responsive to the at least one engine operating parameter to control an effective gear ratio of a continuous variable transmission (CVT) coupled to the engine to thereby maintain the at least one engine operating parameter within a predefined engine speed deviation from the contour.

In accordance with still another aspect of the present invention, a method of controlling a vehicle drivetrain comprises the steps of providing an engine output characteristics map for an internal combustion engine, establishing a contour in relation to the map extending from a low engine load point to a high engine load point thereof, determining an engine operating parameter, and controlling an effective gear ratio of a continuous variable transmission (CVT) coupled to the engine to thereby maintain the engine operating parameter within a predefined engine speed deviation from the contour.

In accordance with yet a further aspect of the present invention, a system for controlling a vehicle drivetrain comprises a memory having stored therein an engine output characteristics map and a region thereof of undesirable engine operation, a control computer operable to compute an estimated engine torque and an actual engine torque, the control computer allowing engine operation anywhere on or within the engine output characteristics map if the actual engine torque is greater than the estimated engine torque and otherwise maintaining or encouraging engine operation outside the region.

In accordance with still a further aspect of the present invention, a method of controlling a vehicle drivetrain comprises the steps of providing an engine output characteristics map for an internal combustion engine, defining a region of the engine output characteristics map of undesirable engine operation, determining an estimated engine torque value, determining an actual engine torque value, and controlling engine operation according to the engine output characteristics map while maintaining or encouraging engine operation outside the region if the actual engine torque is below the estimated engine torque.

In accordance with yet a further aspect of the present invention, a method of controlling a vehicle drivetrain comprises the steps of providing an engine output characteristics map for an internal combustion engine, determining at least one engine operating parameter in relation to the map, monitoring engine speed of the engine, if the engine speed is increasing along a boundary of the map, performing one of the following steps when the engine speed reaches a governed speed value: forcing an upshift to a higher gear of a transmission coupled to the engine, and limiting engine speed of the engine to the governed engine speed value.

In accordance with still a further aspect of the present invention, a method of controlling a vehicle drivetrain comprises the steps of providing an engine output characteristics map for an internal combustion engine, determining at least one engine operating parameter in relation to the map, monitoring engine speed of the engine, if the engine speed is decreasing along a boundary of the map, determining an engine speed shift point as a function of a gear step between a presently engaged gear and a next lower gear of a transmission coupled to the engine and performing one of the following steps when the engine speed reaches the engine speed shift point: forcing a downshift to the next lower gear of the transmission, and limiting engine speed of the engine to the engine speed shift point.

One object of the present invention is to provide a system for controlling engine operation to thereby maximize fuel economy, particularly during transmission gear shifting operations.

Another object of the present invention is to provide a system for controlling shift points of a number of gears of a transmission to thereby achieve fuel efficient engine operation.

Still another object of the present invention is to provide a system for controlling shift points of a number of gears of a transmission to thereby achieve high performance engine operation.

A further object of the present invention is to provide a system for controlling an effective gear ratio of a continuous variable transmission (CVT) to thereby achieve fuel efficient engine operation.

Yet another object of the present invention is to provide a system for controlling engine operation based on a comparison between an estimated engine torque and an actual engine torque to thereby achieve fuel efficient engine operation.

These and other objects of the present invention will become more apparent from the following description of the preferred embodiments.

DESCRIPTION OF THE PREFERRED EMBODIMENTS

Figure 1:
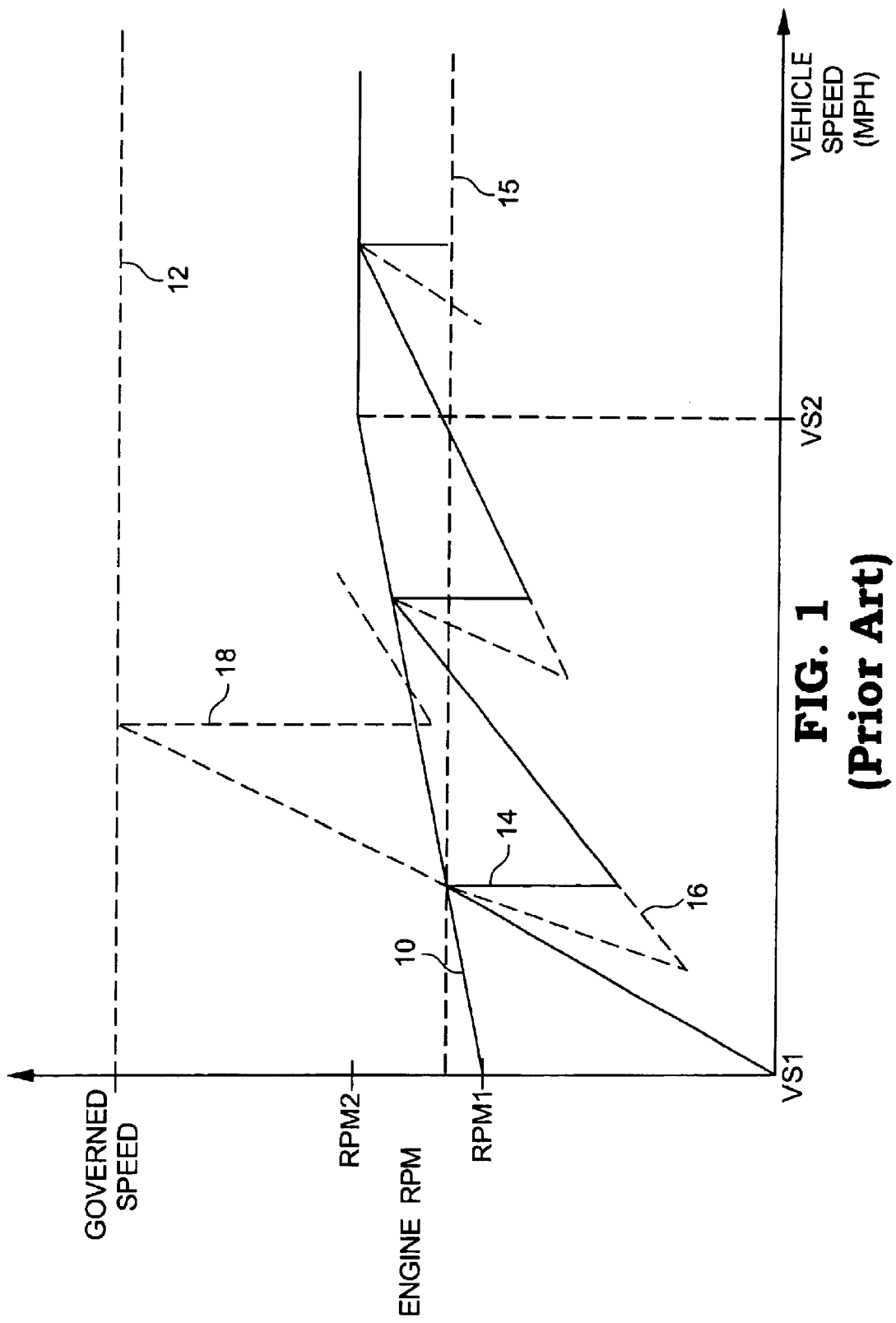
FIG. 1 is a plot of engine speed vs. vehicle speed illustrating a prior art technique for limiting engine speed to thereby encourage shifting at lower engine speeds in the lower transmission gears.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated devices, and such further applications of the principles of the invention as illustrated therein being contemplated as would normally occur to one skilled in the art to which the invention relates.

Figure 2:
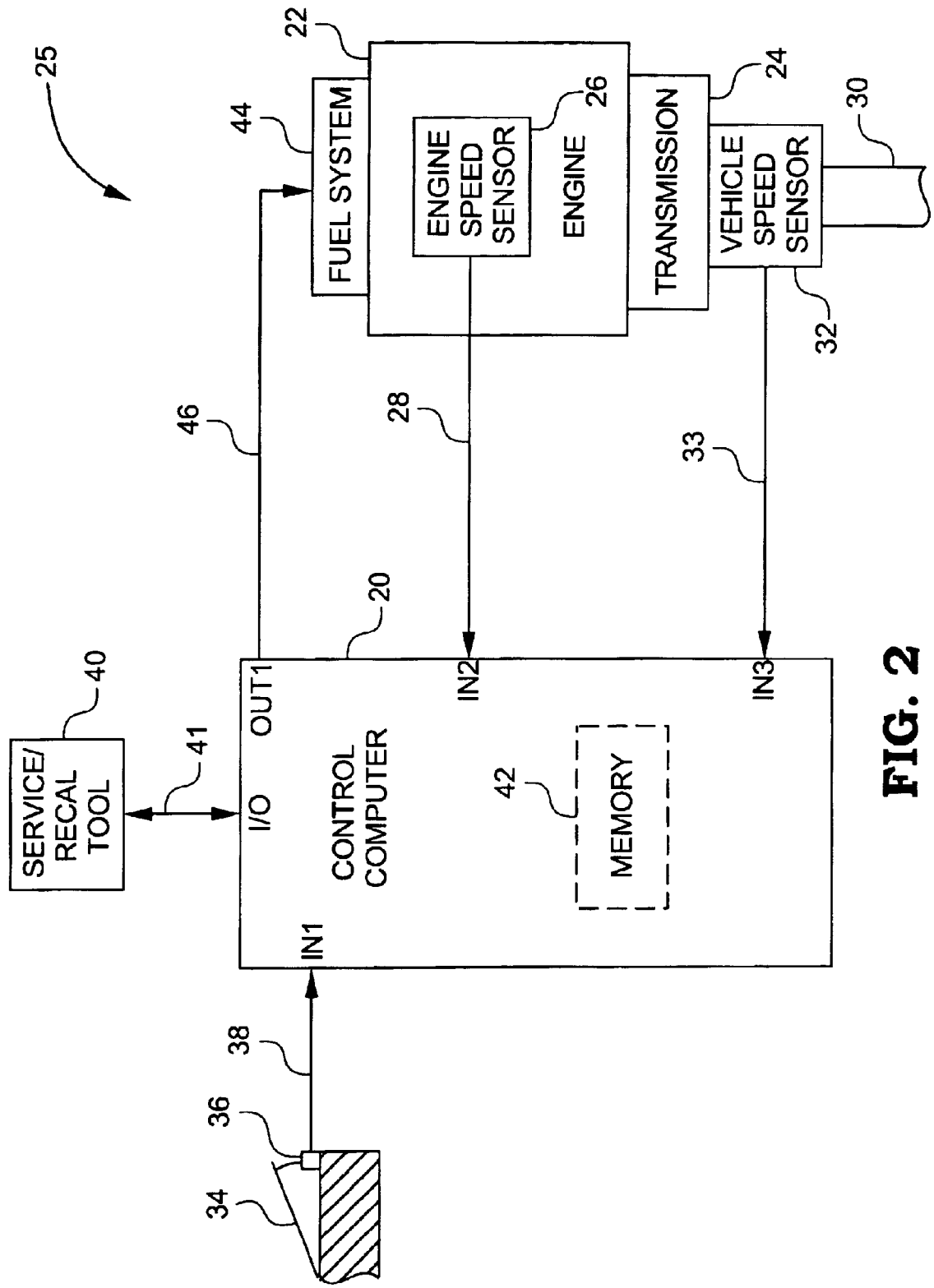
FIG. 2 is a diagrammatic illustration of one embodiment of a system for controlling engine operation in accordance with the present invention.

Referring now to FIG. 2, one preferred embodiment of a system 25 for controlling engine operation, in accordance with the present invention, is shown. Central to system 25 is a control computer 20 which interfaces with various engine and/or vehicle components as will be discussed more fully hereinafter. Control computer 20 is preferably microprocessor-based and includes at least a memory portion 42, digital I/O and a number of analog-to-digital (A/D) inputs. The microprocessor portion of control computer 20 runs software routines and manages the overall operation of system 25 and is, in one preferred embodiment, a Motorola 68336 or equivalent microprocessor. However, the present invention contemplates using any one of a number of known microprocessors capable of managing and controlling system 10. The memory portion 42 of control computer 20 may includes ROM, RAM, EPROM, EEPROM, FLASH memory and/or any other memory known to those skilled in the art. Memory portion 42 may further be supplemented by external memory connected thereto (not shown).

An internal combustion engine 22 is operatively connected to a main transmission 24 as is known in the art. A propeller shaft; or tailshaft, 30 extends from transmission 24, whereby transmission 24 is operable to rotatably actuate propeller shaft 30 and thereby provide driving power to one or more vehicle wheels via a drive axle (not shown) as is known in the art. System 25 may further include, particularly as is known in the heavy duty tractor truck art, one or more auxiliary transmissions and interconnecting propeller shafts (not shown), power take off (PTO) devices, and other known drivetrain components.

A number of sensors and actuators permit control computer 20 to interface with some of the various components of system 25 as well as other vehicle and/or engine systems. For example, engine 22 includes an engine speed sensor 26 which is electrically connected to input IN2 of control computer 20 via signal path 28. Engine speed sensor 26 is preferably a known Hall-effect device operable to sense speed and/or position of a toothed gear rotating synchronously with the engine crank shaft. However, the present invention contemplates using any known engine speed sensor 26, such a variable reluctance sensor or the like, which is operable to sense engine rotational speed and provide a signal to control computer 20 corresponding thereto.

A vehicle speed sensor 32 is preferably positioned about propeller shaft 30 adjacent to transmission 24, and is electrically connected in input IN3 of control computer 20 via signal path 33. Vehicle speed sensor 32 is preferably a variable reluctance sensor operable to sense rotational speed of propeller shaft 30 and provide a vehicle speed signal to control computer 20 corresponding thereto. While vehicle speed sensor 32 is shown in FIG. 2 as being located adjacent to transmission 24, it is to be understood that sensor 32 may alternatively be located anywhere along propeller shaft 30. Moreover, the present invention contemplates using any other known vehicle speed sensor operable to provide control computer 20 with a vehicle speed signal indicative of vehicle road speed.

Control computer 20 further includes an I/O port that is configured to interface with a known service/recalibration tool 40 via signal path 41. Tool 40 is operable, as is known in the art, to exchange information with control computer 20, wherein such data may include, but is not limited to, calibration/recalibration information such as fueling maps and the like, trip or other accumulated engine/vehicle operational data, and fault/diagnostic data.

System 25 further includes a fueling system 44 which is electrically connected to output OUT1 of control computer 20 via signal path 46. Fueling system 44 is responsive to fueling signals (e.g. commanded fuel) provided by control computer 20 on signal path 46 to supply fuel to engine 22 as is known in the art.

An accelerator pedal 34 preferably includes an accelerator pedal position or deflection sensor 36 that is electrically connected to input IN1 of control computer 20 via signal path 38. Sensor 36 is, in one preferred embodiment, a potentiometer electrically connected to a suitable voltage and having a wiper that is electrically connected to signal path 38 and mechanically connected to pedal 34 so that the voltage on signal path 38 corresponds directly to the position, or deflection, of the accelerator pedal 34. The present invention further contemplates that other known sensors may be alternatively associated with accelerator pedal 34 to provide one or more analog and/or digital signals corresponding to accelerator pedal position or pressure applied to pedal 34. In any event, such a sensor is operable to provide control computer 20 with an accelerator pedal signal indicative of driver requested torque.

Transmission 24 may be any known manual or manual/automatic transmission having one or more manually selectable gear ratio associated therewith. Transmission 24 includes a mechanical input coupled, via mechanical linkage, to a gear shift lever (not shown) which is actuated by the vehicle operator to thereby select the various manually selectable gear ratios. In accordance with the present invention, control computer 20 is operable to control engine speed, preferably as a function of engine load and engine acceleration, thereby encouraging manual shifting at lower engine speeds in the lower gears while also making more engine speed (and higher engine torque) available when there exists a legitimate need therefore (such as when climbing steep grades). One benefit of such engine control is fuel savings associated with lower engine speed operation under typical engine/vehicle operating conditions while providing for enhanced engine performance when a need therefore exists.

Figure 3:
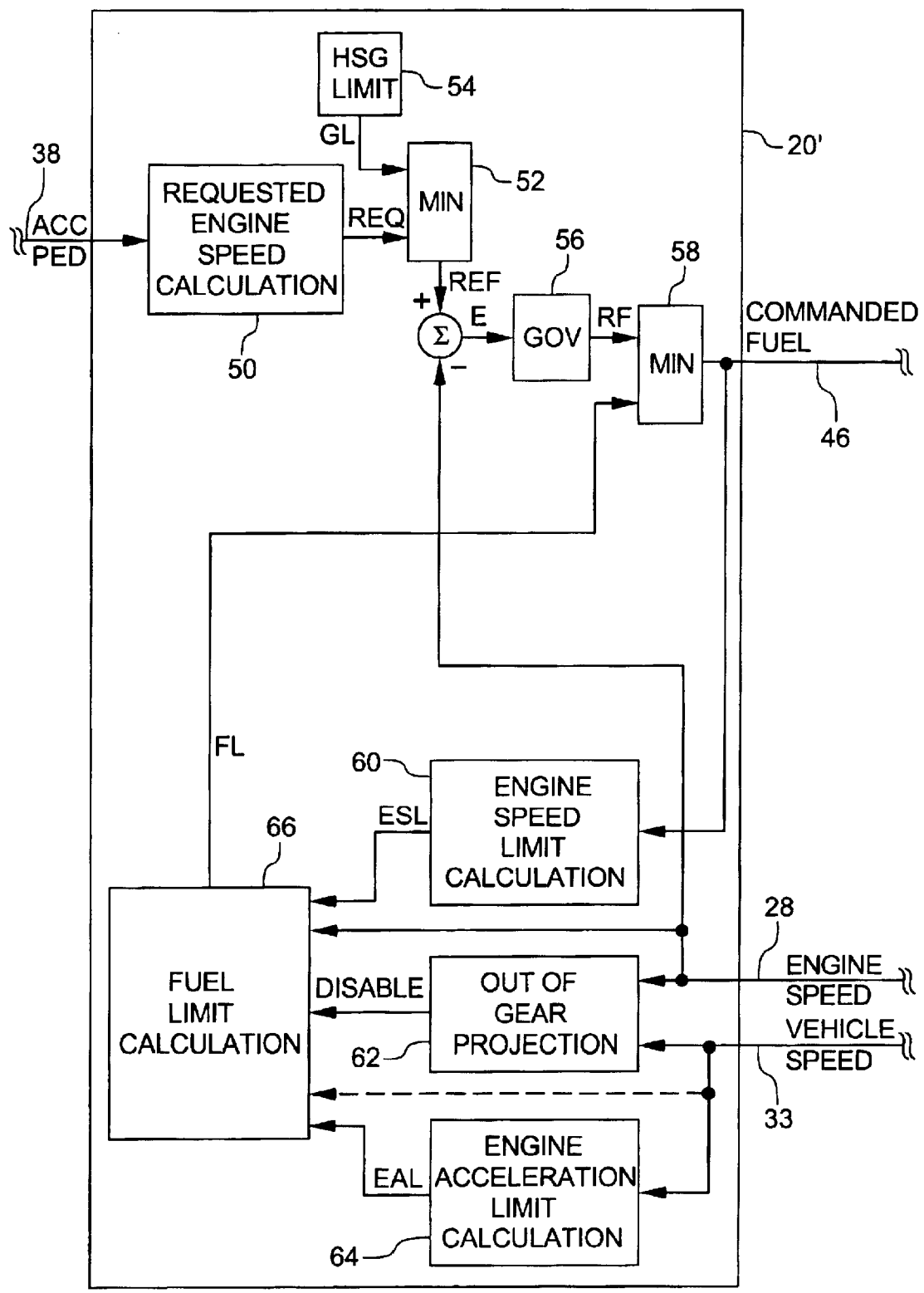
FIG. 3 is a diagrammatic illustration of one embodiment of the control computer of FIG. 2 showing some of the internal features thereof as they relate to the present invention.

Referring now to FIG. 3, one preferred embodiment 20' of a portion of the control computer 20 of FIG. 2 illustrating some of the internal features thereof as they relate to the present invention, is shown. While the internal features of control computer 20' illustrated in FIG. 3 are shown in block form, it is to be understood that such blocks are merely graphical representations of functions or processes that are performed by control computer 20'. In any event, control computer 20' includes a requested engine speed calculation block 50 receiving the requested torque signal from accelerator pedal sensor 36 via signal path 38. Block 50 is operable to calculate a requested engine speed value REQ based at least in part on the requested torque signal, as is known in the art, wherein REQ is provided to one input of a MIN block 52. A high speed governor (HSG) limit block 54 provides an HSG engine speed limit value GL to a second input of MIN block 52, wherein MIN block 52 is operable to provide the minimum of the REQ and GL values as a reference speed REF at an output thereof. In one embodiment, the HSG engine speed limit value GL corresponds to a maximum allowable governed engine RPM, although the present invention contemplates setting GL at other desired engine speed values, wherein GL is preferably a programmable parameter that may be accessed via the service/recalibration tool 40.

The engine speed reference value REF is provided to a non-inverting input of a summing node Σ, wherein node Σ also includes an inverting input receiving the engine speed signal provided on signal path 28. Summing node Σ produces an error value E that is provided to a known engine speed governor block 56. Engine speed governor 56 produces a requested fuel value RF at an output thereof which is provided to one input of another MIN block 58. MIN block 58 provides the commanded fuel signal to fuel system 44 on signal path 46.

An engine speed limit calculation block 60 is connected to signal path 46 and receives the commanded fuel signal at an input thereof. Block 60 is operable to process the commanded fuel signal and provide an engine speed limit value (ESL) as a function thereof. In one embodiment, block 60 is operable to compute engine load as a function of commanded fueling as is known in the art, and determine an appropriate engine speed limit value (ESL) based on the current engine load value. Alternatively, the present invention contemplates computing, in block 60, a current engine load value according to any known technique (i.e. as a function of one or engine operational parameters in addition to or separate from commanded fueling) and determining ESL as a function thereof. Preferred techniques for determining ESL as a function of current engine load will be described more fully hereinafter with respect to FIGS. 4 and 6. In any event, ESL is provided to a first input of a fuel limit calculation block 66.

An engine acceleration limit calculation block 64 is connected to signal path 33 and receives the vehicle speed signal at an input thereof. Block 64 is operable to process the vehicle speed signal and provide an engine acceleration limit value (EAL) as a function thereof. Alternatively, the present invention contemplates determining EAL according to other indicia of vehicle speed such as, for example, presently engaged gear ratio, or the like. In any case, preferred techniques for determining EAL as a function of current vehicle speed will be described more fully hereinafter with respect to FIGS. 4 and 6. Regardless of the particular technique for determining EAL, block 64 is operable to provide the EAL value to a second input of a fuel limit calculation block 66.

Figure 5:
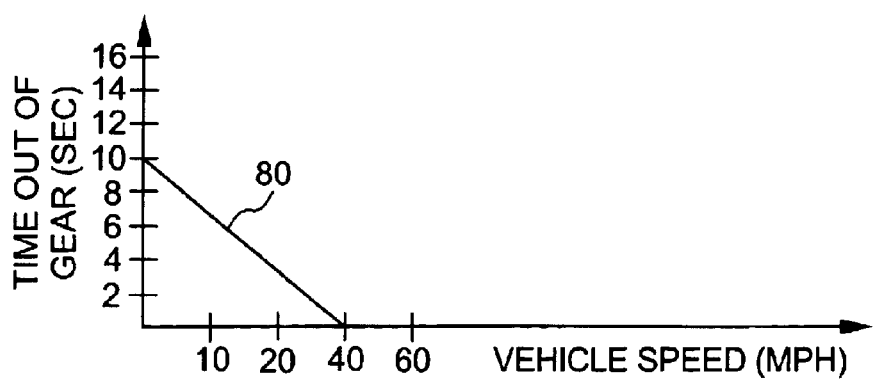
FIG. 5 is a plot of time out of gear vs. vehicle speed illustrating one embodiment of an engine control delay technique for use with the present invention.

An out of gear protection block 62 is connected to signal paths 28 and 33, and accordingly receives the engine speed and vehicle speed signals at inputs thereof. Block 62 is operable to process the engine and vehicle speed signals, and provide a disable value as a function thereof. The purpose of block 62 is to disable the engine speed/acceleration limiting feature of the present invention while a transmission out-of-gear condition exists (e.g. pursuant to a gear shift). Preferably, block 62 is operable to disable the engine speed/acceleration limiting feature immediately upon detection of an out-of-gear condition above some predetermined vehicle speed, and to delay disablement of the feature for some time period at low vehicle speeds. In either case, once disabled, block 62 is operable to re-enable the engine speed/acceleration feature upon detection of a completed gear shift. In one embodiment, block 62 is operable to determine the presently engaged gear ratio, and whether an out-of-gear condition exists, by computing a ratio of engine speed and vehicle speed as is known in the art. However, the present invention contemplates using other known techniques for determining gear engagement status, and those skilled in the art will recognize that any such mechanisms and/or techniques may be used without detracting from the scope of the present invention. In any event, if an out-of-gear condition exists, block 62 is operable to produce a disable signal to thereby disable the engine speed/acceleration limiting feature of the present invention as will be described in greater detail hereinafter. The purpose of such disablement is to allow operator control of a full range of engine speeds to facilitate achievement of synchronous engine speed for completing a shift. As a practical matter, and from a safety standpoint, disablement of the engine speed/acceleration limiting feature is typically a concern only at higher vehicle speeds, and the feature is accordingly preferably disabled immediately upon detection of an out-of-gear condition at high vehicle speeds (e.g., above 40 mph). At low vehicle speeds, however, engine speeds tend to change more rapidly (e.g. such as when attempting to accelerate up to highway speed) and if the engine speed/acceleration limiting feature is disabled immediately upon detection of an out-of-gear condition, then by the time a valid gear ratio is detected the vehicle operator may have commanded the engine speed above the engine speed limit allowed by the engine speed/acceleration limiting feature. Thus, when the engine speed/acceleration limiting feature is subsequently re-enabled, control computer 20 will respond to the excessive engine speed by commanding zero fuel until current engine speed is reduced below the engine speed limit established by the engine speed/acceleration limiting feature. This potentially large step reduction in engine speed is annoying to the driver, and is unnecessary at low vehicle speeds. Accordingly, block 62 is preferably operable to delay production of the disable signal for some time period at low vehicle speeds and as a function of vehicle speed, an example of which is illustrated in FIG. 5. If the operator is experiencing trouble finding synchronous engine speed at low vehicle speeds, block 62 is preferably operable to produce the disable signal upon expiration of the delay time period, after which the operator will be provided with a full range of available engine speeds. Referring to FIG. 5, one preferred delay technique is illustrated as a plot 80 of time out of gear vs. vehicle speed. As vehicle speed increases, the delay until production of the disable signal is reduced. Above some vehicle speed (e.g. 40 mph), no delay occurs. Those skilled in the art will recognize that plot 80 of FIG. 5 represents only one preferred embodiment of a delay technique as described above, and that other delay techniques may be used, either in graphical, table or equation form, for example, to achieve a desired delay profile. Referring again to FIG. 3, block 62 is operable in any case to provide a disable value or signal to a third input of fuel limit calculation block 66.

Fuel limit calculation block 66 receives as inputs the ESL value from block 60, the EAL value from block 64, the disable value from block 62, the engine speed signal on signal path 28, and optionally the vehicle speed signal on signal path 33, and is operable to compute a fueling limit FL value as a function thereof and provide the FL value to a remaining input of MIN block 58. The commanded fuel signal provided on signal path 46 is accordingly the minimum of the requested fueling value RF produced by the engine speed governor 56 and the fuel limit value FL produced by block 66. Preferably, block 66 is responsive to the disable signal provided by block 62 to set FL to some fueling value above RF (e.g. such as a maximum fuel level), so that when the engine speed/acceleration limiting feature of the present invention is disabled, MIN block 58 is operable to pass the RF value therethrough as the commanded fuel value, although the present invention contemplates other configurations of control computer 20' for accomplishing the same task. When the disable signal is not present, block 66 is operable to determine the fuel limit value FL as a function of ESL and EAL.

Figure 4:
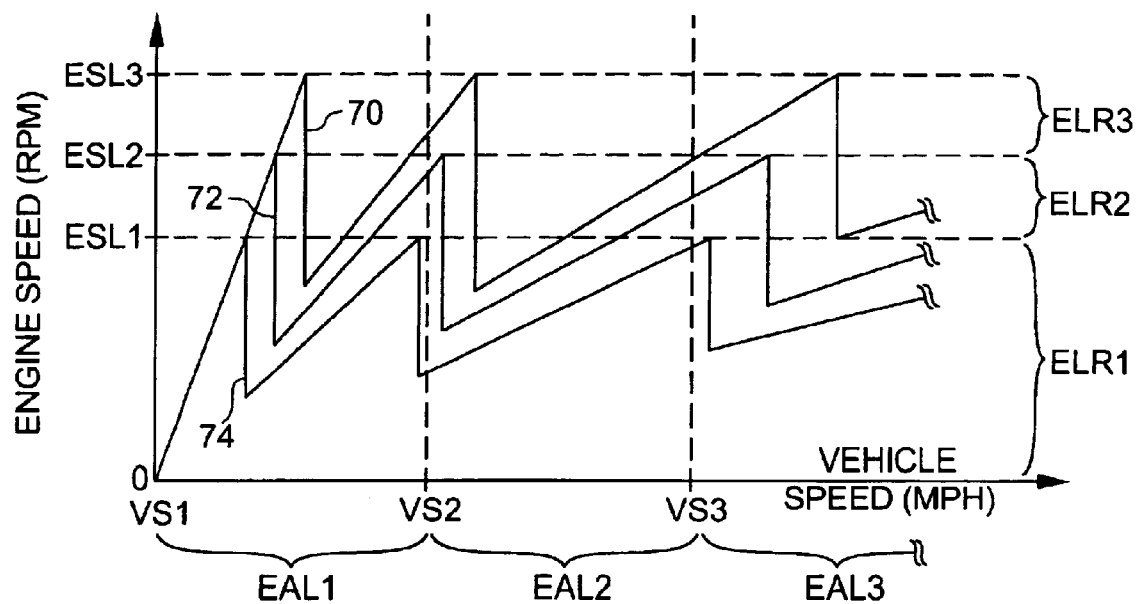
FIG. 4 is a plot of engine speed vs. vehicle speed illustrating engine control operation of the control computer embodiment shown in FIG. 3.

Referring now to FIG. 4, one preferred technique for determining ESL and EAL within blocks 60 and 64 respectively, is shown graphically as a plot of engine speed vs. vehicle speed. The engine speed axis (vertical axis) is partitioned into three engine load ranges; ELR1, ELR2 and ELR3. Each of these engine load ranges has a progressively larger engine speed limit (ESL) associated therewith; i.e. ELR1 has a maximum engine speed limit of ESL1, ELR2 has a maximum engine speed limit of ESL2 and ELR3 has a maximum engine speed limit of ESL3. Within block 60, control computer 20' is operable to determine a current engine load value from the commanded fuel signal. In one embodiment, engine load is determined as a ratio of the current commanded fuel value and a maximum commandable fueling value (maximum requestable torque), although the present invention contemplates other known techniques for determining engine load. In any case, control computer 20' is operable in block 60 to determine an engine speed limit ESL based on the current engine load value. For example, if the current engine load value is within engine load range ELR1, ESL=ESL1 as illustrated by waveform 74, if the current engine load value is within engine load range ELR2, ESL=ESL2 as illustrated by waveform 72, and if the current engine load value is within engine load range ELR3, ESL=ESL3 as illustrated by waveform 70. In one embodiment, ESL1=1200 RPM, ESL2 1600 RPM, ESL3= 1800 RPM, ELR1=<20% load, ELR2=20–80% load, and ELR3=>80% load. Alternatively, control computer 20' may be operable to interpolate intermediate engine speed limit values (ESLs) between ESL1, ESL2 and ESL3 so that an engine load value, rather than an engine load range, may be mapped to an appropriate engine speed limit value (ESL). For example, if the current engine load value is above some threshold value (e.g. 20% load), ESL=f(engine load) wherein f(engine load) interpolates between the ESL1, ESL2 and ESL3 values as a function of the current engine load value, and wherein ESL preferably increases as the engine load value increases. In either case, drivers are thus provided with the ability to operate the engine 22 at higher engine speeds, and correspondingly higher engine output torque levels, as the engine load increases. This type of engine speed limiting scheme forces gear shifting at lower engine speeds under low and moderate engine loads (e.g. downhill and flat road conditions), thereby maximizing fuel economy, while allowing for increased engine power when the need therefore exists at high engine loads (e.g. steep and moderate road grades. It is to be understood, however, that FIG. 4 illustrates only one example of determining ESL as a function of engine load within block 60 of FIG. 3, and that any number of engine load ranges and corresponding engine speed limits may be used having any desired engine speed and engine load range values, wherein such engine load ranges and engine speed limits are preferably stored in a look up table or other suitable format within memory 42, and are programmable via the service/recalibration tool 40 (FIG. 2). Alternatively, block 60 may be configured such that the engine speed limit value ESL is a continuous or piecewise continuous function of engine load, wherein a suitable equation relating the two parameters may be programmed within memory 42, preferably via service/recalibration tool 40.

The vehicle speed axis (horizontal axis) is partitioned into three engine acceleration limits; EAL1, EAL2 and EAL3, wherein each of the engine acceleration limits corresponds to a specific vehicle speed range. Thus, if control computer 20' determines within block 64 that VS1<vehicle speed (VS)<VS2, the engine acceleration limit (EAL) is set to EAL1. If VS2<VS<VS3, the engine acceleration limit (EAL) is set to EAL2. Finally, if VS>VS3, the engine acceleration limit (EAL) is set to EAL3. In one embodiment, VS1=0 mph, VS2=20 mph, VS3=40 mph, EAL1=300 rpm/ sec, EAL2=500 rpm/sec and EAL3=no limit. It is to be understood, however, that FIG. 4 illustrates only one example of determining EAL as a function of vehicle speed within block 64 of FIG. 3, and that any number of vehicle speed ranges and corresponding engine acceleration limits may be used having any desired engine acceleration and vehicle speed range values, wherein such vehicle speed ranges and engine acceleration limits are preferably stored in a look up table or other suitable format within memory 42, and are programmable via the service/recalibration tool 40 (FIG. 2). Alternatively, control computer 20' may be operable to interpolate intermediate engine acceleration limit values (EALs) between VS1, VS2 and VS3 as described hereinabove with respect to the engine speed limit values (ESLs), wherein EAL preferably increases with increasing vehicle speed. Alternatively still, block 60 may be configured such that the engine acceleration limit value EAL is a continuous or piecewise continuous function of vehicle speed, wherein a suitable equation relating the two parameters may be programmed within memory 42, preferably via service/recalibration tool 40. Finally, vehicle acceleration limits (VAL) may be substituted for the engine acceleration limits (EAL), wherein vehicle acceleration can be computed in a known manner as a function of vehicle speed within block 64. In this case, the vehicle speed signal must also be provided to fuel limit calculation block 66 by routing the vehicle speed signal directly thereto as shown in phantom in FIG. 3.

In accordance with this engine acceleration limiting scheme, drivers are thus provided with the ability to operate the engine 22 at higher engine acceleration values, and correspondingly higher engine output torque levels, as the vehicle speed increases. This type of engine acceleration limiting scheme is provided along with the engine speed limiting scheme just described in order to discourage vehicle operators from attempting to defeat the engine speed limiting scheme. One way to defeat a strictly engine load-based engine speed limiting scheme such as that just described is to command high engine load (e.g. by commanding a high accelerator pedal position) to thereby trick control computer 20' into providing a higher engine speed limit (ESL) than would otherwise be necessary for acceptable shiftability on level road surfaces. By commanding 100% accelerator pedal position following each gear shift, vehicle operators could accordingly have the maximum engine speed limit available to them at all times. The engine acceleration limiting scheme just described thus provides a check on the engine speed limiting scheme by limiting engine acceleration to appropriate engine acceleration values within specific vehicle speed ranges. Vehicle operators attempting to defeat the engine speed limiting feature as just described will be unable to effectively do so since control computer 20 will limit engine acceleration to a suitable rate depending upon vehicle speed, and thereby disallow an increase in the engine speed limit (ESL) unless engine load is truly high due to road conditions and/or excessive vehicle mass.

Referring again to FIG. 3, the fuel limit calculation block 66 is responsive to the engine speed limit value (ESL), the engine acceleration limit value (EAL) and to at least the engine speed signal on signal path 28 to provide the fuel limit value FL as long as the disable signal produced by block 62 is not present as described hereinabove. In one embodiment, fuel limit calculation block 66 is operable to compute a current engine acceleration value from the engine speed signal on signal path 28. Block 66 is further operable to compare the current value of the engine speed signal to the ESL value, and to compare the computed engine acceleration value to EAL, and produce a fuel limit value FL that limits engine speed to ESL and further limits engine acceleration to EAL. MIN block 58 is operable to provide the minimum of the RF and FL values as the commanded fuel value so that control computer 20' provides the FL value on signal path 46 as actual engine speed reaches ESL and/or as actual engine acceleration reaches EAL to thereby maintain engine speed below ESL and/or engine acceleration below EAL. In an alternate embodiment, block 64 is operable as described hereinabove to compute a vehicle acceleration limit (VAL), and block 66 is operable to compute a current vehicle acceleration value from the vehicle speed value on signal path 33. Block 66 is further operable, in this alternative embodiment, to compare the current value of the engine speed signal to the ESL value, to compare the computed vehicle acceleration value to VAL, and produce a fuel limit value FL that limits engine speed to ESL and further limits vehicle acceleration to VAL. Control computer 20' is thus operable, in this embodiment, to limit commanded fuel to thereby maintain engine speed below the ESL value and/or to maintain vehicle acceleration below the VAL value.

Figure 6:
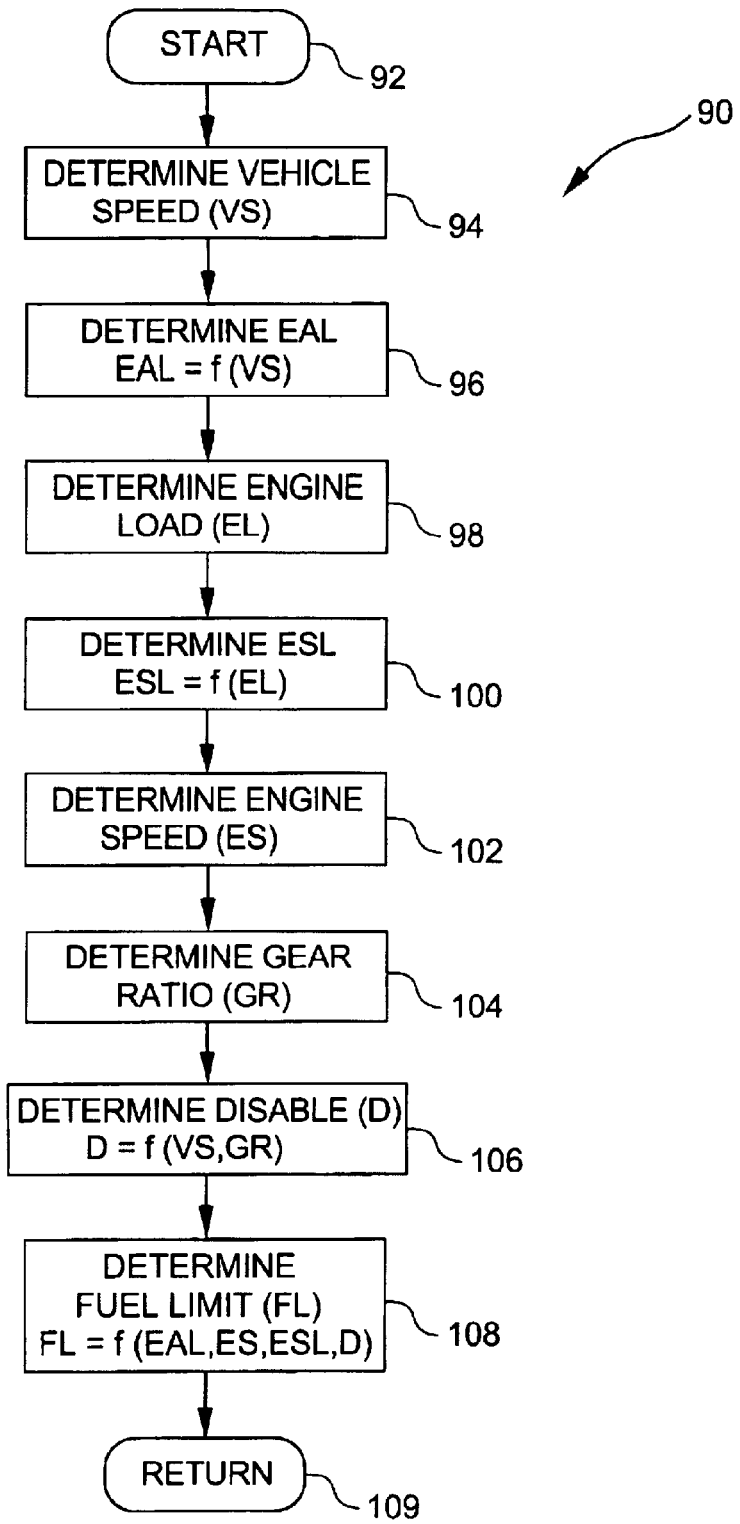
FIG. 6 is a flowchart illustrating one embodiment of a software algorithm for controlling engine operation with the system illustrated in FIGS. 2 and 3, in accordance with the present invention.

Referring now to FIG. 6, a flowchart is shown illustrating one preferred embodiment of a software algorithm 90 for controlling the commanded fuel value provided by control computer 20' on signal path 46 as described hereinabove. Preferably, algorithm 90 is stored within memory portion 42 (FIG. 2) and is executable by control computer 20' many times per second as is known in the art. Algorithm 90 starts at step 92 and at step 94, control computer 20' determines a current vehicle speed value VS, preferably by processing the vehicle speed signal on signal path 33 as is known in the art. Thereafter at step 96, control computer 20' is operable to determine an engine acceleration limit value EAL, preferably as a function of vehicle speed VS as described hereinabove. In an alternative embodiment, control computer 20' is operable at step 96 to determine a vehicle acceleration limit value VAL, preferably as a function of vehicle speed VS as described hereinabove. In any case, algorithm execution continues from step 96 at step 98 where control computer 20' is operable to determine an engine load value EL, preferably as a function of the commanded fuel signal on signal path 46 and a maximum commanded fuel value as described above. Algorithm execution continues from step 98 at step 100 where control computer 20' is operable to determine an engine speed limit value ESL, preferably as a function of the engine load value EL as described hereinabove.

Algorithm execution continues from step 100 at step 102 where control computer 20' is operable to determine a current engine speed value ES, preferably by processing the engine speed signal on signal path 28 as is known in the art. Thereafter at step 104, control computer 20' is operable to determine a presently engaged gear ratio GR, preferably as a ratio of the vehicle speed and engine speed values VS and ES respectively as is known in the art. Thereafter at step 106, control computer 20' is operable to determine a disable signal D, preferably as a function of vehicle speed VS and gear ratio GR as described hereinabove.

Algorithm execution continues from step 106 at step 108 where control computer 20' is operable to determine a fuel limit value FL, preferably as a function of EAL, ES, ESL and D, or alternatively as a function of VAL, ES, ESL and D, as described hereinabove. Thereafter at step 109, algorithm execution is returned to its calling routine. Alternatively, step 108 may loop back to step 94 for continual operation of algorithm 90.

Figure 7:
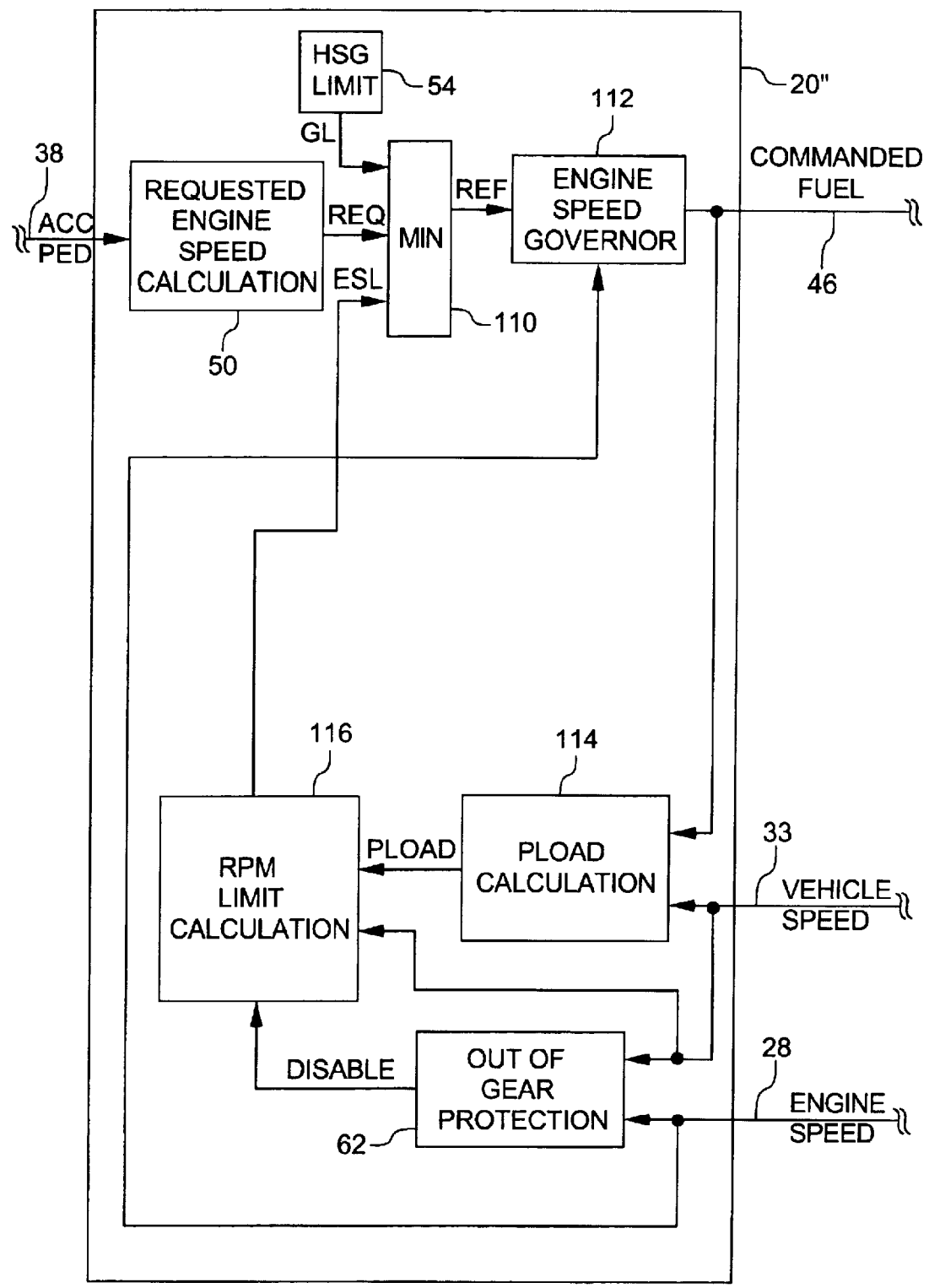
FIG. 7 is a diagrammatic illustration of another embodiment of the control computer of FIG. 2 showing some of the internal features thereof as they relate to the present invention.

Referring now to FIG. 7, another preferred embodiment 20" of a portion of the control computer 20 of FIG. 2 illustrating some of the internal features thereof as they relate to the present invention, is shown. While the internal features of control computer 20" illustrated in FIG. 7 are shown in block form, it is to be understood that such blocks are merely graphical representations of functions or processes that are performed by control computer 20". Moreover, it is to be understood that some of the blocks illustrated in FIG. 7 are identical in operation to like numbered blocks illustrated in FIG. 3, and that the operational description of such blocks will not be repeated for brevity. In any event, control computer 20" includes a requested engine speed calculation block 50 receiving the requested torque signal from accelerator pedal sensor 36 via signal path 38, and providing a requested engine speed value REQ, as described above, to one input of a MIN block 110. A high speed governor (HSG) limit block 54 provides an HSG engine speed limit value GL, as described above, to a second input of MIN block 110. MIN block 110 also receives a third engine speed limit value ESL from block 116, as will be described more fully hereinafter, and produces a reference engine speed value REF at an output thereof.

The engine speed reference value REF is provided to a known engine speed governing block 112 which is responsive to REF and the engine speed signal on signal path 28 to produce the commanded fuel signal on signal path 46. The commanded fuel signal is also provided to one input of a PLOAD calculation block 114, and the vehicle speed signal on signal path 33 is provided to a second input of block 114. Block 114 is responsive to the commanded fuel and vehicle speed signals to produce a PLOAD value at an output thereof, wherein the PLOAD value is a pseudo-load value that preferably indicative of total vehicle weight, vehicle acceleration rate and/or engine driving force as will be described more fully hereinafter with respect to FIG. 8. An out of gear protection block 62 is also included and is preferably responsive to the engine and vehicle speed signals to produce a disable signal at an output thereof as described above.

Control computer 20" also includes an RPM limit calculation block 116 that is preferably responsive to the PLOAD value produced by block 114, the vehicle speed signal on signal path 33 and the disable signal produced by block 62 to produce an engine speed limit value ESL, as will be described in greater detail hereinafter. MIN block 110 is responsive to the GL, REQ and ESL values to provided the minimum thereof as the engine speed reference value REF provided to the engine speed governor block 112, wherein block 112 is operable to provide the commanded fuel value and thereby control engine fueling based on the minimum of the GL, REQ and ESL values.

Figure 8:
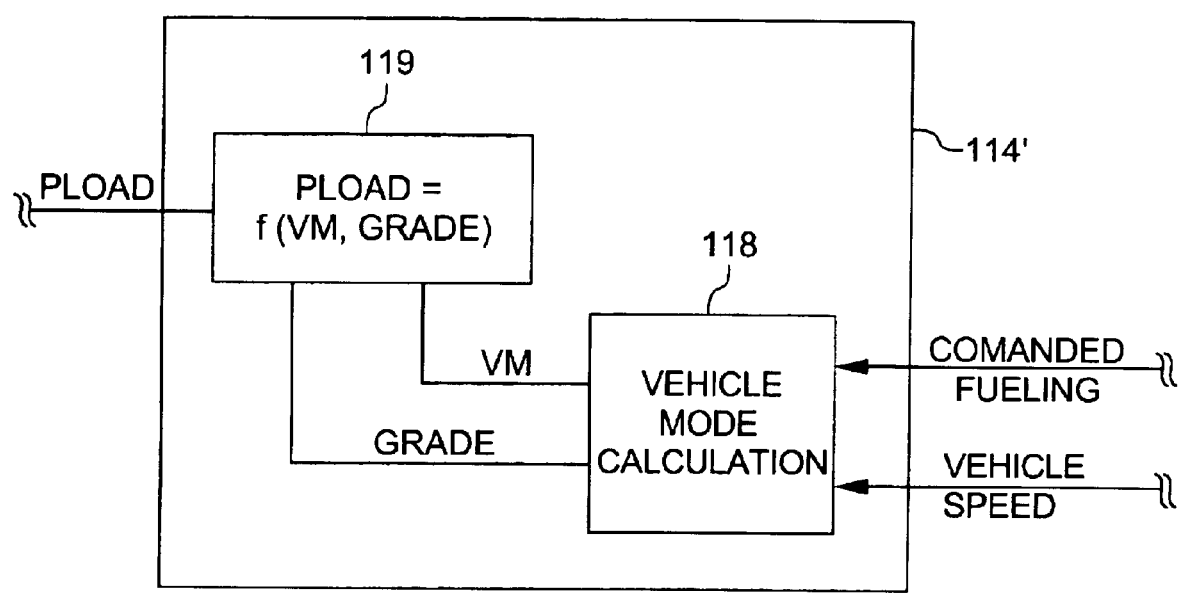
FIG. 8 is a diagrammatic illustration of one embodiment of the PLOAD calculation block of FIG. 7, according to the present invention.

Referring to FIG. 8, one preferred embodiment 114' of the PLOAD calculation block 114, in accordance with the present invention, is shown. Within block 114', a vehicle mode calculation block 118 receives at least the commanded fuel and vehicle speed signals and produces an estimated vehicle mass value VM and a grade value GRADE corresponding to the grade of the road currently being traveled. In one embodiment, the VM value is crudely estimated in accordance with Newton's second law which relates vehicle driving force to vehicle mass and vehicle acceleration via the equation F=ma, wherein "F" is the vehicle driving force, "m" is the vehicle mass and "a" is the vehicle acceleration. The GRADE value is determined by taking into account that the vehicle driving force "F" in the above equation is actually a combination of a number of forces acting with and against the forward momentum of the vehicle. Specifically, the vehicle driving force "F" in the above equation is a combination of at least a force due to engine torque ($F_T$), a resistance force due to wind, etc. ($F_W$), a rolling resistance force due wheel/tire friction ($F_R$) and a force due to road grade conditions ($F_G$). In this embodiment, Newton's second law may be manipulated to provide an estimate of $F_G$ in accordance with the equation:

$$F_G = m*a - F_T + F_R + F_W \quad (1).$$

Block 118 produces a GRADE value based on known relationships between the $F_G$ value and the actual grade of the road. The VM and GRADE values are provided to a PLOAD calculation block 119 which produces the PLOAD signal or value as a function of the VM and GRADE values. In one embodiment, control computer 20" includes a table therein relating VM and GRADE values to a PLOAD value. One example of a simple table relating PLOAD to VM and GRADE values is shown below as TABLE 1, wherein the value of VM is used to determine only whether the vehicle is loaded (i.e. a trailer connected thereto) or is operating in a so-called bob-tail manner (i.e. no trailer connected thereto). In making such a determination, vehicle mode calculation block 118 is preferably operable to estimate the vehicle mass as described hereinabove, compare this estimated mass value to a predefined mass value (e.g. 50,000 lbs.), and produce a VM value corresponding to a loaded vehicle if the estimated mass is above the predefined mass value or a VM value corresponding to a bob-tail vehicle if the estimated mass is below the predefined mass value. In this simple table, the $F_G$ value is used to determine whether the vehicle is traveling up a grade (uphill), on a flat road surface (flat) or down a grade (downhill). In so doing, vehicle mode calculation block 118 is preferably operable to determine a road grade estimation, based on the $F_G$ value and known relationships between $F_G$ and actual road grade conditions, and assign to GRADE a corresponding road grade condition value. In the example illustrated in Table 1, the GRADE signal or value provided to block 119 is assigned an "uphill" designation if $F_G$ corresponds to a −2.0 or more degree grade, a "flat" designation if $F_G$ corresponds to between a −2.0 and a 2.0 degree grade, and a "downhill" designation if $F_G$ corresponds to a +2.0 or more degree grade. Block 119 includes Table 1 which relates the VM and GRADE values to a PLOAD value PL1, PL2 or PL3, wherein PL3 corresponds to a greater vehicle/engine load condition than PL2 which corresponds to a greater vehicle/engine load condition than PL1.

TABLE 1

| VM (rows) GRADE (cols.) | UPHILL | FLAT | DOWNHILL |
|---|---|---|---|
| LOADED | PL3 | PL2 | PL1 |
| BOB-TAIL | PL2 | PL1 | PL1 |

Those skilled in the art will recognize that Table 1 illustrates only a simple example of relating VM and $F_G$ to a pseudo-load value PLOAD, and that more sophisticated tables relating VM and GRADE values to PLOAD value are intended to fall within the scope of the present invention. Alternatively, control computer 20" may include one or more equations, either continuous or piece-wise continuous, or graphs relating PLOAD to VM and $F_G$.

Figure 9:
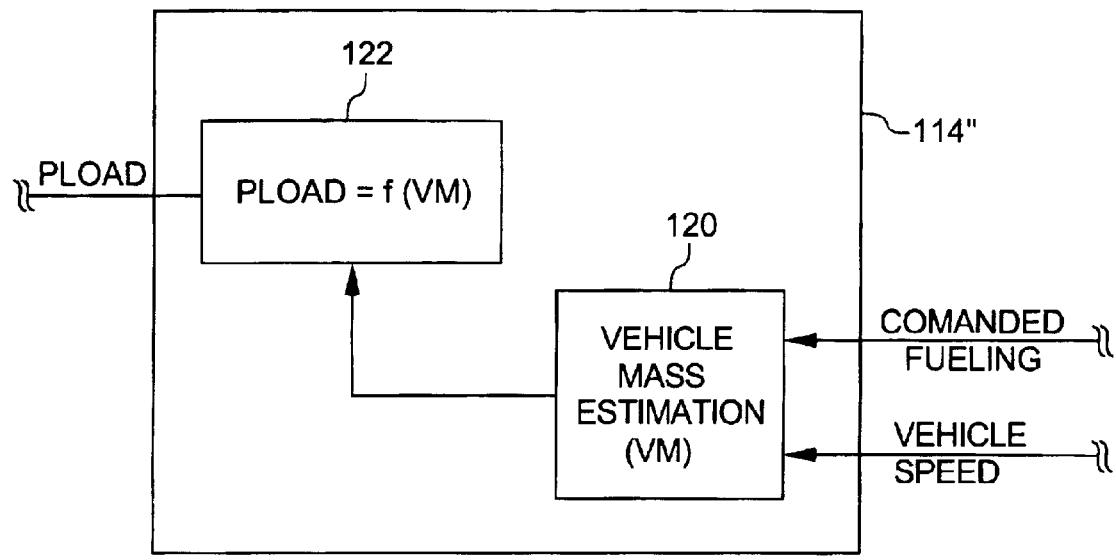
FIG. 9 is a diagrammatic illustration of another embodiment of the PLOAD calculation block of FIG. 7, according to the present invention.

Referring now to FIG. 9, an alternative embodiment 114" of the PLOAD calculation block 114 of FIG. 7, is shown in accordance with the present invention. Within block 114", a vehicle mass estimation block 120 receives the commanded fuel and vehicle speed signals and produces an estimated vehicle mass value VM at an output thereof. In one embodiment, the VM value is computed in accordance with Newton's second law which relates vehicle driving force to vehicle mass and vehicle acceleration via the equation F=ma, wherein "F" is the vehicle driving force, "m" is the vehicle mass and "a" is the vehicle acceleration. In this embodiment, vehicle driving force is preferably determined from commanded fuel values by relating commanded fuel to expected output torque values based on known engine specifications. Vehicle acceleration "a" is preferably determined as a difference in vehicle speed over a given time interval, so that the estimated vehicle mass is preferably determined by block 120 according to the equation:

$$m = (\Delta F * \Delta t)/\Delta VS \qquad (2),$$

wherein VS is the vehicle speed. The present invention contemplates that other known techniques may alternatively be used to estimate vehicle mass, wherein such techniques may be based on any of the engine/vehicle operating parameters discussed herein and/or on other engine/vehicle operating parameters commonly available to control computer 20" as is known in the art. In any event, the estimated vehicle mass value VM is preferably provided to a mapping block 122 that is operable to map the vehicle mass value VM to a pseudo-load value PLOAD. In one embodiment, memory 42 preferably includes a number of vehicle mass values stored therein, wherein block 122 is operable to map the estimated vehicle mass value VM to an appropriate one of the number of vehicle mass values stored within memory 42. For example, memory 42 may include three vehicle mass values m1, m2 and m3, each having a greater mass value than the previous value, stored therein. If the estimated vehicle mass, m, is less than or equal to m1, block 122 is operable to set PLOAD=PL1. Likewise, if the estimated vehicle mass, m, is greater than or equal to m3, block 122 is operable to set PLOAD=PL3. If the estimated vehicle mass, m, is between m1 and m3, block 122 is operable to set PLOAD=PL2. In an alternative embodiment, block 122 is omitted and the estimated vehicle mass value VM is provided as the PLOAD value at the output of block 114.

Those skilled in the art will recognize that while block 114" of FIG. 9 has been shown and described as operable to estimate vehicle mass, based on current vehicle acceleration and applied driving force, block 114" may alternatively be configured to estimate either of the remaining operating parameters of the equation F=ma. For example, if the vehicle mass is known, or is otherwise estimated, PLOAD may be provided by block 114" as an estimated vehicle acceleration parameter based on current vehicle mass and applied driving force. As another example, if the vehicle mass is known or otherwise estimated, PLOAD may be provided by block 114" as an estimated driving force parameter based on current vehicle mass and current vehicle acceleration. In any case, it should be apparent that the PLOAD value is a measure of the current vehicle load conditions, which conditions are generally dictated at any instant of time by total vehicle weight, current road grade conditions and other vehicle/engine operating conditions.

Figure 10:
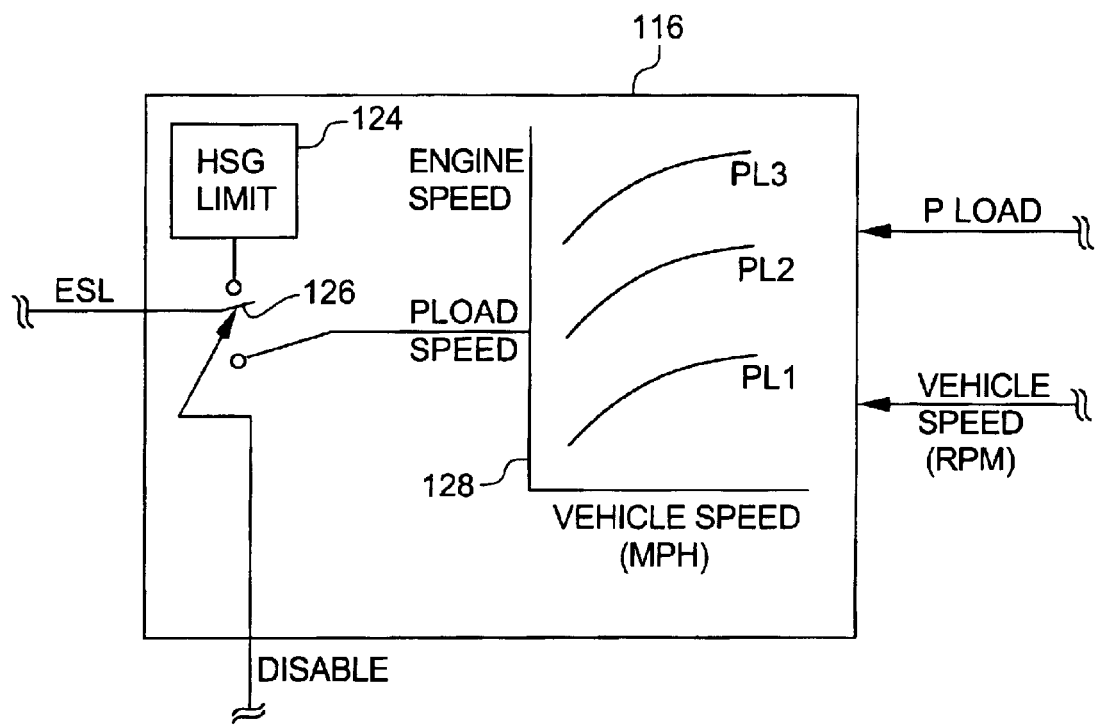
FIG. 10 is a diagrammatic illustration of one embodiment of the RPM calculation block of FIG. 7, according to the present invention.

Referring now to FIG. 10, one embodiment of the RPM limit calculation block 116 of FIG. 7, in accordance with the present invention, is shown. Preferably, memory 42 includes a number of engine speed values stored therein as a function of PLOAD values and vehicle speed values. One technique for storing such values is illustrated in FIG. 10 in graphical form wherein a number of PLOAD waveforms are plotted against vehicle speed and engine speed. Depending upon the PLOAD value provided thereto by block 114' or 114" and the current vehicle speed, a control computer 20" determines a desired engine speed value therefrom and provides this value as a PLOAD speed value. In the example illustrated in FIG. 10, three such PLOAD waveforms, PL1, PL2 and PL3, are provided which correspond to the three PLOAD values PL1, PL2 and PL3 described in accordance with the various embodiments of block 114. Thus, if PLOAD is set to PL2 for example, the PL2 waveform that corresponds to the current vehicle speed is used to choose an appropriate engine speed value. Alternatively, the estimated vehicle mass value VM may be provided as the PLOAD input to block 116 wherein control computer 20" is operable to interpolate between the various PLOAD waveforms to choose an appropriate engine speed value. Another technique for storing engine speed values within memory 42 is to provide a three-dimensional table that maps discrete PLOAD and vehicle speed values to desired engine speed values. Alternatively, memory 42 may have a continuous or piecewise continuous equation stored therein, wherein control computer 20" is operable to compute a desired engine speed value based on current vehicle speed and PLOAD value. In any case, block 116 is preferably operable to provide the desired engine speed limit value as PLOAD speed to one end of a switch 126.

Block 116 also includes a high speed governor limit block 124, preferably identical to block 54 of FIG. 7, which provides a governor limit engine speed value GL to an opposite end of switch 126. An output of switch 126 provides the engine speed limit value ESL to MIN block 110 (FIG. 7). Switch 126 is controlled by the disable signal produced by block 62 so that block 116 provides the HSG limit value GL as the engine speed limit value ESL to MIN block 110 when the disable signal is present. The MIN block 110 is accordingly operable to provide the minimum of the GL and REQ values as the engine speed reference value REF. If, however, the disable signal is not present, switch 126 is controlled so that block 116 provides PLOAD speed as the engine speed limit value ESL to MIN block 110. MIN block 110 is accordingly operable to provide the minimum of the GL, REQ and ESL values as the engine speed reference value REF. It is to be understood that switch 126 is preferably not a physical switch but rather a "software switch" in the sense that control computer 20" is operable to provide either the GL or PLOAD speed values as the ESL value depending upon the status of the disable signal, as is known in the art.

Figure 11:
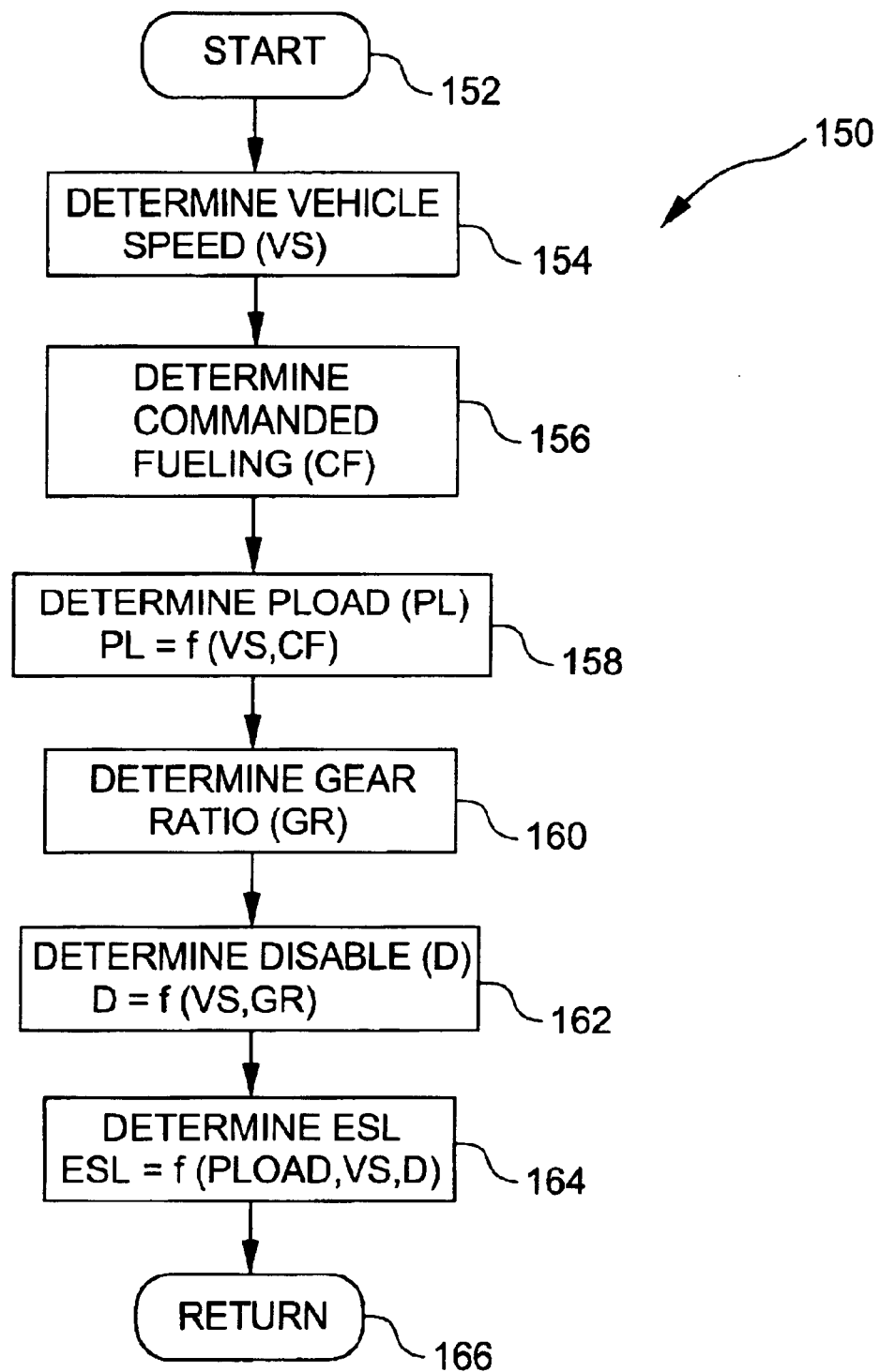
FIG. 11 is a flowchart illustrating one embodiment of a software algorithm for controlling engine operation with the system illustrated in FIGS. 2 and 7, in accordance with the present invention.

Referring now to FIG. 11, a flowchart is shown illustrating one preferred embodiment of a software algorithm 150 for producing the ESL value as described above with respect to FIGS. 7–10. Preferably, algorithm 150 is stored within memory portion 42 (FIG. 2) and is executable by control computer 20" many times per second as is known in the art. Algorithm 150 starts at step 152 and at step 154, control computer 20" determines a current vehicle speed value VS, preferably by processing the vehicle speed signal on signal path 33 as is known in the art. Thereafter at step 156, control computer 20" is operable to determine a commanded fueling value CF, preferably as described hereinabove. Algorithm execution continues from step 156 at step 158 where control computer 20" is operable to determine a pseudo-load value PL, preferably as a function of at least the commanded fuel signal on signal path 46 and the vehicle speed signal on signal path 33, in accordance with any of the techniques described hereinabove.

Algorithm execution continues from step 158 at step 160 where control computer 20" is operable to determine a presently engaged gear ratio GR, preferably as a ratio of the vehicle speed and engine speed values VS and ES respectively as is known in the art. Thereafter at step 162, control computer 20" is operable to determine a disable signal D, preferably as a function of vehicle speed VS and gear ratio GR as described hereinabove. Algorithm execution continues from step 162 at step 164 where control computer 20" is operable to determine an engine speed limit value ESL, preferably as a function of PLOAD, VS and D, as described hereinabove. Thereafter at step 166, algorithm execution is returned to its calling routine. Alternatively, step 164 may loop back to step 15 for continual operation of algorithm 150.

Figure 12:
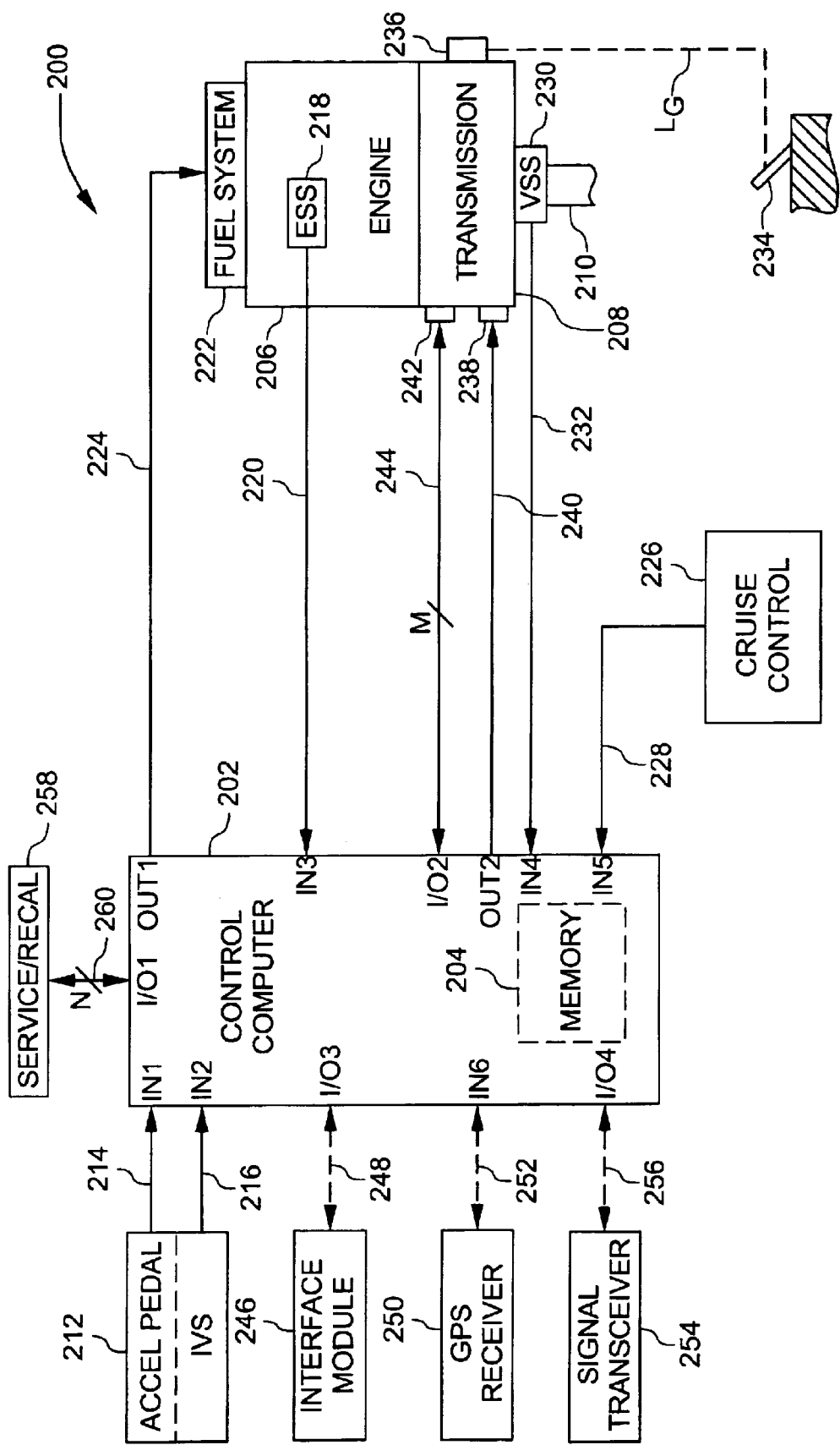
FIG. 12 is a diagrammatic illustration of an alternate embodiment of a system for controlling engine operation in accordance with the present invention.

Referring now to FIG. 12, an alternate embodiment of a system 200 for controlling engine operation, in accordance with the present invention, is shown. Central to system 200 is a control computer 202 which interfaces with various engine and/or vehicle components as will be discussed more fully hereinafter. Control computer 202 is preferably microprocessor-based and includes at least a memory portion 204, digital I/O and a number of analog-to-digital (A/D) inputs. The microprocessor portion of control computer 202 runs software routines and manages the overall operation of system 200 and the memory portion 204 of control computer 202 may includes ROM, RAM, EPROM, EEPROM, FLASH memory and/or any other memory known to those skilled in the art. Memory portion 204 may further be supplemented by external memory connected thereto (not shown).

An internal combustion engine 206 is operatively connected to a main transmission 208 as is known in the art. A propeller shaft, or tailshaft, 210 extends from transmission 208, whereby transmission 208 is operable to rotatably actuate propeller shaft 210 and thereby provide driving power to one or more vehicle wheels via a drive axle (not shown) as is known in the art. System 200 may further include, particularly as is known in the heavy duty tractor truck art, one or more auxiliary transmissions and interconnecting propeller shafts (not shown), power take off (PTO) devices, and/or other known drivetrain components.

A number of sensors and actuators permit control computer 202 to interface with some of the various components of system 200 as well as other vehicle and/or engine systems. For example, engine 206 includes an engine speed sensor 218, which is electrically connected to input IN3 of control computer 202 via signal path 220. Engine speed sensor 218 is preferably a known Hall-effect device operable to sense speed and/or position of a toothed gear rotating synchronously with the engine crankshaft. However, the present invention contemplates using any known engine speed sensor 218, such a variable reluctance sensor or the like, which is operable to sense engine rotational speed and provide a signal to control computer 200 corresponding thereto.

A vehicle speed sensor 230 is preferably positioned about propeller shaft 210 adjacent to transmission 208, and is electrically connected in input IN4 of control computer 202 via signal path 232. Vehicle speed sensor 230 is preferably a variable reluctance sensor operable to sense rotational speed of propeller shaft 210 and provide a vehicle speed signal to control computer 202 corresponding thereto. While vehicle speed sensor 230 is shown in FIG. 12 as being located adjacent to transmission 208, it is to be understood that sensor 230 may alternatively be located anywhere along propeller shaft 210. Moreover, the present invention contemplates using any other known vehicle speed sensor operable to provide control computer 202 with a vehicle speed signal indicative of vehicle road speed.

Control computer 202 further includes an I/O port I/O1 that is configured to interface with a known service/recalibration tool 258 via signal path 260. Tool 258 is operable, as is known in the art, to exchange information with control computer 202, wherein such data may include, but is not limited to, calibration/recalibration information such as fueling maps and the like, trip or other accumulated engine/vehicle operational data, fault/diagnostic data and/or other engine control data. Signal path 260 is preferably a multiple-wire serial data link whereby control computer 202 may communicate with tool 258 according to a known communications protocol, such as SAE J1587, SAE J1939 or the like, although those skilled in the/art will recognize that signal path 60 may alternatively include any number of wires whereby control computer 202 may communicate with tool 258 according to any desired communications protocol.

System 200 further includes a fueling system 222, which is electrically connected to output OUT1 of control computer 202 via signal path 224. Fueling system 222 is responsive to fueling signals provided by control computer 202 on signal path 224 to supply fuel to engine 206 as is known in the art.

An accelerator pedal preferably includes an accelerator pedal position or deflection sensor 212 that is electrically connected to input IN1 of control computer 202 via signal path 214. Sensor 212 is, in one preferred embodiment, a potentiometer electrically connected to a suitable voltage and having a wiper that is electrically connected to signal path 214 and mechanically connected to the accelerator pedal so that the voltage on signal path 214 corresponds directly to the position, or deflection, of the accelerator pedal. The present invention further contemplates that sensor 212 may alternatively be any known sensor operatively associated with the accelerator pedal to provide one or more analog and/or digital signals corresponding to accelerator pedal position or pressure applied to the pedal. In any event, such a sensor is operable to provide control computer 202 with an accelerator pedal signal indicative of driver requested torque. The accelerator pedal further preferably includes an idle validation switch (IVS) that is electrically connected to input IN2 of control computer 202 via signal path 216. IVS may alternatively be replaced with a suitable sensor or other electrical component, the importance of any such switch, sensor or component lying in its ability to distinguish between an undeflected accelerator pedal (e.g., 0% throttle) and a deflected accelerator pedal (e.g., greater than 0% throttle) and provide a signal corresponding thereto to input IN2 of control computer 202.

Transmission 208 may be any known manual, manual/automatic, automatic, semiautomatic or automated manual transmission having one or more manually selectable gear ratios associated therewith, or may alternatively be a continuous variable transmission (CVT) controllable as is known in the art to establish effective gear ratios. In the event that transmission 208 is a manual, manual/automatic, semiautomatic or automated manual transmission, such a transmission 208 preferably includes a mechanical input 236 coupled, via mechanical linkage $L_G$, to a gear shift lever 234 which is actuatable by the vehicle operator to thereby select the various manually selectable gear ratios. If transmission 208 is a manual/automatic, semiautomatic or automated manual transmission, it further includes a number of automatically selectable gear ratios. In this case, system 200 further preferably includes an automatic shifting mechanism 238 electrically coupled to control computer 202 via a number of signal paths 240. Automatic shifting mechanism 238 includes, in one embodiment, a number of electronically actuatable shift solenoids that are controlled by control computer 202 via an appropriate number of signal lines 240, as is known in the art, to thereby effectuate automatic shifting of a number of automatically selectable gears of manual/automatic transmission 208. Alternatively, the manual/automatic transmission 208 may omit the automatic shifting mechanism 238, and instead include a transmission control module 242 electrically connected to an input/output port I/O2 of control computer 202 via a number, M, of signal paths, wherein M may be any positive integer. Module 242 includes an auxiliary control computer, preferably microprocessor-based, and is operable to control shifting of the automatically selectable gear ratios of transmission 208 based on information shared with control computer 202, as is known in the art. Alternatively still, transmission 208 may be a known fully automatic transmission, wherein transmission control module 242 is operable to control shifting in the automatically selectable gear ratios as just described and as known in the art, or may instead be a CVT capable of achieving a continuously variable "effective" gear ratio, wherein transmission control module 242 is operable to control transmission 208 in a known manner to establish a desired effective gear ratio thereat.

System 200 further optionally includes an interface module 246 electrically connected to an input/output port I/O3 via signal path 248 (shown in phantom), wherein signal path 248 may include any number of signal conduction paths and wherein control computer 202 may be configured to communicate with module 248 according to any desired communications protocol. Module 246 is, in one embodiment, a passive monitor operable to display textual and/or graphical information provided thereto by control computer 202. Alternatively, module 246 includes such a display, a module auxiliary computer, preferably microprocessor-based, operable to communicate with control computer 202 via signal path(s) 248, and a keypad or an equivalent mechanism for inputting data to the module auxiliary computer. In this embodiment, module 246 is operable to display information provided thereto by control computer 202, and to also provide information back to control computer 202, including information generated at the keypad or other data input mechanism, via signal path(s) 248. An example of one such interface module of the latter type is described in U.S. Pat. No. 5,163,303 to Ebaugh et al., which is assigned to the assignee of the present invention, and the contents of which are incorporated herein by reference.

System 200 further optionally includes a global positioning system (GPS) receiver 250 operable to receive geographical coordinate data relating to a present location of receiver 250 from a number of earth-orbiting satellites, as is known in the art. The geographical coordinate data may include, for example, latitudinal, longitudinal and altitudinal coordinates, as well as time of day information. In any case, receiver 250 is operable, in one embodiment, to supply any combination of the raw geographical coordinate data to input IN6 of control computer 202 via signal path 252 (shown in phantom), whereby control computer 202 is thereafter operable to convert the raw geographical coordinate data to useful geographical location data in accordance with known techniques. Alternatively, receiver 250 may include signal processing capability whereby receiver 250 is operable to receive the raw geographical coordinate data, convert this data to useful geographical location data, and provide such data to control computer 202 via signal path 252. Alternatively still, the present invention contemplates that the interface module 246 may be configured to include the GPS receiver 250, whereby module 246 is operable to supply control computer 202 with either the raw geographical coordinate data or the actual geographical location data.

System 200 further optionally includes a signal transceiver 254 that is electrically connected to an input/output port I/O4 of control computer 202 via signal path 256 (shown in phantom), wherein signal path 256 may include any number of signal conduction paths. In one embodiment, transceiver 254 is a cellular telephone transceiver, whereby control computer 202 is operable to communicate with a remote location via a cellular network, as is known in the art. Alternatively, signal transceiver 254 may be a radio frequency transceiver, whereby control computer 202 is operable to communicate with a remote location via a radio or microwave frequency link. It is to be understood that the present invention contemplates that the signal transceiver 254 may alternatively be any signal transceiver capable of conducting one or two-way communications with a remote source via a wireless communication link.

System 200 further includes a cruise control system 226 electrically connected to input IN5 of control computer 202 via signal path 228. Cruise control system 226 is of known construction, and those skilled in the art will recognize that signal path 228 may include any number of signal conduction paths, whereby cruise control system 226 may effectuate conventional cruise control functions such as cruise on/off, set/coast, resume/accelerate, and the like.

Figure 13:
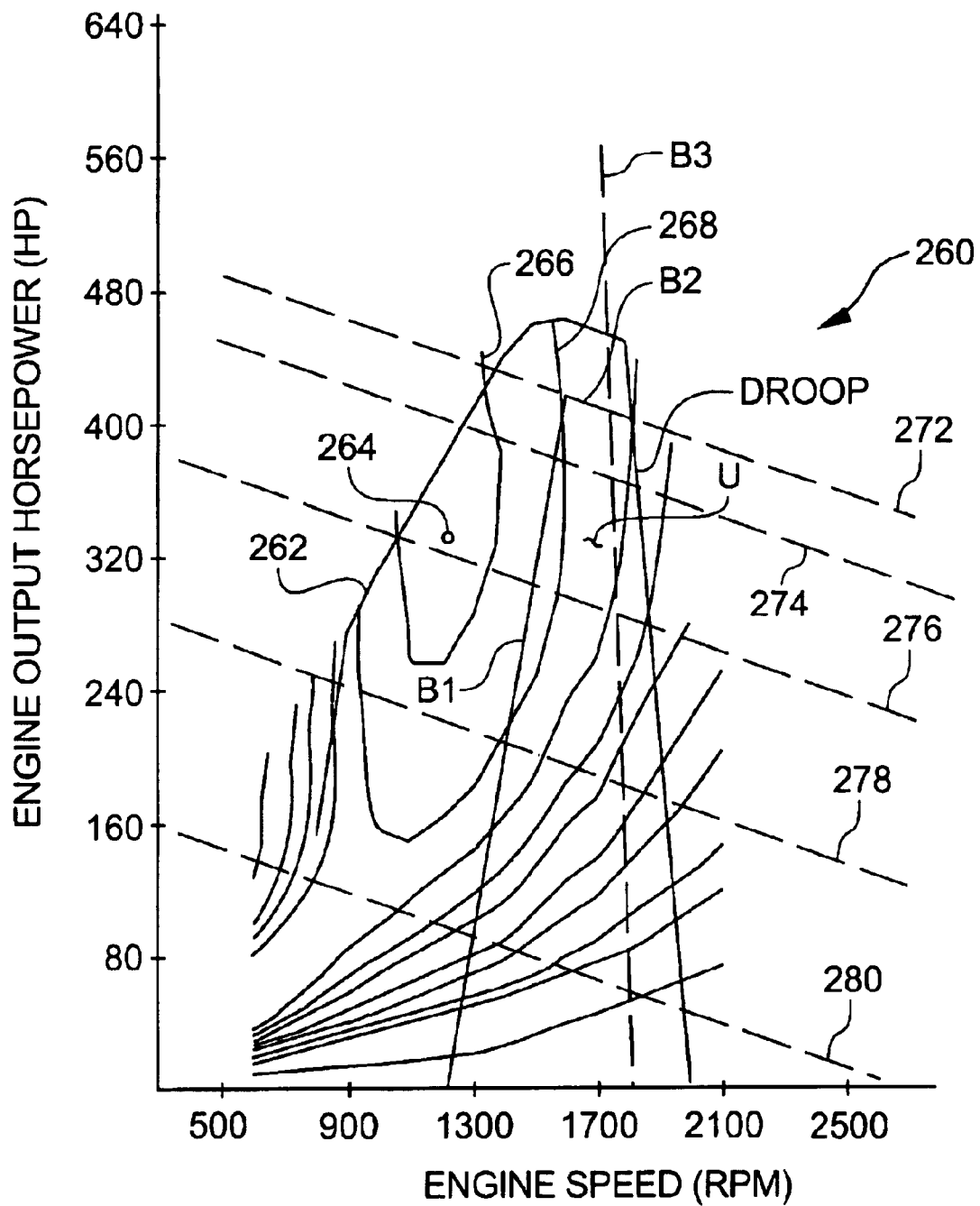
FIG. 13 is a plot of engine output power vs. engine speed illustrating an engine control strategy in accordance with the present invention using the system of FIG. 12.

Referring now to FIG. 13, another technique for controlling an internal combustion engine, in accordance with the present invention, will be described in detail, wherein FIG. 13 shows one example of a typical engine output horsepower curve 262 vs. engine speed. In the example shown, engine output horsepower increases rapidly to a peak horsepower at approximately 1500 RPM. Thereafter, the engine output horsepower decreases slightly with increasing engine RPM until engine speed reaches a "rated" or "governed" speed (approximately 1800 RPM in the example shown), wherein rated or governed speed corresponds to an engine speed at which the engine output horsepower characteristics achieve an advertised output horsepower. Thereafter, engine output horsepower drops sharply to zero in a region typically referred to as a "DROOP" region. As is known in the art, horsepower curve 262 typically forms part of the engine calibration software stored in memory 204 and executable by control computer 202.

Superimposed onto the engine output horsepower vs. engine speed curve 262 are a number of Brake Specific Fuel Consumption (BSFC) contours, wherein the areas between each such BSFC contours define so-called BSFC islands. Generally, BSFC contour 264 corresponds to an engine output horsepower/engine speed point (or range) where the engine 206 operates most efficiently; i.e., wherein the best fuel economy is achieved. The BSFC island defined between BSFC contours 264 and 266 corresponds to an engine output horsepower/engine speed range in which the engine 206 operates with less efficiency than at BSFC contour 264 yet with better efficiency than at engine horsepower/engine speed conditions outside this island. Similarly, the BSFC island defined between BSFC contour 266 and 268 corresponds to an engine output horsepower/engine speed range in which the engine 206 operates with less efficiency than within the island defined between BSFC contours 264 and 266, and so on.

Also superimposed onto the engine horsepower vs. engine speed curve 262 are a number of constant throttle or engine load lines. For example, line 272 corresponds to approximately 90% throttle or alternatively 90% engine load, wherein the term "throttle" is defined for the purpose of the present description as operator requested torque and engine load is defined as a ratio of commanded fueling and maximum commandable fueling. In other words, line 272 defines engine horsepower/engine speed conditions wherein throttle or alternatively engine load is constant at approximately 90%. Similarly, line 274 corresponds to approximately 80% throttle/engine load, line 276 corresponds to approximately 60% throttle/engine load, line 278 corresponds to approximately 40% throttle/engine load and line 280 corresponds to approximately 20% throttle/engine load.

In accordance with the present invention, a number of engine load/engine speed (load/speed) boundaries are defined in relation to curve 262 to form a region "U" of undesirable engine operation, whereby control computer 202 is operable to control the operation of engine 206, particularly while upshifting through at least some of the gear ratios of transmission 208, to thereby maintain or encourage engine operation outside of the undesirable engine operation region U. For example, region U may be defined as the region surrounded by boundary B1, boundary B2 and the DROOP region of horsepower curve 262. Alternatively, region U may be defined as the region surrounded by boundaries B1, B2 and B3 (shown in phantom). The present invention contemplates defining other regions U within and/or including horsepower curve 262, and by using a control strategy of the type just described, the operation of engine 206, in relation to engine output horsepower curve 262, may be optimized to thereby achieve fuel efficiency goals. It is to be understood that such a control strategy may alternatively be used to control the operation of engine 206 in relation to an engine output torque vs. engine speed curve, wherein engine output torque is related to engine output horsepower as is well known in the art, and that such alternate control is intended to fall within the scope of the present invention. Hereinafter, the engine output horsepower vs. engine speed curve 262 and/or the related engine output torque vs. engine speed curve may broadly be referred to as an "engine output characteristics map" for the purposes of the present invention. Those skilled in the art will thus understand that the present invention is directed to controlling the operation of engine 206 in relation to an engine output characteristics map.

In accordance with the present invention, the number of boundaries may be variable and may be defined according to a number of preferred techniques as will be described in greater detail hereinafter. Similarly, control of engine 206 to maintain or encourage operation outside of the undesirable engine operating region U may be accomplished according to a number of preferred techniques, and a number of preferred operating or other conditions may be recognized by control computer 202 to temporarily override such control, all of which will be described in greater detail hereinafter. In any case, the present invention also contemplates a number of techniques for establishing or defining the number of boundaries. For example, such boundaries may form part of an original engine calibration whereby such boundaries are stored in memory 204 of control computer 202. Preferably, the boundaries residing in memory 204 may thereafter be adjusted or "trimmed" via service/recalibration tool 258. Alternatively, the boundaries may be established or defined entirely via service/recalibration tool 258, whereby such boundaries are stored in memory 204. Alternatively still, the boundaries may be established/defined and/or modified as a function of external information, such as GPS receiver 252, signal transceiver 254, and the like, as will be more fully described hereinafter.

Figure 14:
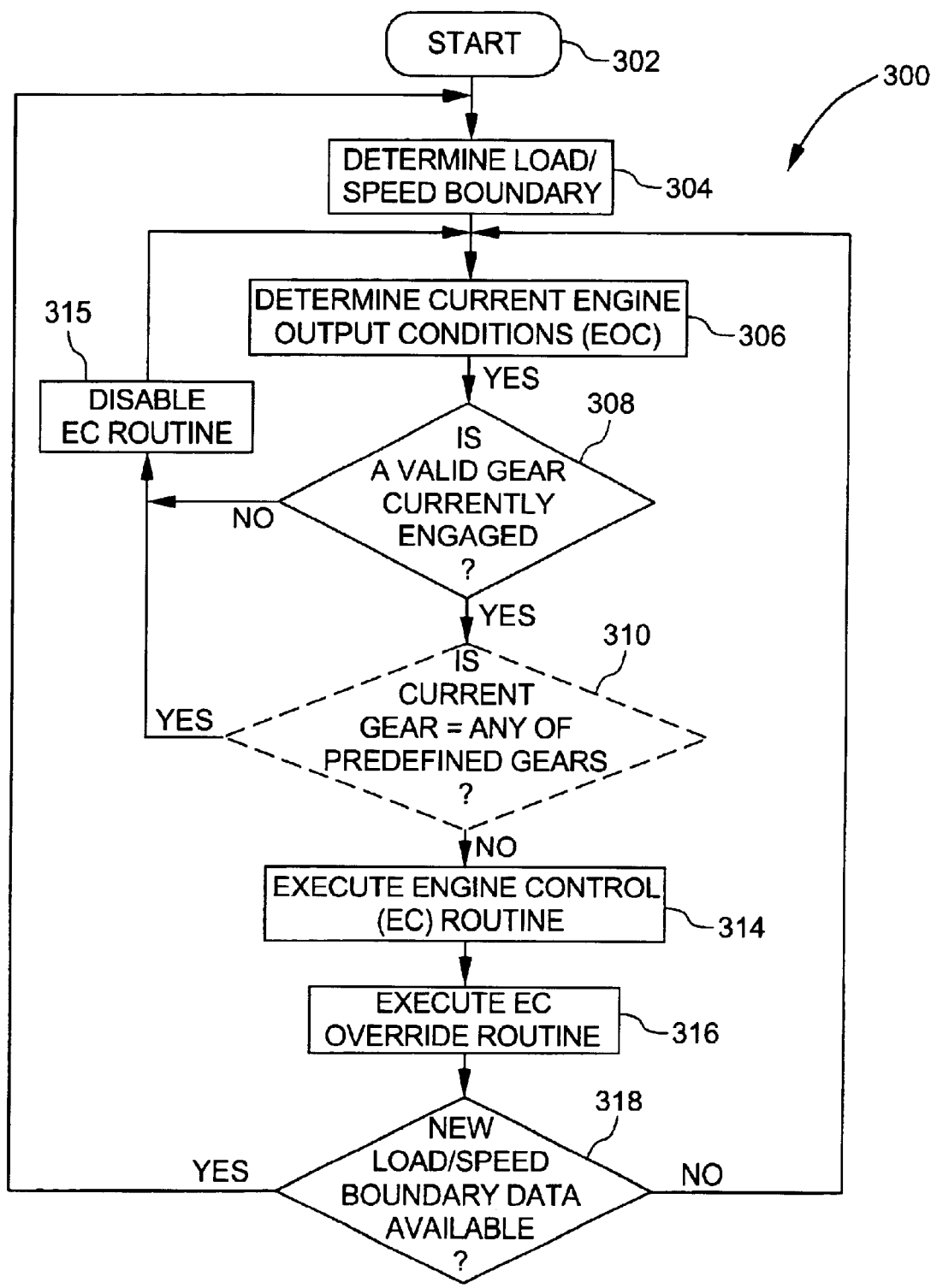
FIG. 14 is a flowchart illustrating one embodiment of a software algorithm for controlling engine operation with the system illustrated in FIG. 12 to achieve the strategy illustrated in FIG. 13.

Referring now to FIG. 14, one preferred embodiment of a software algorithm 300 for controlling engine operation, in accordance with the present invention, is shown. Algorithm 300 preferably exists as one or more software routines in memory 204 and is executable by control computer 202 many times per second as is known in the art. Algorithm 300 begins at step 302, and at step 304 control computer 304 is operable to determine a number of load/speed boundaries so as to define an undesired engine operation region U as shown by example in FIG. 13. The present invention contemplates a number of preferred strategies for executing step 304 and determining such load/speed boundaries, some of which are set forth in the flow diagram of FIG. 15.

Figure 15:
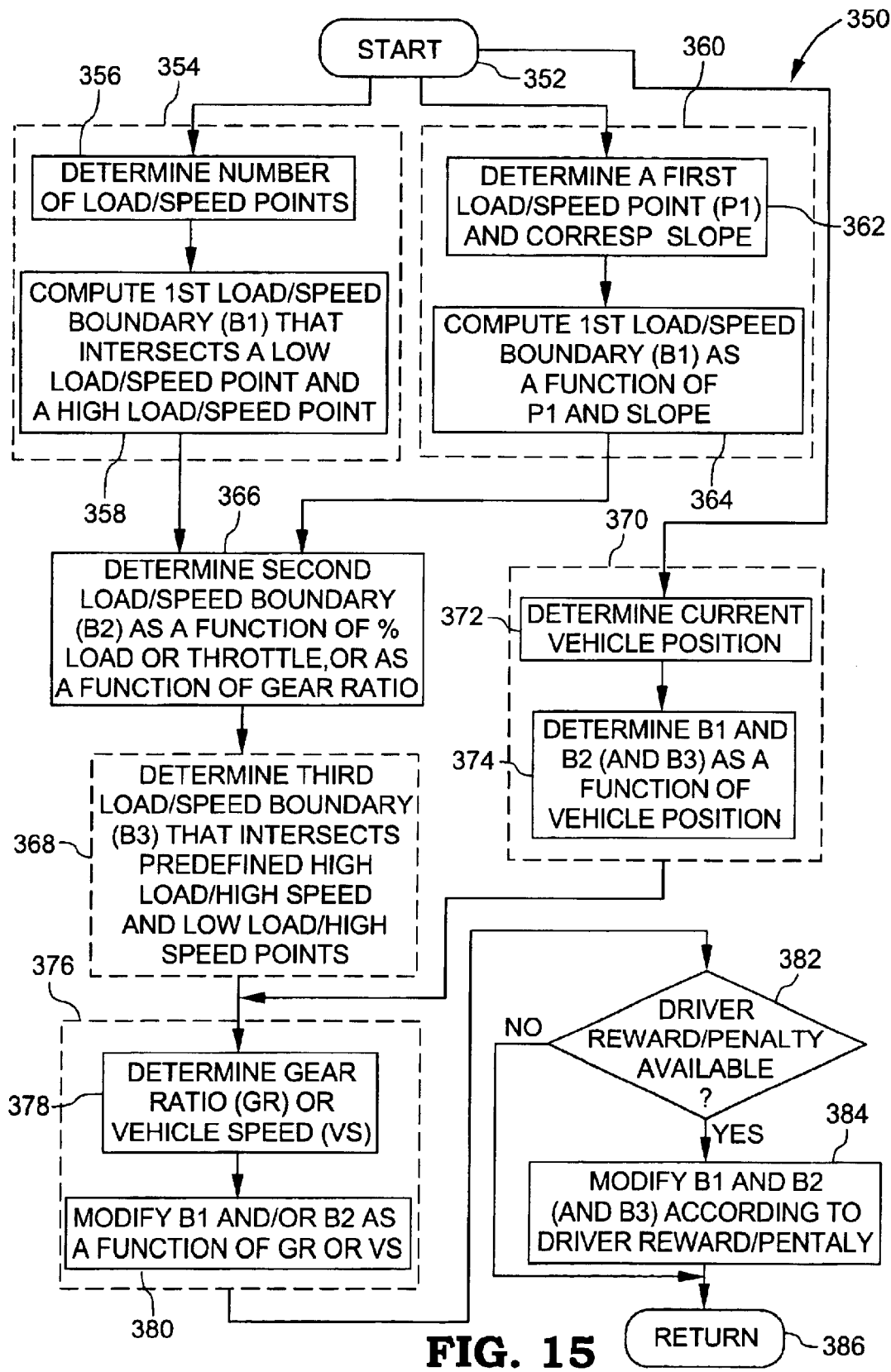
FIG. 15 is a flowchart illustrating a number of preferred embodiments of a software routine for executing step 304 of FIG. 14.
Figure 16:
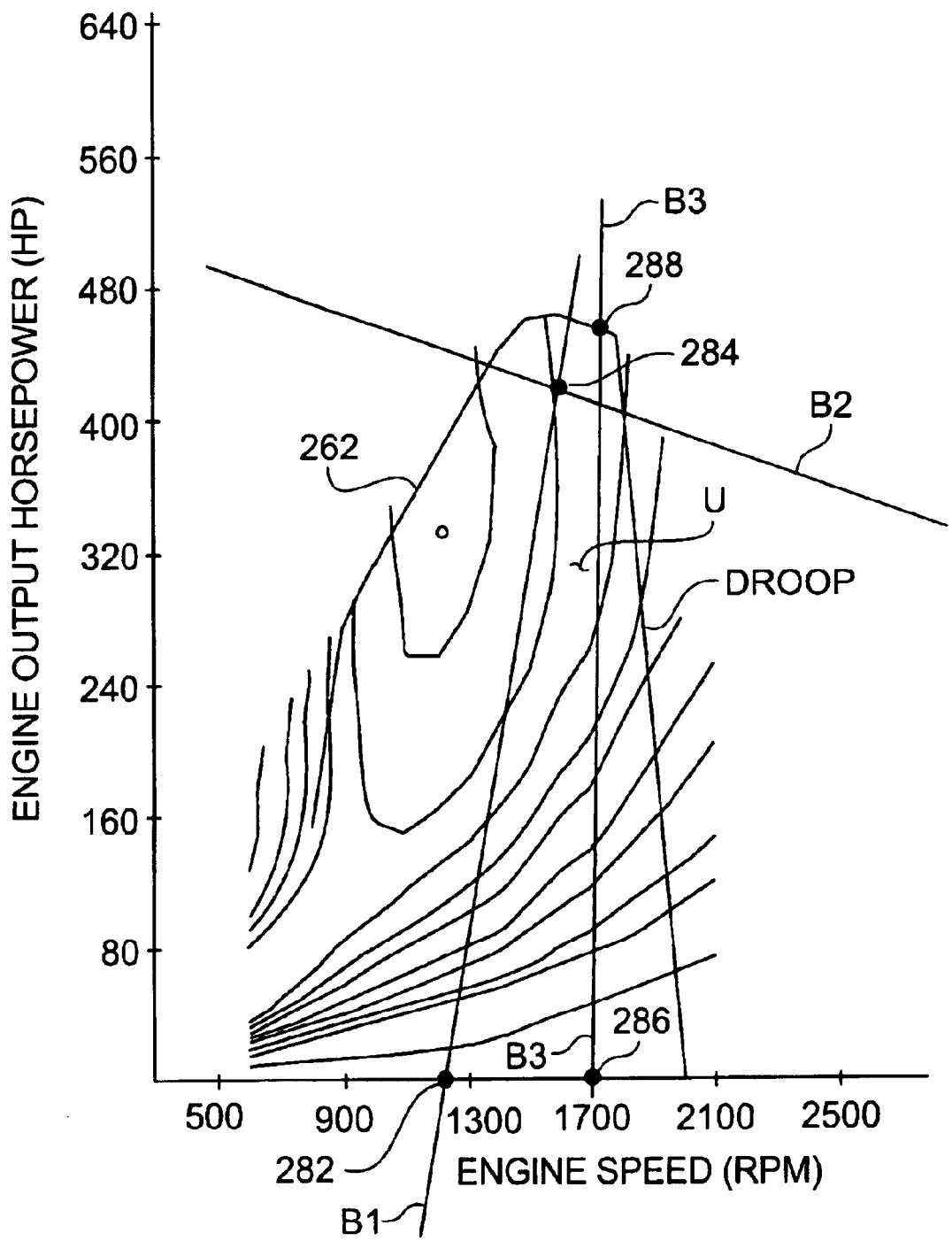
FIG. 16 is a plot of engine output power vs. engine speed illustrating some of the techniques detailed in the flowchart of FIG. 15.

Referring now to FIG. 15, one preferred embodiment of a software algorithm 350 for executing step 304 of algorithm 300, in accordance with the present invention, is shown. In describing the techniques set forth in FIG. 15, reference will be made to the engine output horsepower vs. engine speed diagram set forth in FIG. 16. The diagram of FIG. 16, although somewhat simplified, includes the same horsepower curve 262 and BSFC contours as that of FIG. 13. In any case, algorithm 350 begins at step 352, and in accordance with one preferred embodiment of algorithm 350, branches to the process box 354 shown in phantom. Process box 354 includes step 356 wherein control computer 202 is operable to determine a number of load/speed points. In one embodiment, such load/speed points are stored in memory 204, wherein such points may be programmed by an engine manufacturer and may or may not be adjustable by a user via service/recalibration tool 258. Alternatively, such load/speed points may be input via interface module 246. In any case, algorithm execution continues from step 356 at step 358 where control computer 202 is operable to compute load/speed boundary B1 as a function that intersects a low load/speed point and a high load/speed point. For example, with reference to FIG. 16, boundary B1 is shown as a straight line that intersects low load/speed point 282 and high load/speed point 284. It is to be understood that while FIG. 16 illustrates the low load/speed point 282 as a 0% load point/arbitrary speed point and the high load/speed point as approximately a 90% load point/arbitrary speed point, the present invention contemplates choosing any alternate low load/speed and high load/speed points to define boundary B1. Moreover, it should also be understood that while boundary B1 is illustrated in FIG. 16 as a straight line, the present invention contemplates that B1 may be any desired function that intersects points 282 and 284, and that more points may be included to further define any such function.

In an alternative embodiment of algorithm 350, process box 354 is omitted in lieu of process box 360 (also shown in phantom). Process box 360 includes step 362 wherein control computer 202 is operable to determine a first load/speed point and a corresponding slope. In one embodiment, such load/speed point and slope data are stored in memory 204, wherein such data may be programmed by an engine manufacturer and may or may not be adjustable by a user via service/recalibration tool 258. Alternatively, such data may be input via interface module 246. In any case, algorithm execution continues from step 362 at step 364 where control computer 202 is operable to compute load/speed boundary B1 as a function of the load/speed point and corresponding slope information determined at step 362. Alternative process box 360 is thus included to provide an alternative technique for determining B1 in the case where B1 is a straight line. With reference to FIG. 16, straight line B1 may accordingly be defined as a function of point 282 and a corresponding slope, as a function of point 284 and a corresponding slope, or a function of any point along B1 and a corresponding slope.

With boundary B1 determined according to either of the process boxes 354 or 360, algorithm execution continues at step 366 where control computer 202 is operable, in one embodiment, to determine a second load/speed boundary B2. In one embodiment, B2 is defined as a function of either percent engine load or percent throttle. For example, as shown in FIG. 16, B2 may set equal to a desired engine load/throttle % such as 90%. It is to be understood, however, that the present invention contemplates that B2 may be defined as other functions of engine load/throttle percentage. Alternatively, control computer 202 may be operable at step 366 to determine load/speed boundary B2 as a function of currently engaged gear ratio, wherein control computer 202 is operable to determine the currently engaged gear ratio via one or more known techniques. As an example, control computer 202 may be operable at step 366 to set boundary B2 at a first engine load or throttle percentage value (e.g., 70%) for the lowest gear of transmission 208, and at successively higher engine load or throttle percentage values for the higher gears of transmission 208. It is to be understood, however, that the present invention contemplates that control computer 202 may be operable at step 366 of this embodiment to determine boundary B2 as any function of gear ratio (or alternatively still as a function of vehicle speed). In any case, boundary B2 is positioned relative to horsepower curve 262 such that it intersects boundary B1 as shown in FIG. 16.

In one preferred embodiment, the DROOP region of horsepower curve 262 defines the remaining boundary of the undesirable engine operation region U. Alternatively, algorithm 350 may include step 368 (shown in phantom), wherein control computer 202 is operable to determine a third load/speed boundary B3 that intersects a high load/high speed point and a low load/high speed point. For example, with reference to FIG. 16, boundary B3 is shown as a straight line that intersects high load/high speed point 288 and low load/high speed point 286. It is to be understood that while FIG. 16 illustrates the high load/high speed point 288 as residing on the horsepower curve 262 and the low load/high speed point as a 0% load point/arbitrary speed point, the present invention contemplates choosing any alternate high load/high speed and low load/high speed points to define boundary B3. Moreover, it should also be understood that while boundary B3 is illustrated in FIG. 16 as a straight line, the present invention contemplates that B3 may be any desired function that intersects points 286 and 288, and that more points may be included to further define any such function. Alternatively still, and in the case where B3 is intended to be a straight line, control computer 202 may be operable at step 368 to determine B3 as a function of a single load/speed point and associated slope.

In still another alternative embodiment of algorithm 350, process boxes 354, 356, 366 and 368 may be omitted in lieu of, or be supplemented by, process box 370 (also shown in phantom). Process box 370 includes step 372 wherein control computer 202 is operable to determine a current vehicle position. In one embodiment, control computer 202 is operable to determine current vehicle position via information received from GPS receiver 252. As described hereinabove, such information received from GPS receiver 252 may be either geographical position coordinates or data from which such coordinates can be determined. Alternatively, interface module 246 may include a GPS receiver and auxiliary computer operable to determine current vehicle position information and provide such information to control computer 202 via signal path 248. Alternatively still, one or more external systems in the proximity of the vehicle carrying system 200 may be operable to transmit information to control computer 202 (e.g., via signal transceiver 254) from which control computer 202 may determine, or at least estimate, current vehicle position. The present invention contemplates that other known position determining systems maybe used, either as part of system 200 or remote therefrom, to determine a current vehicle position for the purposes of step 372. In any case, algorithm execution continues from step 372 at step 374 where control computer 202 is operable to determine boundaries B1 and B2, and optionally B3, as a function of current vehicle position. In one embodiment, control computer 202 is operable to execute step 374 by comparing current vehicle position to geographical position data stored in memory, and defining boundaries B1 and B2, and optionally B3, as a function thereof. Alternatively, control computer may be operable at step 374 to transmit via signal transceiver 254 the current vehicle position to a remote computer, whereby the remote computer is operable to make appropriate boundary determinations based thereon and transmit either boundary information, or other information from which such boundary information can be determined, back to control computer 202 via signal transceiver 254. In any case, process box 370 provides for the ability to modify the location and shape of the undesirable engine operation region U relative to the horsepower curve 262 depending upon the current location of the vehicle. For example, fuel efficiency goals may be different depending upon the jurisdiction (e.g., country, state, county, etc.) in which the vehicle is traveling, the topography of the region (e.g., flat vs. hilly terrain) in which the vehicle is traveling, population density of the region (e.g., urban vs. rural) in which the vehicle is traveling, and the like. Process box 370 allows any such changing fuel efficiency goals to be met without interrupting vehicle operation.

Regardless of the manner in which boundaries B1 and B2, and optionally B3, are determined, algorithm 350 may further optionally includes process box 376 to which process box 368 or 370 advance. Process box 376 includes step 378 wherein control computer 202 is operable to determine a presently engaged gear ratio (GR) or a current vehicle speed (VS). The presently engaged gear ratio may be determined by any known means, such as via a ratio of engine speed and vehicle speed, for example, and vehicle speed is preferably determined via information provided by vehicle speed sensor 230. In any case, algorithm execution continues from step 378 at step 380 where control computer 202 is operable to modify boundaries B1 and/or B2 as a function of either the presently engaged gear ratio GR or current vehicle speed VS. In one embodiment, control computer 202 is operable at step 380 to downwardly adjust the location of boundary B2 toward the horizontal engine speed axis, and/or to rightwardly adjust the location of boundary B1 away from the vertical horsepower axis, as a function of GR or VS to thereby decrease the undesirable operation region U (and correspondingly expand the permissible engine operating region) when the need therefore exists in order to perform/complete certain gear shifting operations. For example, under some gear ratio and/or vehicle speed conditions, the optimal upshift point to the next higher gear may be located within region U near the existing B1 and/or B2 boundaries. Under such conditions, process box 376 provides for the ability to adjust B2 downwardly, or to adjust BL rightwardly, to thereby allow the pending upshift to be performed/completed at a predefined shift point. Those skilled in the art will recognize other gear ratio/vehicle speed-based conditions wherein alteration of the location and/or slope of either, or both, of B1 and B2 is desirable, and that B1 and/or B2 boundary alterations based on such conditions are intended to fall within the scope of the present invention.

Algorithm execution continues from process box 376 at step 382 wherein control computer 202 is operable to determine whether a driver reward or driver penalty is currently available. Preferably, a driver reward or penalty is determined as a function of the driver's operational history, and one example of a system for determining driver rewards/penalties is described in U.S. Pat. No. 5,954,617 to Horgan et al., which is assigned to the assignee of the present invention and the contents of which are incorporated herein by reference. In one embodiment, control computer 202 is operable to maintain driver reward/penalty information and therefore make an automatic determination at step 382 as to whether such a reward/penalty is available. Alternatively, interface module 246 may include an auxiliary computer operable to maintain driver reward/penalty information, wherein control computer 202 is operable at step 382 to determine whether a driver reward/penalty is available based on information supplied thereto from interface module 246. Alternatively still, in the case of a driver reward, such a reward, if available, may be invoked at will by the vehicle operator via selection of appropriate keys or buttons forming part of interface module 246. In such a case, control computer 202 is operable at step 382 to determine whether a driver reward is available based on information supplied thereto from interface module 246 as a result of any such vehicle operator action. In any case, if control computer 202 determines at step 382 that a driver reward or penalty is currently available, algorithm execution continues at step 384 where control computer 202 is operable to modify boundaries B1 and B2, and optionally B3, according to the driver reward or penalty. For example, if a driver reward is available, control computer 202 may be operable at step 384 to either move the location, or otherwise alter the shape/slope, of any one or more of the boundaries B1, B2 and B3, or to alternatively decrease the total area of region U, so as to provide the driver with an expanded engine operating range for some desired time period or traveling distance. Conversely, if a driver penalty is available, control computer 202 may be operable at step 384 to suitably alter the shape/location of any of B1, B2, B3 or to increase the total area of region U, so as to provide the driver with a restricted engine operating range for some desired time period or traveling distance. In either case, algorithm execution continues from step 384 and from the "no" branch of step 382 to step 386 where algorithm execution is returned to step 304 of algorithm 300 (FIG. 14).

Referring again to FIG. 14, algorithm 300 advances from step 304 to step 306 where control computer 202 is operable to determine current engine output conditions (EOC). The purpose of step 306 is to determine sufficient engine operating conditions that will allow for subsequent determination of current engine operating conditions relative to the undesirable engine operating region U; i.e., whether the engine is currently operating inside, outside or on a border, of region U. Accordingly, the present invention contemplates executing step 306 by determining any one or more of a number of engine operating conditions. For example, control computer 202 may be operable at step 306 to determine EOC by determining engine load or throttle percentage and engine speed. Alternatively, control computer 202 may be operable at step 306 to determine EOC by determining horsepower and engine speed. Alternatively still, control computer 202 may be operable at step 306 to determine EOC by determining horsepower and engine load or throttle percentage. Those skilled in the art will recognize that other combinations of engine operating conditions may be used to determine or infer EOC for the purpose of determining engine operating conditions relative to the undesirable engine operating region U, and that any such combinations are intended to fall within the scope of the present invention.

Algorithm execution continues from step 306 at step 308 where control computer 202 is operable to determine whether a valid gear ratio of transmission 208 is currently engaged. If not, algorithm execution advances to step 312 where control computer 202 disables any currently executing engine control (EC) routine. Algorithm execution loops from step 312 back to step 306. For the purposes of algorithm 300, control computer 202 may be operable at step 308 to determine the currently engaged gear ratio of transmission 208 in accordance with any known technique therefore including, but not limited to, computing a ratio of engine and vehicle speeds, receiving electronic information from transmission module 242 relating to gear ratio status, and the like. One purpose for including step 308 within algorithm 300 is to disable the engine control (EC) routine of the present invention whenever the engine 206 is not engaged with one of the existing gear ratios of transmission 208. Thus, for example, engine output power and speed are not limited, and full (default) engine output power and speed are therefore available, between the disengagement of any gear and subsequent engagement of a next gear, and under any other gear disengagement (i.e., neutral) conditions. Algorithm 300 may optionally include another gear ratio-based step 310 (shown in phantom) that is executed if control computer 202 determines at step 308 that a valid gear of transmission 208 is currently engaged. Specifically, control computer is operable at step 310 to determine if the valid gear that was determined to be currently engaged at step 308 is any of a number of predefined gears of transmission 208. If so, algorithm execution advances to step 312, and if not, algorithm execution advances to step 314. In one embodiment, the number of predefined gears in step 310 may be, for example, the top gear or top-2 gears (i.e., numerically lowest gear ratios), whereby control computer 202 is operable to disable the engine control (EC) routine of the present invention and provide full (default) engine output power and speed capability when the engine 206 is engaged only with the top transmission gear (e.g., $10^{th}$ gear of a 10-gear transmission) or alternatively with either of the top-2 gears of transmission 208 (e.g., $9^{th}$ or $10^{th}$ gear of a 10-gear transmission). Inclusion of step 310 recognizes that controlling engine output behavior in accordance with the present invention is most critical during upshifting through the transmission gears. Once top gear (e.g., $10^{th}$ gear) or so-called one gear down (e.g., $9^{th}$ gear) is reached, the engine output characteristics typically do not fall within, or on any of the borders, of the undesirable engine operation region U, and the engine control (EC) routine of the present invention therefore need not be executed. Moreover, even under conditions when the engine output characteristics do fall within, or on any of the borders, of region U while in top-gear or one gear down, it may be desirable to allow unrestricted engine operation in one or both of these gears only. It is to be understood, however, that the present invention contemplates defining any number and any combination of the various transmission gears as the "any of predefined gears" of step 310. In any case, algorithm execution advances from step 310 at step 314.

Figure 17A:
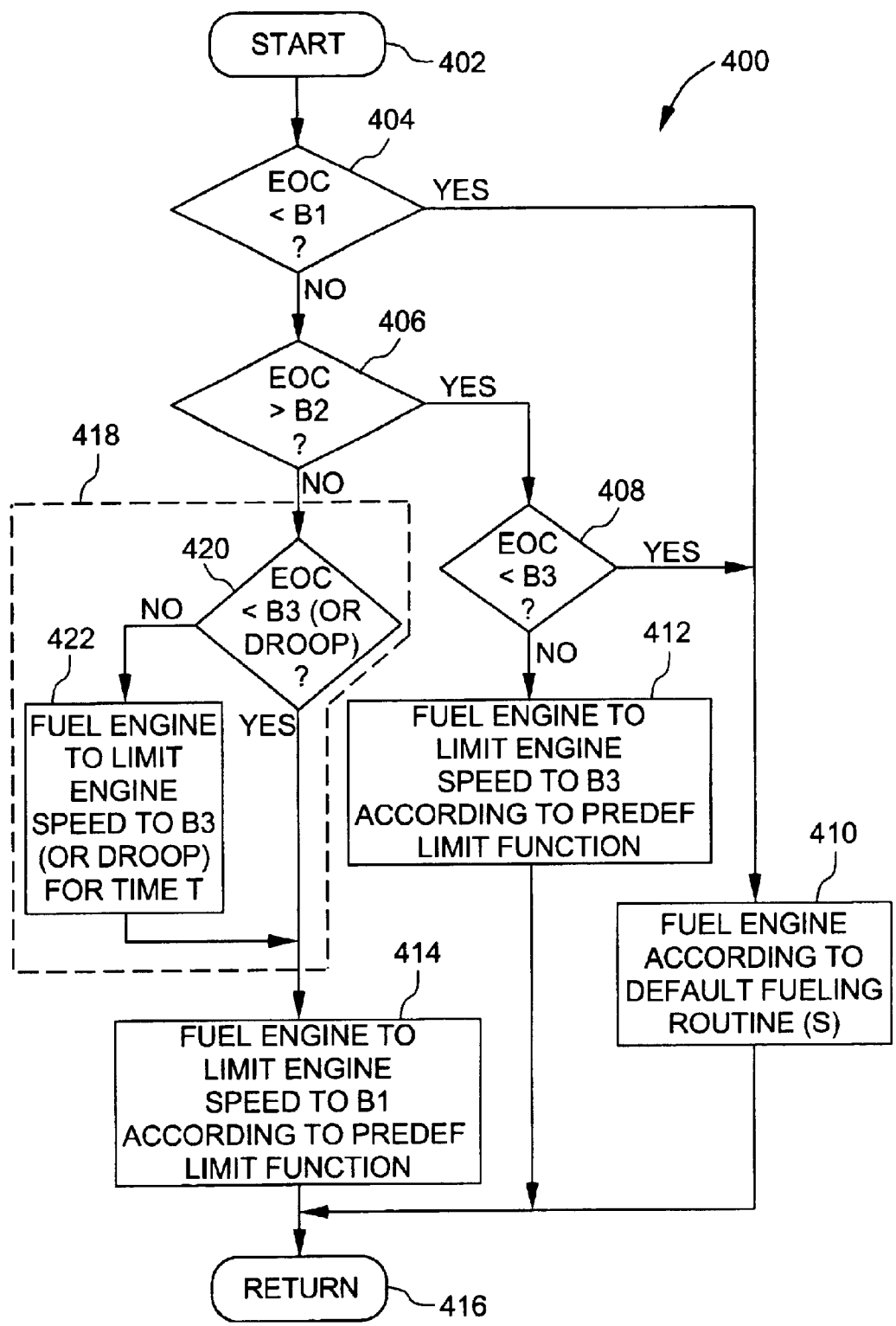
FIG. 17A is a flowchart illustrating one preferred embodiment of a software routine for executing step 316 of the flowchart of FIG. 14.
Figure 18A:
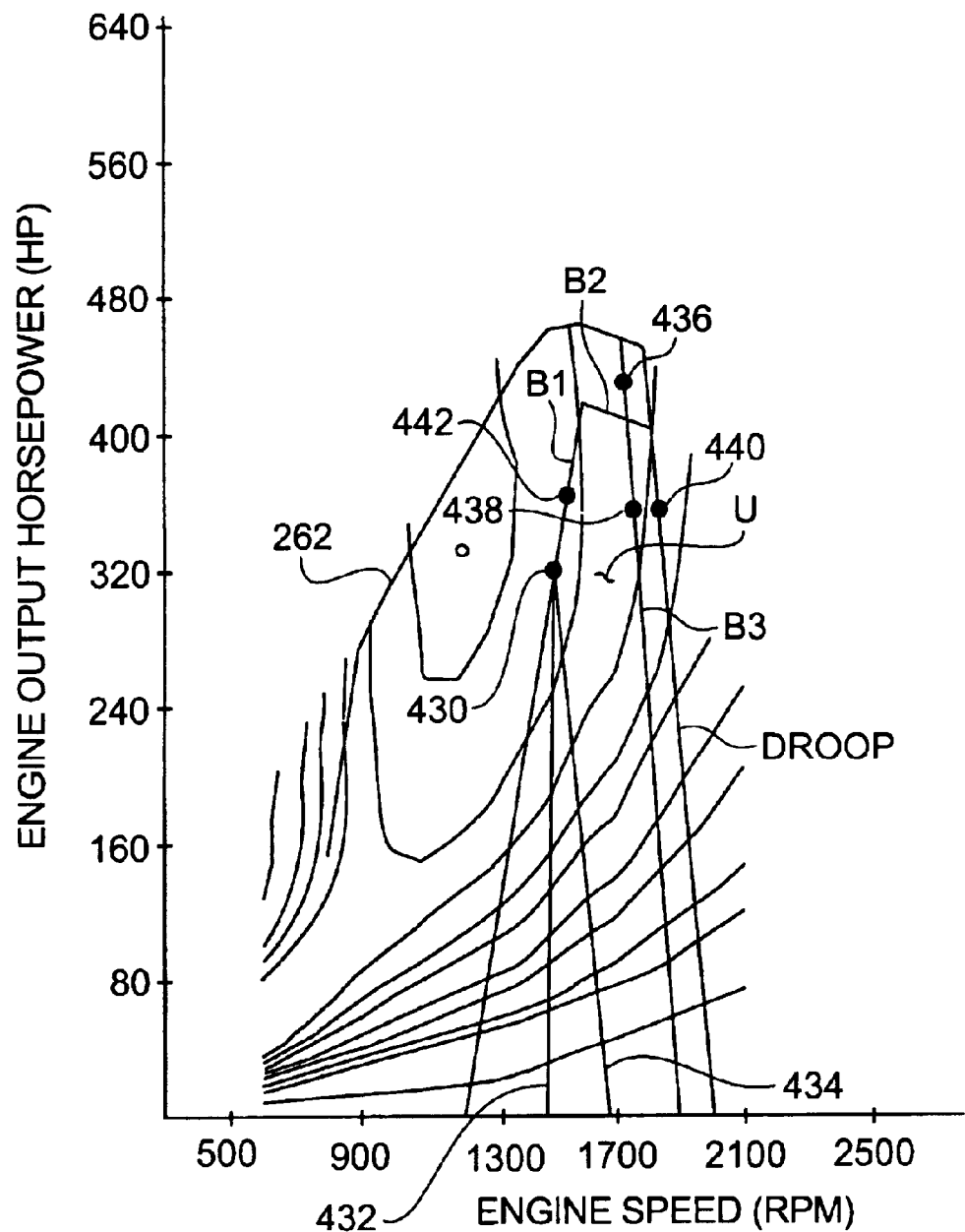
FIG. 18A is plot of engine output power vs. engine speed illustrating some of the techniques detailed in the flowchart of FIG. 17A.

At step 314, control computer 202 is operable to execute an engine control routine (EC), in accordance with the present invention, to thereby maintain or encourage engine operation in regions under, and on, the horsepower curve 262 that are outside of the undesirable engine operation region U. The present invention contemplates a number of strategies for executing such control, and one preferred embodiment of a software algorithm 400 for carrying out step 314 of algorithm 300 is shown in FIG. 17A, wherein algorithm 400 will be described with the aid of a corresponding graphical representation depicted in FIG. 18A. Algorithm 400 begins at step 402, and at step 404 control computer 202 is operable to compare the current engine operating conditions EOC (determined at step 306 of algorithm 300) to boundary B1. If EOC is less than B1, i.e., if the current engine operating conditions indicate operation to the left of boundary B1 in FIG. 18A, algorithm execution advances to step 410 where control computer 202 is operable to fuel engine 206 according to one or more default fueling routines, wherein "default fueling routines" refer to existing engine fueling routines within control computer 202. If, on the other hand, control computer. 202 determines at step 404 that the EOC<B1 condition is not satisfied, algorithm execution advances to step 406 where control computer 202 is operable to compare. EOC to boundary B2. If EOC is greater than B2, i.e., if the current engine operating conditions indicate operation above boundary B2, algorithm execution advances to step 408 where control computer 202 is operable to compare EOC to boundary B3. If EOC is less than boundary B3, i.e., if the current engine operating conditions indicate operation to the left of boundary B3 in FIG. 18A, algorithm execution advances to step 410. If, on the other hand, control computer 202 determines at step 408 that EOC is greater than or equal to B3, i.e., if the current engine operating conditions indicate operation on or to the right of boundary B3, algorithm execution advances to step 412 where control computer 202 is operable to limit engine speed such that engine operation is maintained on boundary B3 according to a predefined limit function. In one embodiment, the predefined limit function is an engine load dependent engine speed limit such that engine speed is limited to boundary B3 between boundary B2 and horsepower curve 262 wherein the actual engine operating point 436 along B3 is dictated by engine load. Alternatively, the predefined limit function in step 412 may be a hard engine speed limit such that engine speed is limited to, for example, point 436 in FIG. 18A. It is to be understood that the present invention contemplates other predefined limit functions for step 412, and those skilled in the art will recognize that any such predefined limit functions will typically depend upon the particular application and that any such predefined limit functions are intended to fall within the scope of the present invention. It should also be understood that in the case that boundary B3 is not specified, i.e., only boundaries B1 and B2 have been defined, steps 408 and 412 may be omitted from algorithm 400 and the "yes" branch of step 406 will flow directly to step 410.

If, at step 406, control computer 202 determines that the EOC>B2 condition is not satisfied, algorithm 400 advances to optional step 418 (shown in phantom in FIG. 17A). In the event that step 418 is not included, the "no" branch of step 406 flows directly to step 414. In any case, optional step 418 includes step 420 wherein control computer 202 is operable to compare EOC to either B3, if B3 has been specified, or the DROOP region if B3 has not been specified. If, at step 420, EOC is not less than B3 (or DROOP), i.e., if engine operating conditions indicate operation on or to the right of B3 (or on the DROOP region), algorithm 400 advances to step 422 where control computer 202 is operable to allow time-limited operation thereat by fueling the engine 206 to thereby limit engine speed to boundary B3 (or the DROOP region) for some predefined time period T, after which algorithm 400 advances to step 414. For example, referring to FIG. 18A, if control computer 202 determines at step 420 that the engine is operating at point 438 on boundary B3 (or at point 440 on the DROOP region), operation at either of these points is permitted at step 422 for some predefined time period, after which engine speed is limited by step 414 to the point 442 as will become more apparent from the following description of step 414.

If, at step 420, EOC is less than B3 (or DROOP), algorithm 400 advances to step 414 where control computer 202 is operable to limit engine speed to boundary B1 according to a predefined limit function. As a practical matter, those skilled in the art will recognize that steps 404, 406 and 420 will typically include appropriate provisions for anticipating encroachment of the current engine operating conditions EOC upon the various boundaries B1, B2 and B3 so that control computer 202 may successfully limit engine speed to B1 without overshooting B1 and allowing engine operation within region U. In any case, the predefined limit function of step 414 is preferably a load-dependent engine speed limit. In one embodiment, for example, engine speed is limited to boundary B1 wherein the actual engine operating point 430 along B1 is dictated by engine load. Alternatively, control computer 202 may be operable at step 414 to limit engine speed isochronously such that engine speed is limited by boundary B1 above some arbitrary engine speed, engine load or throttle percentage point 430 as dictated by engine load, and is limited below point 430 to a constant engine speed limit as illustrated by boundary 432. Alternatively still, control computer 202 may be operable at step 414 to limit engine speed along boundary B1 above some arbitrary engine speed, engine load or throttle percentage point 430 as dictated by engine load, and to limit engine speed below point 430 along boundary 434 as dictated by engine load. It is to be understood that the present invention contemplates other predefined limit functions for step 414, and those skilled in the art will recognize that any such predefined limit functions will typically depend upon the particular application and that any such predefined limit functions are intended to fall within the scope of the present invention. In any case, algorithm execution advances from steps 414, 412 and 410 to step 416 where algorithm execution is returned to step 314 of algorithm 300.

Figure 17B:
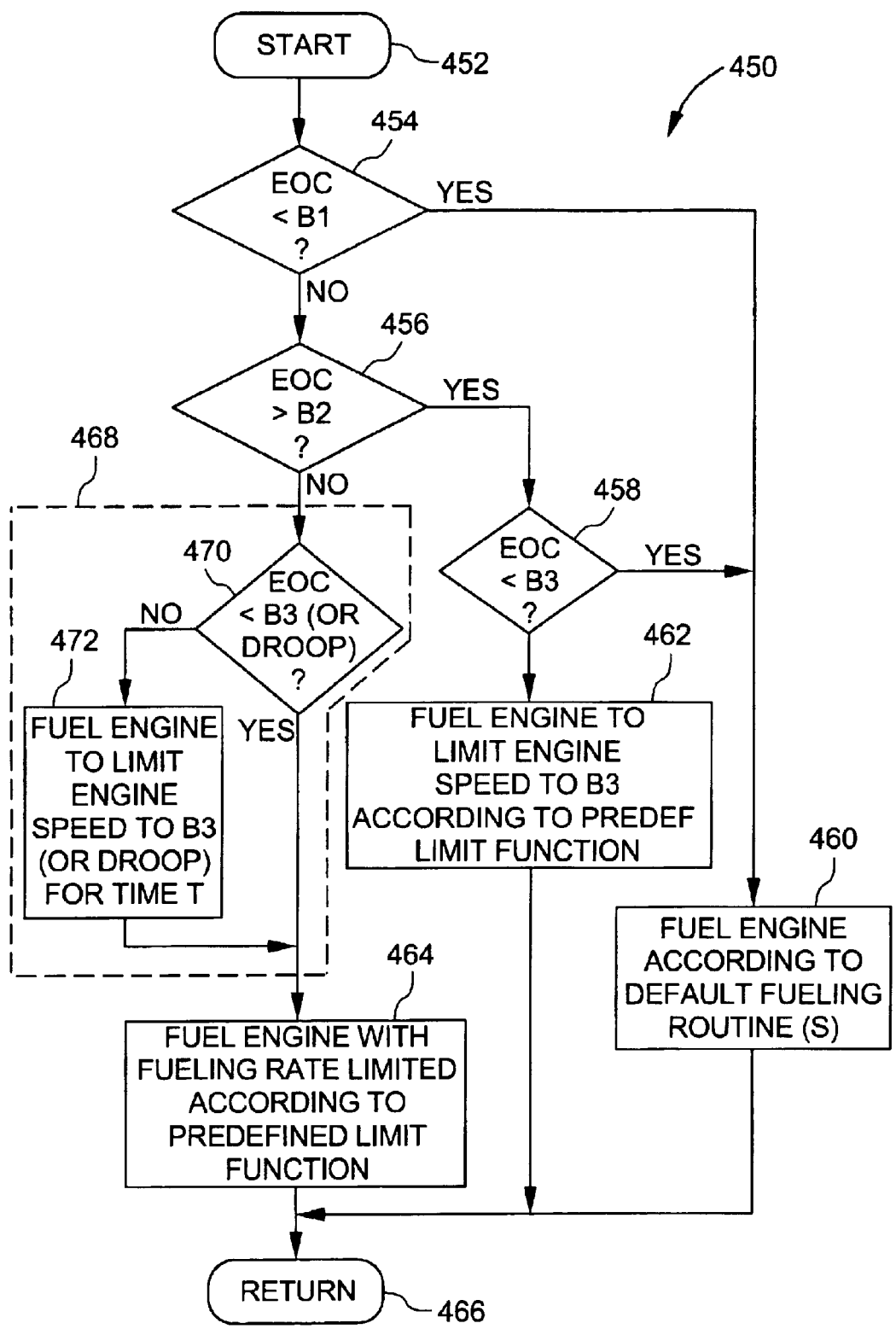
FIG. 17B is a flowchart illustrating an alternate embodiment of a software routine for executing step 316 of the flowchart of FIG. 14.
Figure 18B:
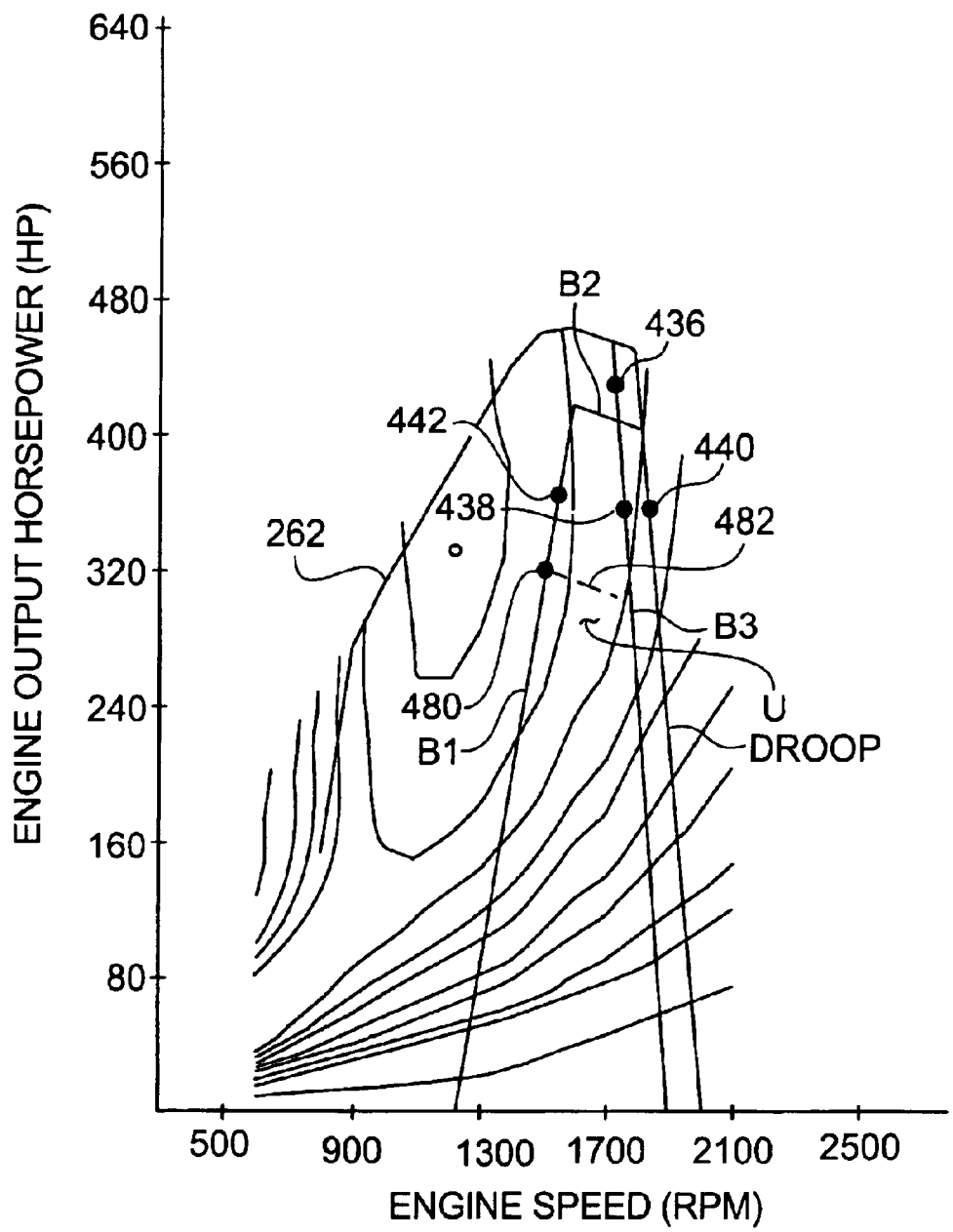
FIG. 18B is a plot of engine output power vs. engine speed illustrating some of the techniques detailed in the flowchart of FIG. 17B.

An alternative embodiment of a software algorithm 450 for carrying out step 314 of algorithm 300 is shown in FIG. 17B, wherein algorithm 450 will be described with the aid of a corresponding graphical representation depicted in FIG. 18B. Steps 452–462 and 468 (including steps 470 and 472) are identical to steps 402–412 and 418 (including steps 420 and 422) respectively, and a detailed explanation thereof will be omitted here for brevity. Step 464 of algorithm 450 differs from step 414 of algorithm 400, however, in that control computer 202 is operable at step 464 to fuel engine 406 with a fueling rate limited according to a predefined limit function. In one embodiment, the predefined limit function of step 464 is an engine acceleration rate limit, whereby control computer 202 is operable to control engine fueling rate to thereby limit engine acceleration rate to a predefined acceleration rate limit. Alternatively, the predefined function at step 464 may be a slew rate limit, whereby control computer 202 is operable to control engine fueling rate in such a manner that a predefined delay occurs between a fueling command and realization of that commanded fuel by fuel system 222. Either case may be illustrated by FIG. 18B wherein, for example, a fueling rate limit is imposed at engine operating point 480 so that engine operation may enter the undesirable operating region U along dashed-line 482, but only with a penalty of reduced engine performance/response. Algorithm execution advances from step 464 at step 466 where algorithm execution returns to step 314 of algorithm 300.

It should now be apparent from the descriptions of the foregoing embodiments of step 314 of algorithm 300 that system 200 is operable to either maintain engine operation outside of the undesirable engine operation region U by limiting engine operation, under certain conditions, to operating conditions along border B1, or to alternatively encourage engine operation outside of region U by reducing the performance/response of engine 206 when operating inside region U, particularly when upshifting through at least some of the transmission gears.

Figure 19A:
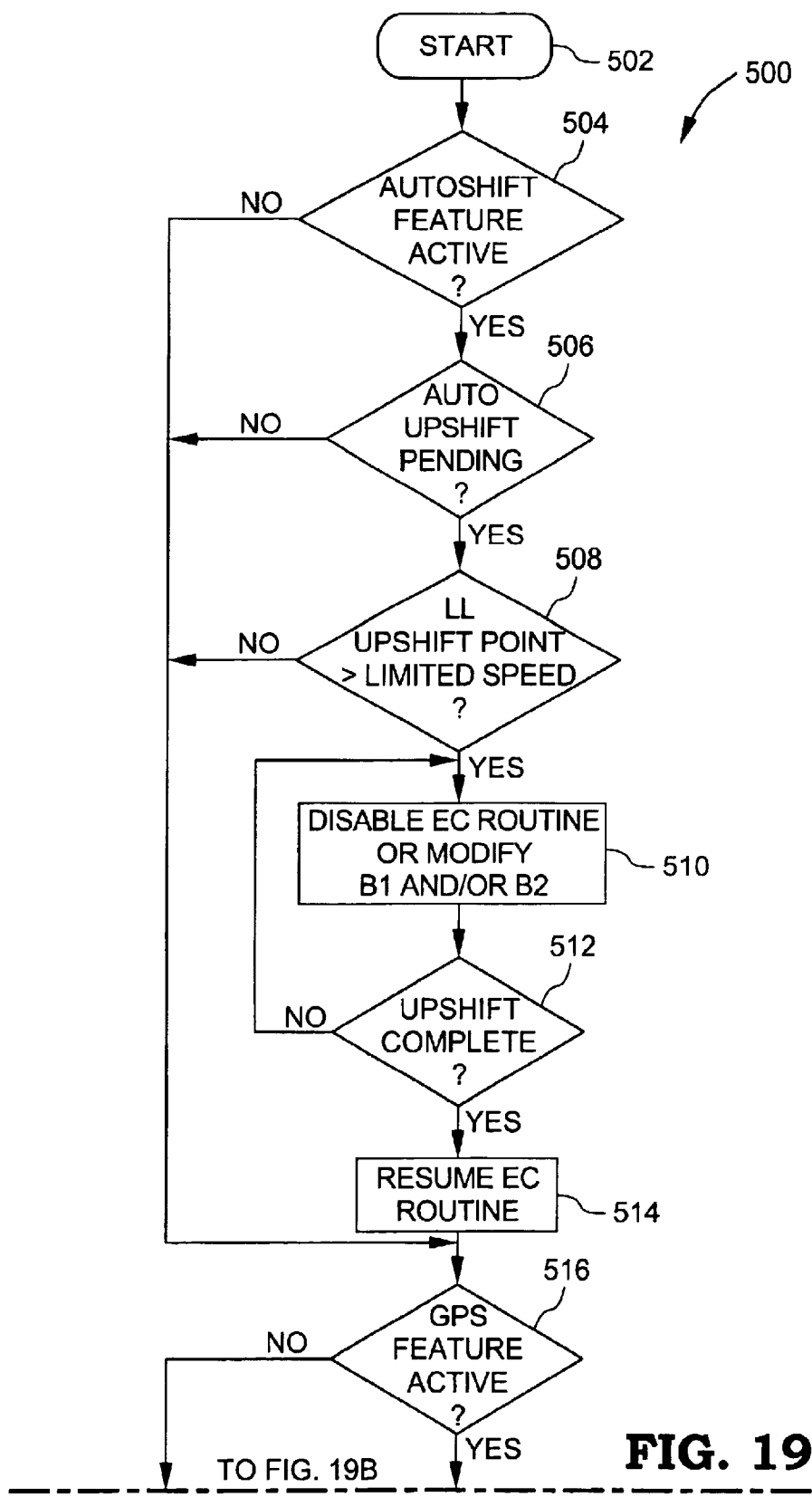
FIG. 19 is composed of FIGS. 19A, 19B and 19C and is a flowchart illustrating one preferred embodiment of a software routine for executing step 318 of the flowchart of FIG. 14.
Figure 19B:
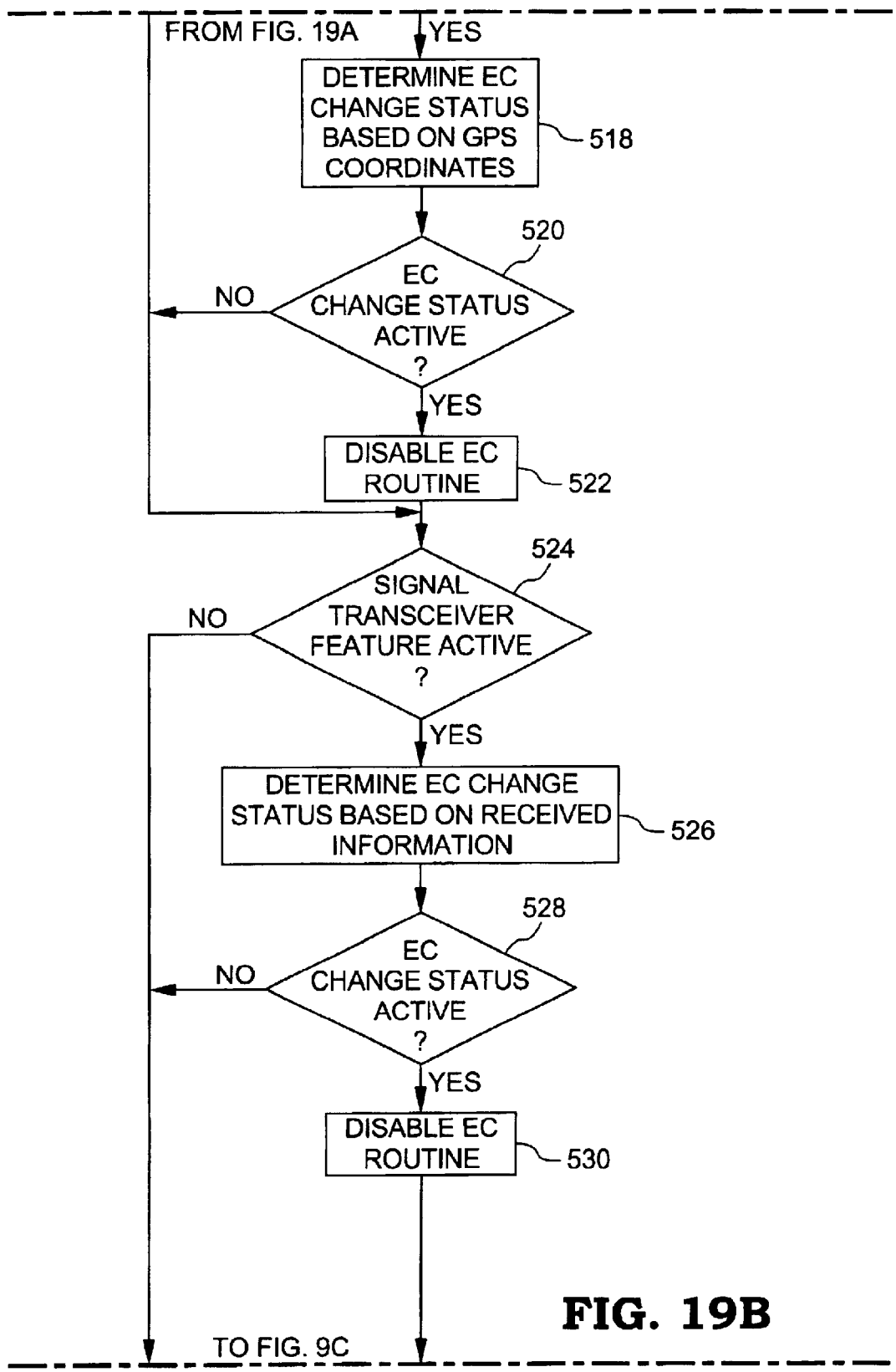

Referring again to FIG. 14, algorithm 300 advances from step 314 to step 316 where control computer 202 is operable to execute and engine control (EC) override routine. The present invention recognizes that there may be some operational conditions wherein it would be desirable to disable or modify, at least temporarily, execution of the engine control (EC) routine of step 314. Referring to FIGS. 19A and 19B, one preferred embodiment of a software algorithm 500 for executing step 316 of algorithm 300, in accordance with the present invention, is shown. Algorithm 500 begins at step 502 and at step 504, control-computer 202 is operable to determine whether an autoshift feature is active. In embodiments of system 200 wherein transmission 208 includes automatically selectable gear ratios and wherein shifting between such gears is controlled by a transmission control module 242, such an autoshift feature will be active. For all manually selectable gear ratios and gear shifting controlled by control computer 202, such an autoshift feature will be inactive. In any case, if control computer 202 determines at step 504 that the autoshift feature is active, algorithm execution advances to step 506 where control computer 202 is operable to determine whether an automatic upshift is currently pending. Preferably, control computer 202 is operable to execute step 506 by monitoring signal line 244, whereby transmission control module 242 is operable, as is known in the art, to broadcast such gear shifting information. If, at step 506, control computer 202 determines that an autoshift is indeed pending, algorithm execution advances to step 508 where control computer 202 is operable to compare a so-called "low load (LL) upshift point" with the currently limited engine speed, i.e., engine speed limited by engine control (EC) routine of step 314 of algorithm 300. Preferably, information relating to the LL upshift point of the particular gear ratio currently being upshifted to is broadcast by transmission control module 246 onto data link 244 or is otherwise supplied to control computer 202. If, at step 508, control computer 202 determines that the LL upshift point is indeed greater than the currently limited engine speed, algorithm advances to step 510 where control-computer 202 is operable to disable the engine control (EC) routine of step 314, thereby providing for default engine operating conditions whereby engine speed will be allowed to increase to/through the LL upshift point. Alternatively, control computer 202 may be operable at step 510 to temporarily modify boundary B1 and/or boundary B2 to thereby provide for engine operating conditions whereby engine speed will be allowed to increase to/through the LL upshift point. In any case, algorithm execution advances from step 510 to step 512 where control computer 202 is operable to monitor transmission module 246 for an indication of whether the pending automatic upshift is complete. If not, step 512 loops back to step 510. If, at step 512, control computer 202 determines that the automatic upshift is complete, algorithm execution advances to step 514 where control computer 202 is operable to resume the engine control (EC) routine of step 314 of algorithm 300. Algorithm execution advances from step 514, as well as from the "no" branches of steps 504, 506 and 508, to step 516.

At step 516, control computer 202 is operable to determine whether a GPS feature is active. Preferably, if system 200 includes a GPS receiver 250 and/or if interface module 246 includes a GPS receiver, then the GPS feature will be active. Otherwise, the GPS feature will be inactive. In any case, if control computer 202 determines at step 516 that the GPS feature is active, algorithm execution advances to step 518 where control computer 202 is operable to determine whether a change in engine control (EC) routine operational status is warranted based on current GPS coordinates. For example, if at step 518, the engine control (EC) routine of step 314 of algorithm 300 is currently executing and control computer 202 determines from the GPS coordinates that the current position of the vehicle carrying system 200 does not necessitate continued execution of the EC routine, control computer 202 is operable to set an engine control routine operational status indicator to an active status. If, on the other hand, control computer 202 determines in the foregoing scenario that continued execution of the EC routine is warranted, control computer 202 is operable at step 518 to set the engine control routine operational status indicator to an inactive status. Thereafter at step 520, control computer 202 is operable to determine whether the EC routine operational status indicator is active. If so, algorithm execution advances to step 522 where control computer 202 is operable to disable the engine control (EC) routine of step 314 of algorithm 300. Algorithm execution advances therefrom, as well as from the "no" branch of step 520, to step 524.

From the foregoing, it should be apparent that steps 516–522 are included to provide for the ability to disable the engine control (EC) routine of step 314 of algorithm 300 based on current vehicle position. For example, the EC routine may be executing when the vehicle is traveling in one jurisdiction (e.g., country, state, county, etc.), topographical region (e.g., mountainous, hilly or flat terrain), geographical region (e.g., urban or rural) or the like, and may thereafter be disabled pursuant to steps 516–522 of algorithm 500 when the vehicle leaves the current jurisdiction, topographical region, geographical region or the like, and enters a different jurisdiction, topographical region, geographical region or the like. Those skilled in the art will recognize other vehicle position-based conditions wherein it may be desirable to disable a currently executing EC routine, and that any other such conditions are intended to fall within the scope of the present invention.

At step 524, control computer 202 is operable to determine whether a signal transceiver feature is active. Preferably, if system 200 includes a signal transceiver 254 and/or if interface module 246 includes a signal transceiver, then the signal transceiver feature will be active. Otherwise, the signal transceiver feature will be inactive. In any case, if control computer 202 determines at step 524 that the signal transceiver feature is active, algorithm execution advances to step 526 where control computer 202 is operable to determine whether a change in engine control (EC) routine operational status is warranted based on information provided thereto via signal transceiver 254. For example, if at step 526, the engine control (EC) routine of step 314 of algorithm 300 is currently executing and control computer 202 receives information from a remote source via signal transceiver 254 that execution of the EC routine is no longer necessary, control computer 202 is operable to set an engine control routine operational status indicator to an active status. If, on the other hand, control computer 202 determines in the foregoing scenario that continued execution of the EC routine is warranted, control computer 202 is operable at step 526 to set the engine control routine operational status indicator to an inactive status. Thereafter at step 528, control computer 202 is operable to determine whether the EC routine operational status indicator is active. If so, algorithm execution advances to step 530 where control computer 202 is operable to disable the engine control (EC) routine of step 314 of algorithm 300.

From the foregoing, it should be apparent that steps 524–530 are included to provide for the ability to disable the engine control (EC) routine of step 314 of algorithm 300 based on information provided from a remote source. For example, the EC routine may be executing when the vehicle is traveling in one jurisdiction (e.g., country, state, county, etc.), topographical region (e.g., mountainous, hilly or flat terrain), geographical region (e.g., urban or rural) or the like, wherein a base station or other remote system may be tracking the vehicle carrying system 200. If/when the vehicle thereafter leaves the current jurisdiction, topographical region, geographical region or the like, and enters a different jurisdiction, topographical region, geographical region or the like, the base station or other remote system may wish to contact control computer 202, or control computer 202 may with to contact the base station or other remote system, wherein the base station or other remote system issues instructions to disable the currently executing EC routine. Control computer 202 is operable, pursuant to steps 524–530 of algorithm 500, to carry out any such instructions. Those skilled in the art will recognize other remote signal applications wherein it may be desirable to remotely disable a currently executing EC routine, and that any other such applications are intended to fall within the scope of the present invention.

Algorithm execution advances from step 530, as well as from the "no" branches of steps 524 and 538, to step 532 where control computer 202 is operable to determine whether a grade indicator feature., in accordance with another aspect of the present invention, is active. Preferably, the grade indicator feature is active at all times, although the present invention contemplates activating the grade indicator feature only in geographical regions wherein road grade changes are prevalent, wherein any known technique for making this determination may be used including known GPS techniques, known engine/vehicle operating condition identification techniques, and the like. In any case, if control computer 202 determines at step 532 that the grade indicator feature is active, algorithm execution advances to step 534 where control computer 202 is operable to execute a grade indicator routine in accordance with another aspect of the present invention. Thereafter at step 536, control computer 202 is operable to determine whether a positive grade indicator was set during execution of the grade indicator routine of step 534. If so, algorithm execution continues at step 538 where control computer 202 is operable to modify the engine control (EC) routine of step 314 by allowing for increased engine performance as long as the positive grade indicator is set. From step 538, and from the "NO" branch of step 536, algorithm execution continues at step 540 where algorithm 500 is returned to its calling routine.

From the foregoing, it should be apparent that steps 532–538 are included to provide for increased engine performance whenever the vehicle carrying engine 206 is traversing a positive grade. The engine control (EC) routine of step 314 is accordingly modified during positive grade conditions so as to provide sufficient engine power to traverse the grade.

Figure 19C:
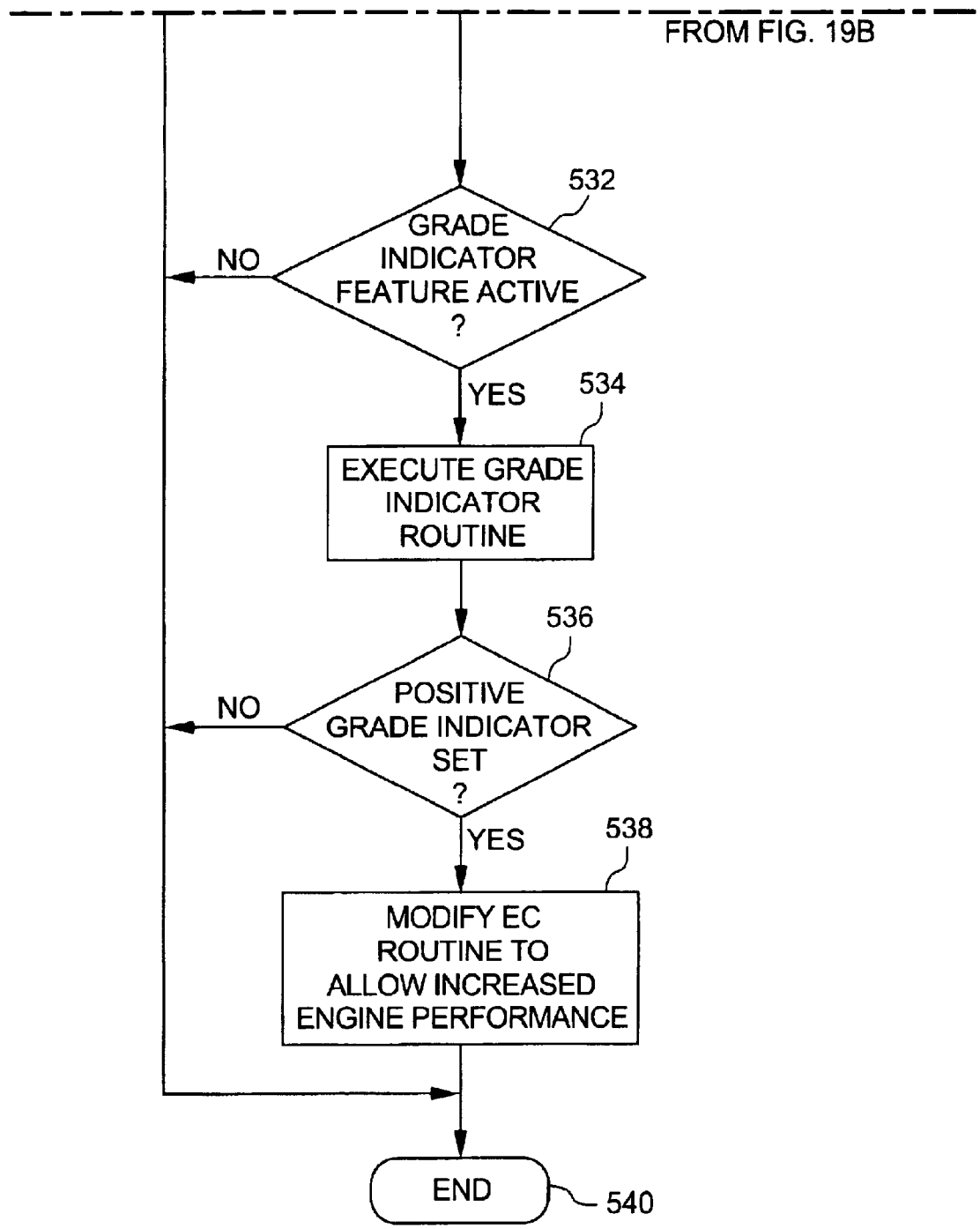
Figure 20:
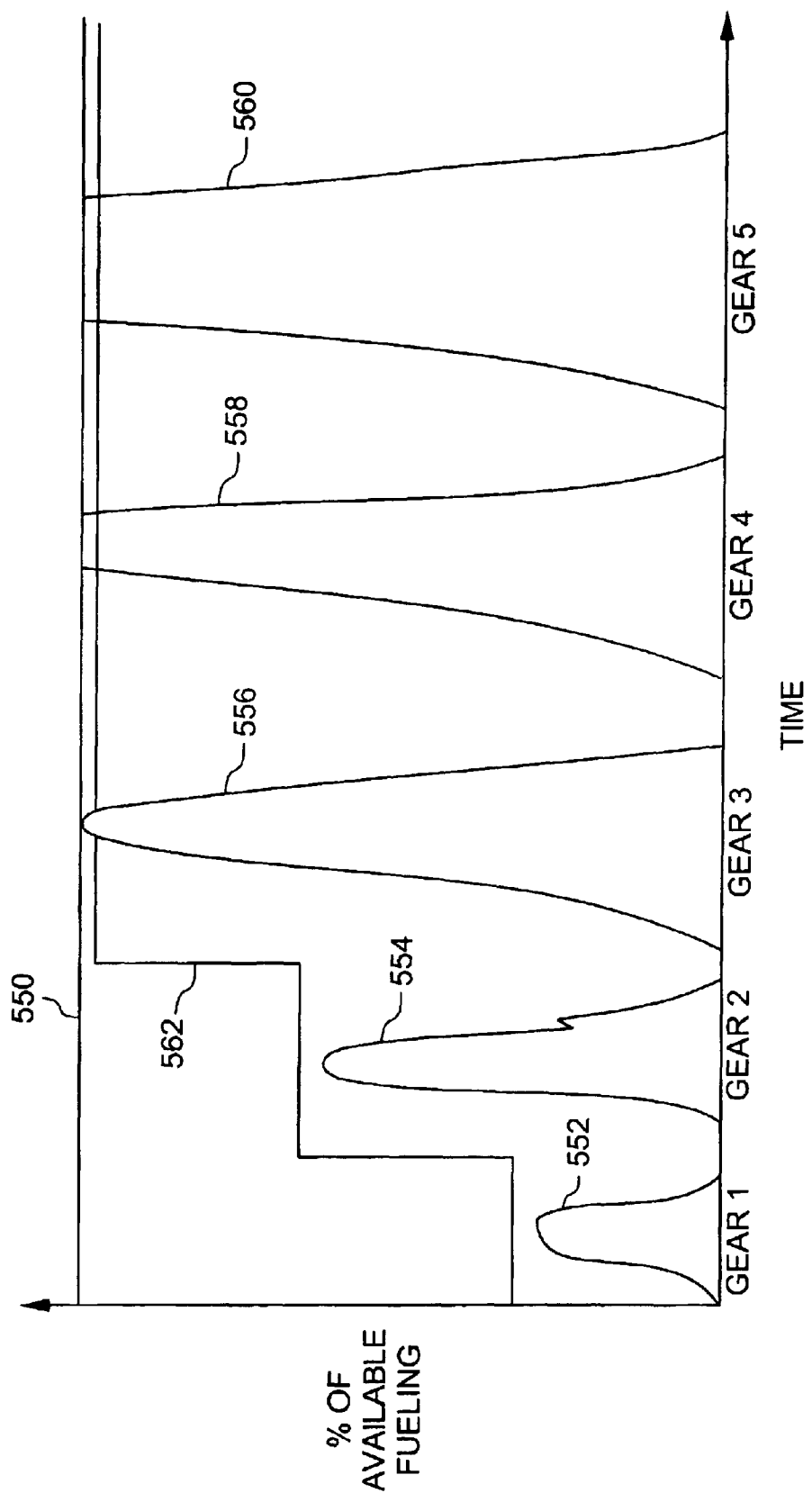
FIG. 20 is a plot of available fueling vs. time illustrating a level ground, full throttle acceleration as it relates to a grade indicator feature in accordance with another aspect of the present invention.
Figure 21:
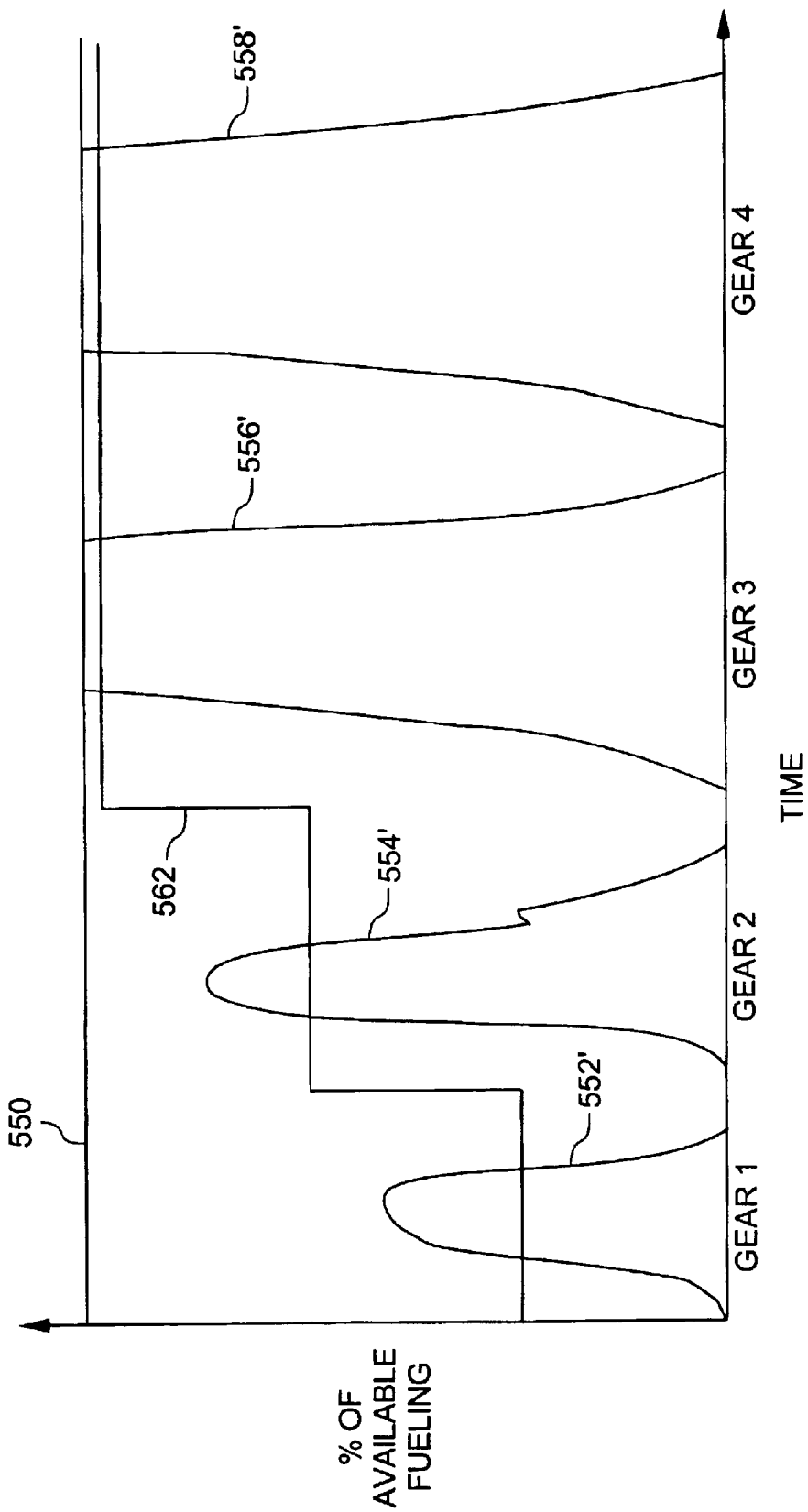
FIG. 21 is a plot of available fueling vs. time illustrating a full throttle acceleration through a positive grade as it relates to the grade indicator feature of the present invention.
Figure 22:
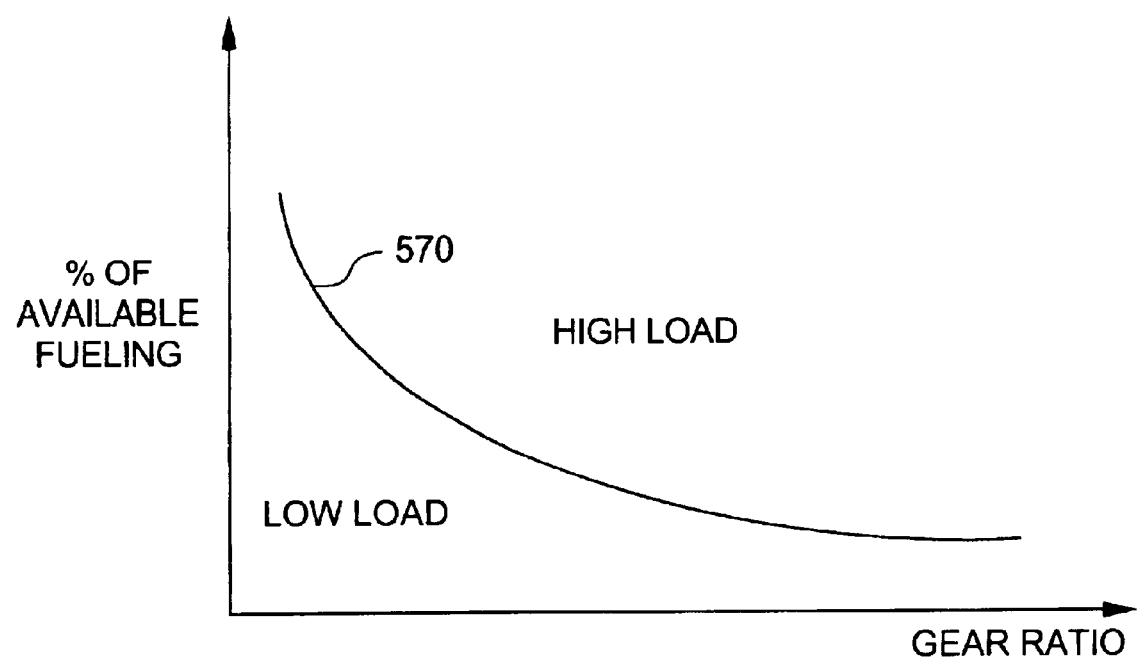
FIG. 22 is a plot of available fueling vs. gear ratio illustrating steady state load conditions as they relate to the grade indicator feature of the present invention.
Figure 23A:
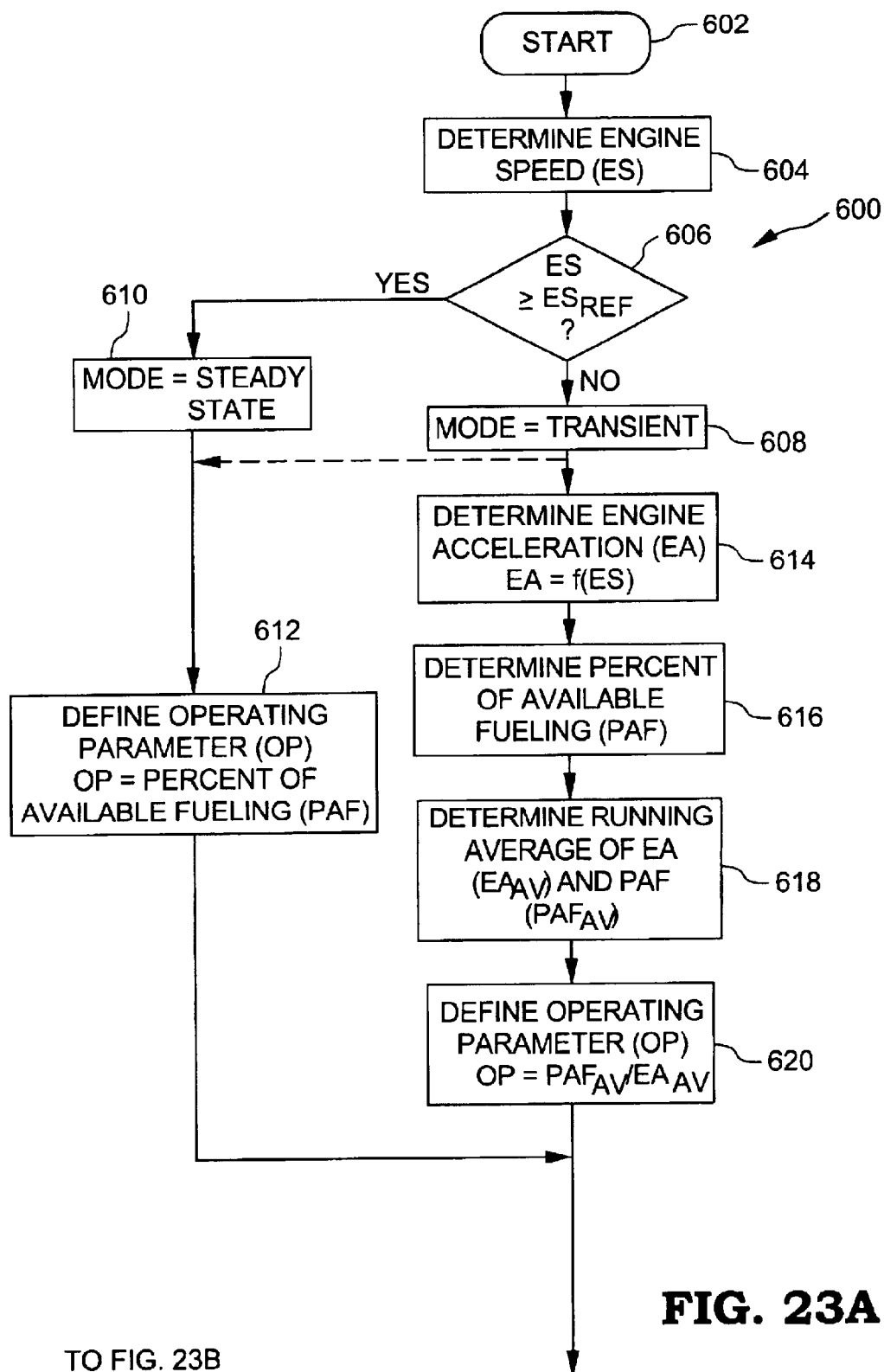
FIG. 23 is composed of FIGS. 23A and 23B and is a flowchart illustrating one preferred embodiment of a software routine for carrying out the grade indicator feature of the present invention.
Figure 23B:
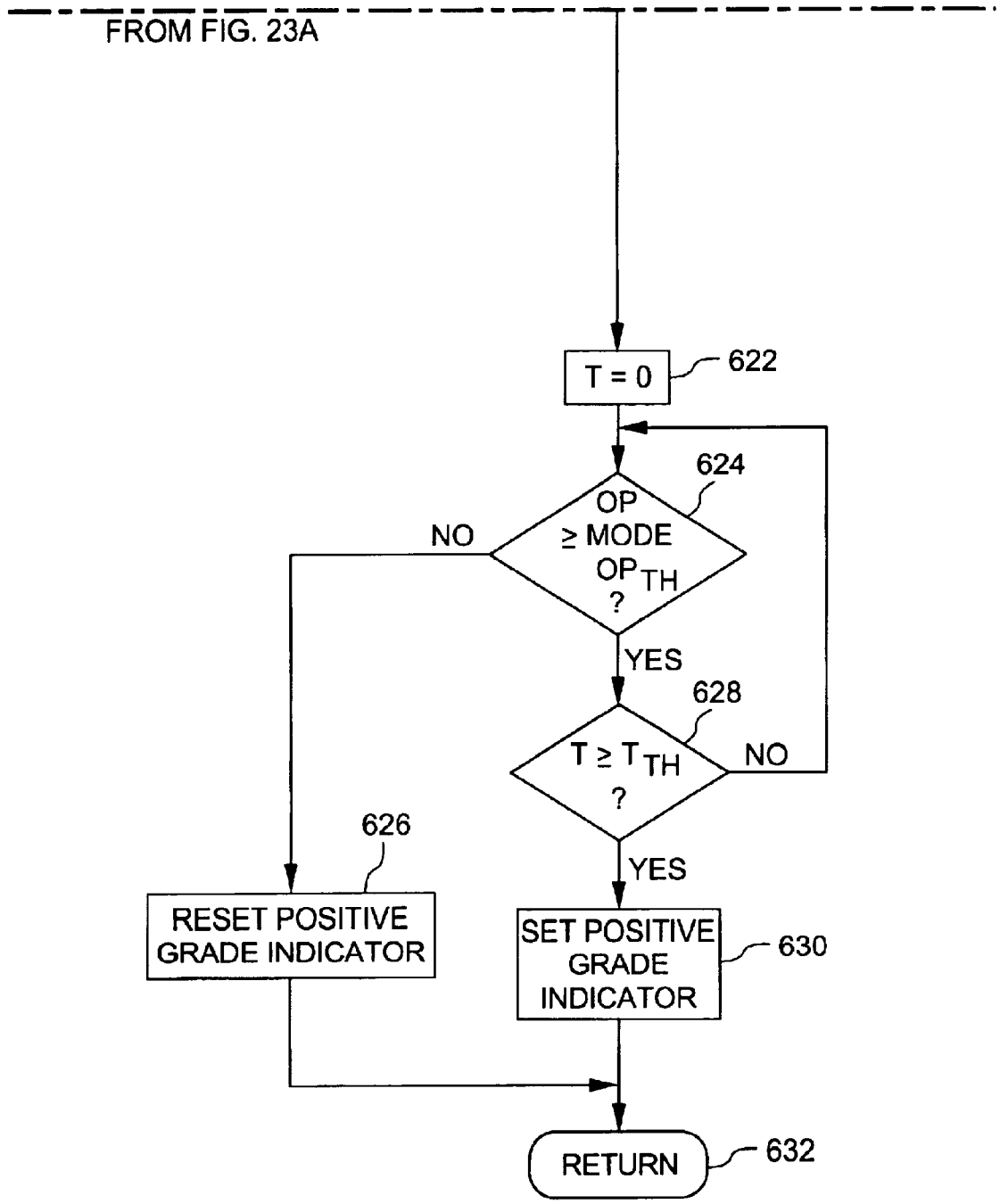

Referring now to FIGS. 23A and 23B, one preferred embodiment of a software algorithm 600 for executing the grade indicator routine of step 534 of FIG. 19C, in accordance with the present invention, is shown. Preferably, algorithm 600 is executed by control computer 202 and will be described hereinafter as such, although the present invention contemplates that algorithm 600 may alternatively be executed by an auxiliary control computer such as, for example, the auxiliary control computer within transmission control module 242. In any case, the algorithm 600 of FIGS. 23A and 23B will be described with reference to certain operational features thereof as illustrated in FIGS. 20–22.

Algorithm 600 begins at step 602, and at step 604, control computer 202 is operable to determine current engine speed (ES) preferably via engine speed sensor 218. Thereafter at step 606, control computer 202 is operable to compare the current engine speed ES with a reference engine speed $ES_{REF}$. If ES is greater than or equal to $ES_{REF}$, algorithm execution continues at step 610 where control computer 202 establishes the current operating mode as a steady state operating mode. Otherwise, algorithm execution continues at step 608 where control computer 202 establishes the current operating mode as a transient operating mode. In one embodiment, $ES_{REF}$ is set at a high-speed governor limit (HSG), as this term is known in the art, although the present invention contemplates setting $ES_{REF}$ at any desired engine speed value. In any case, algorithm execution continues from step 610 at step 612 where control computer 202 is operable to define an operating parameter (OP) as a percent of available fueling (PAF). In one embodiment, control computer 202 is operable to determine PAF as a ratio of current engine fueling and maximum engine fueling, although the present invention contemplates determining PAF as a function of one or more different or additional parameters such as %throttle, engine load and the like. Algorithm execution advances from step 612 at step 622.

Following step 608, algorithm execution continues, in one embodiment, at step 614 where control computer 202 is operable to determine an engine acceleration value (EA) preferably as a function of engine speed (ES) in accordance with well-known equations. Thereafter at step 616, control computer 202 is operable to determine a percent of available fueling (PAF), preferably as described hereinabove with respect to step 612, and thereafter at step 618 to determine running averages, $EA_{AV}$ and $PAF_{AV}$, of the engine acceleration (EA) and percent of available fueling (PAF) values respectively. Preferably, control computer 202 is operable to determine $EA_{AV}$ and $PAF_{AV}$ over predefined time intervals in accordance with well-known techniques. Thereafter at step 620, control computer is operable to define the operating parameter OP as a ratio of the running averages $PAF_{AV}$ and $EA_{AV}$. Thereafter, algorithm execution advances to step 622. As an alternative to steps 614–620, algorithm 600 may advance from step 608 directly to step 612 where control computer 202 is operable to define the operating parameter strictly as a function of percent of available fueling (PAF).

In any case, control computer 202 is operable at step 622 to set a reset a timer; e.g., by setting a time variable T equal to an arbitrary value such as zero. Thereafter at step 624, control computer is operable to determine whether the operating parameter OP is greater than an operating parameter threshold value $OP_{TH}$ for the present operating mode. For example, if control computer 202 has determined at step 606 that the engine is in a steady state operational mode, control computer 202 is operable at step 624 to compare OP with a steady state operating threshold $OP_{TH}$. If, on the other hand, control computer 202 has determined at step 606 that the engine is in a transient operational mode, control computer 202 is operable at step 624 to compare OP with a transient operating threshold $OP_{TH}$. In either case, if control computer 202 determines at step 624 that the operating parameter OP is less than mode $OP_{TH}$, algorithm execution advances to step 626 where control computer 202 is operable to reset the positive grade indicator. If, on the other hand, control computer 202 determines at step 624 that the operating parameter OP is greater than or equal to mode $OP_{TH}$, algorithm execution advances to step 628 where control computer 202 is operable to determine whether the time counter T has exceeded a threshold value $T_{TH}$. If not, algorithm execution loops back to step 624. If, however, control computer 202 determines at step 628 that the time counter T has exceeded $T_{TH}$, algorithm execution advances to step 630 where control computer 202 is operable to set the positive grade indicator. Algorithm 600 advances from either of steps 626 and 630 to step 632 where algorithm execution is returned to step 534 of algorithm 500 (FIG. 19C).

From the foregoing, it should now be apparent that the grade indicator feature of the present invention is intended to increase engine performance, e.g., increase the engine-speed limit, of the engine control routine illustrated in FIG. 14 to thereby encourage or allow proper transmission shift-point selection when a vehicle is traversing a positive grade. However, in order to reliably trigger or set the positive grade indicator at a desired grade percentage for all gear ratios and engine speeds, effects of gear ratio and vehicle acceleration must be accounted for.

To account for the vehicle acceleration component, the present invention divides engine/vehicle operation into two separate operational modes; namely, transient and steady state. Transient mode includes the operating region below the so-called high idle engine speed limit or HSG reference speed. It is in this area of operation that the vehicle can be accelerated. Steady state mode, on the other hand, engine speed and vehicle speed are held relatively steady and thus there is no acceleration component to engine load.

In transient mode, it is likely that torque curve fueling will be reached under full throttle conditions in all but the lowest gears. Because of this a percent of available fueling threshold alone, or ratio thereof, is not sufficient to indicate a positive grade, and another threshold that varies with gear ratio is required; namely time. In accordance with the present invention, a time threshold is thus used to determine a positive grade when the operating parameter (PAF or $PAF_{AV}/EA_{AV}$) is at or above a predefined threshold value; e.g., 100%. The time threshold is essentially a function of the acceleration capability of the vehicle since the amount of time that the operating parameter (PAF or $PAF_{AV}/EA_{AV}$) is at or above a predefined threshold value; e.g., 100%, is dependent upon how long it takes to reach the HSG reference speed. In the very lowest gears of the transmission, acceleration is high enough so that the HSG reference speed is reached before the operating parameter (PAF or $PAF_{AV}/EA_{AV}$) reaches its predefined threshold.

FIGS. 20 and 21 graphically illustrate the basis for the foregoing gear ratio-based PAF and time threshold technique. Referring to FIG. 20, a plot of percent of available fueling (PAF) vs. time is shown illustrating an example full-throttle acceleration through the first five gears on level ground for one type of engine/vehicle configuration. Line 550 represents 100% available fueling, and waveforms 552–560 represent percent of available fueling during acceleration through each of the first five gears. As is evident from FIG. 20, %100 of available fueling is not reached on the first two gears, and is met/exceeded for gears 3–5 (and beyond). Referring to FIG. 21, the plot of percent of available fueling (PAF) vs. time is shown illustrating an example full-throttle acceleration through the first five gears with the engine/vehicle configuration of FIG. 20 except that the acceleration is occurring while traversing an X % positive grade, wherein "X" denotes a predefined grade value. It should be noted that %100 of available fueling, although still not reached with the first two gears, is reached earlier and for longer durations in gears 3–5. In view of the data illustrated in FIGS. 20 and 21, the operating parameter threshold value in the transient mode (transient $OP_{TH}$) was chosen to the that illustrated by line 562 which increases as numeric gear increases (conversely, as numeric gear ration decreases) until an upper bound is reached that is slightly less than %100 PAF to allow for noise in the observed fueling value. As percent of available fueling reaches its maximum value (gear 3 in the example illustrated in FIGS. 20 and 21), the time threshold increases. Although the time thresholds are not shown in FIGS. 20 and 21, it should be noted that the time spent at or near %100 available fueling is noticeably greater when traversing a positive grade than when on level ground.

In the steady state mode, less fueling is required to maintain an engine speed than to increase engine speed, and testing of some engines has indicated that the percent of available fueling needed to maintain engine speed in steady state mode is well below torque curve fueling for all gears, but does vary somewhat with gear ratio. Since fueling is directly related to engine output torque, the operating parameter threshold in the steady state (steady state $OP_{TH}$) is a percent of available fueling that is non-linearly related to gear ratio. The goal is thus to relate the threshold condition in the steady state to a given load at the wheels regardless of gear ratio, wherein this relationship is expressed by the equation (moment of flywheel rotational inertia)=(moment of wheel rotational inertia)/$GR^2$, where GR is the gear ratio of the transmission. Preferably a steady state engine percent load threshold (SSTH1) is established for a given grade and vehicle weight, gear ratio (GR), rear axle ratio (RAR) and tire size (TS). The 1:1 steady state engine load threshold (SSTH) is given by SSTH= SSTH1*GR(tuning)*RAR(tuning)*TS(tuning), wherein (tuning) means the values used for the application specific tuning exercise. The overall steady state engine load percent threshold (SSTHE) is then given by SSTHE=SSTH/(GR (current)*RAR*TS), wherein the GR, RAR and TS ratios are factored out to produce a SSTHE value that is independent of gear ratio, RAR and tire size. Referring to FIG. 22, a percent of available fueling plot vs. gear ratio for the steady state condition is shown including the SSTHE curve 570 that distinguishes between high and low load conditions.

Referring again to FIG. 14, execution of algorithm 300 advances from step 316 to step 318 where control computer 202 is operable to determine whether any new or updated load/speed boundary information is available. For example, if system 200 includes GPS system 250, signal transceiver 254 and/or interface module 246, new load/speed boundary data may be available via any one or more of these sources. If such new or updated load/speed data is available, algorithm execution loops back to step 304. Otherwise, algorithm execution loops back to step 306.

Figure 24:
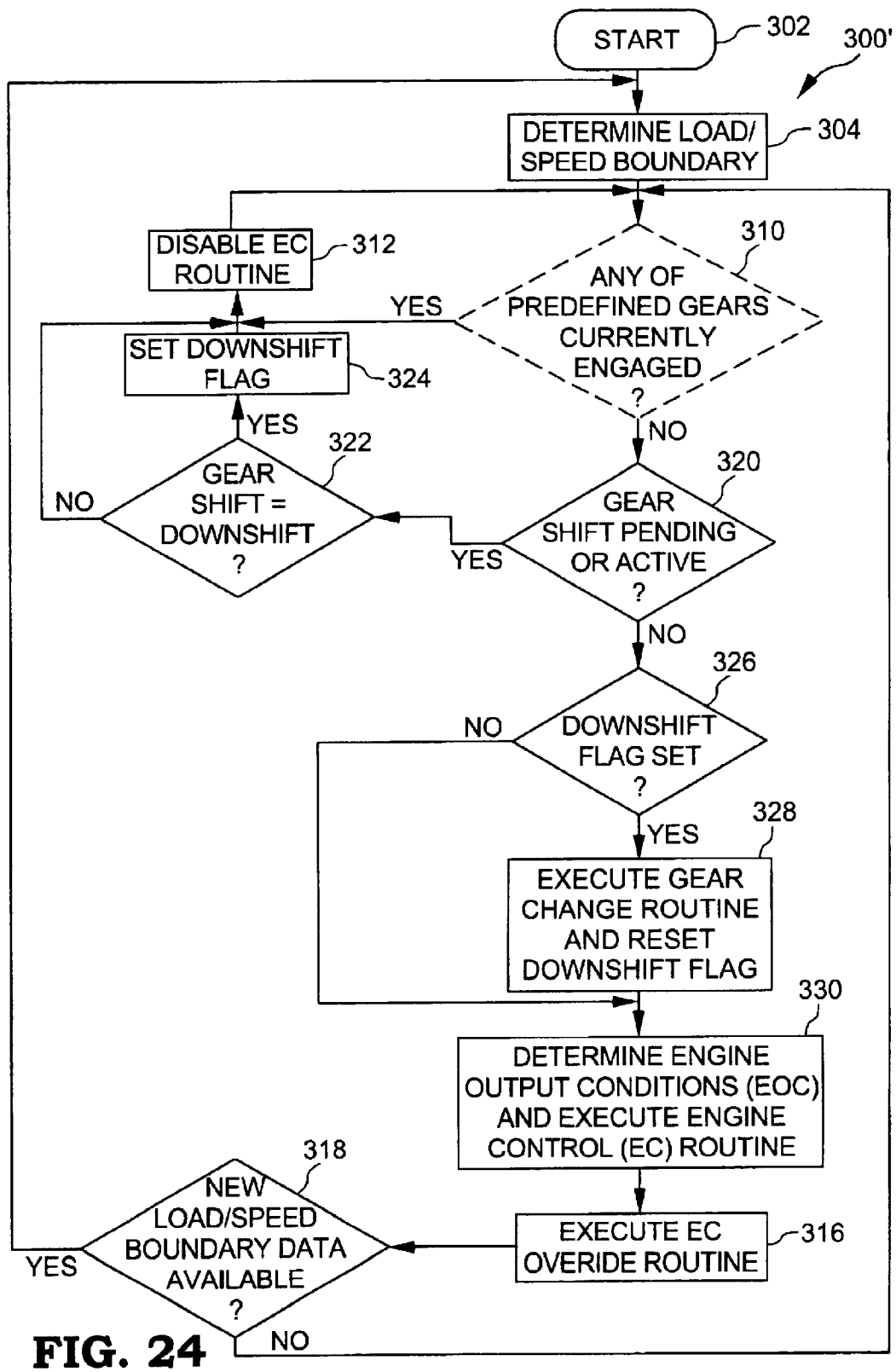
FIG. 24 is a flowchart illustrating an alternative embodiment of the software algorithm shown in FIG. 14 including a downshift feature in accordance with another aspect of the present invention.

Referring now to FIG. 24, a flowchart is shown illustrating an algorithm 300' that may be used to replace the main engine control algorithm 300 of FIG. 14, wherein algorithm 300' includes an enhancement for facilitating downshifts with the engine control techniques of the present invention. Algorithm 300' is similar in many respects to algorithm 300 of FIG. 14 and like numbers are therefore used to identify like steps. Thus, for example, steps 302, 304, 310, 312, 316 and 318 of algorithm 300' are identical to such steps of algorithm 300, and a detailed description thereof will be omitted here for brevity. Unlike algorithm 300, algorithm 300' of FIG. 24 advances from step 304 to step 310 where control computer 202 is operable to determine whether any of predefined transmission gears are currently engaged as described in detail with respect to algorithm 300 of FIG. 14. If so, control computer 202 is operable to disable the engine control (EC) routine (of step 316) at step 312 and loop execution of algorithm 300' back to step 310. If, on the other hand, control computer 202 determines at step 310 that none of the predefined transmission gears are currently engaged, algorithm execution advances to step 320 where control computer 202 is operable to determine whether a gear shift is current pending or active; i.e., in process. In some transmission embodiments, control computer 202 is operable to control gear shifting between at least some of the automatically selectable gear ratios of transmission 206, and in such cases, control computer 202 will have information internal thereto regarding whether a gear shift is currently in process. In other transmission embodiments, the transmission control module 242 is operable to control transmission gear shifting and will therefore have information internal thereto regarding whether a gear shift is currently in process. In such cases, transmission control module 242 is operable to communicate such information to control computer 202 via communications link 244. In still other transmission embodiments, gear shifting between at least some gear ratios may be controlled manually in which case control computer 202 is operable to determine whether a gear shift is currently in process by monitoring the currently engaged gear ratio, engine speed and transmission tailshaft speed as is known in the art. In any case, if control computer 202 determines at step 320 that a gear shift is currently in process, algorithm execution advances to step 322 where control computer 202 is operable to determine whether the transmission gear shift in process is a downshift. If so, control computer 202 is thereafter operable to set a downshift flag or other indicator at step 324, and to advance therefrom to step 312 where control computer 202 is operable to disable the engine control routing (EC). If, on the other hand, control computer 202 determines at step 322 that the gear shift in process is not a downshift, algorithm execution advances to step 312.

If, at step 320, control computer 202 determines that a gear shift is not currently in process, algorithm advances to step 326 where control computer 202 is operable to determine whether the downshift flag is set. If not, algorithm execution advances to step 330. If, at step 326, control computer 202 determines that the downshift flag is set, then a downshift has just recently been completed and algorithm execution advances to step 328 wherein control computer 202 is operable to execute a gear change routine and reset the downshift flag. Thereafter at step 330, control computer is operable to determine engine output conditions (EOC) and execute the engine control routine (EC), preferably as described with respect to steps 306 and 314 of algorithm 300 (FIG. 14). Thereafter at step 318, control computer 202 is operable to determine whether new load/speed boundary data is available as described with respect to FIG. 14. If so, algorithm execution loops back to step 304, and if not, algorithm execution loops back to step 310.

From the foregoing, it should now be apparent that algorithm 300' provides an enhancement to algorithm 300 of FIG. 14 in that rather than reestablishing the engine control routine (EC) immediately following a transmission downshift as with algorithm 300, algorithm 300' executes a gear change routine after a transmission downshift and prior to reestablishing the engine control routine (EC). The gear change routine of step 328 may be carried out in a number of ways, and three embodiments therefore will be described in detail hereinafter with respect to FIGS. 25A–25C. However, a common theme to any such routine is that the engine control routine preferably should not be reestablished immediately following a transmission downshift since engine load and engine speed may both be substantially increased as a result of the downshift. While such operating conditions just following a downshift may fall to the right (i.e., at greater engine speeds) of boundary B1, they may also fall above (i.e., at a higher engine load or throttle percentage) boundary B2 and therefore outside the region, U, of undesirable operation. If a decision of whether to reestablish the engine control routine (EC) is made with regard to such operating conditions immediately following a downshift, control computer 202 will disable the EC routine only to immediately reestablish the EC routine if operating conditions fall back into the region, U, of undesirable operation as may often be the case after engine operation has stabilized following a typical downshift. The intent of the gear change routine of the present invention is thus to avoid uncertainty regarding whether to reestablish or disable the engine control routine (EC) following a transmission downshift. In any case, the gear change routine of step 328 of FIG. 24 is preferably stored within memory 204 and is executed by control computer 202. Alternatively, the gear change algorithm could be executed by an auxiliary control computer within transmission control module 242, wherein instructions as to whether to reestablish or disable the engine control routine (EC), as well as the timing thereof, may be communicated to control computer 202 via communication link 244.

Figure 25A:
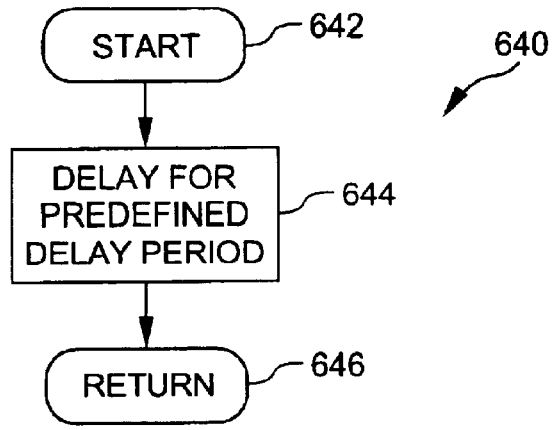
FIG. 25A is a flowchart illustrating one preferred embodiment of a software algorithm for executing the gear change routine of step 328 of FIG. 24.

Referring now to FIG. 25A, a flowchart is shown illustrating one preferred embodiment of a software algorithm 640 for executing the gear change routine of step 328 of algorithm 300'. Algorithm 640 begins at step 642 and at step 644, control computer 202 is operable to delay for a predefine time period before advancing to step 646 where algorithm 640 returns to step 328 of algorithm 300' of FIG. 24. With algorithm 640, control computer 202 is accordingly operable in the execution of algorithm 300' to delay for a predefined time period following a transmission downshift to thereby allow engine operating conditions to settle prior to making a decision as to whether to reestablish or disable the engine control (EC) routine. In one embodiment, the predefined delay is approximately 2–3 seconds, although the present invention contemplates providing any desired delay period.

Figure 25B:
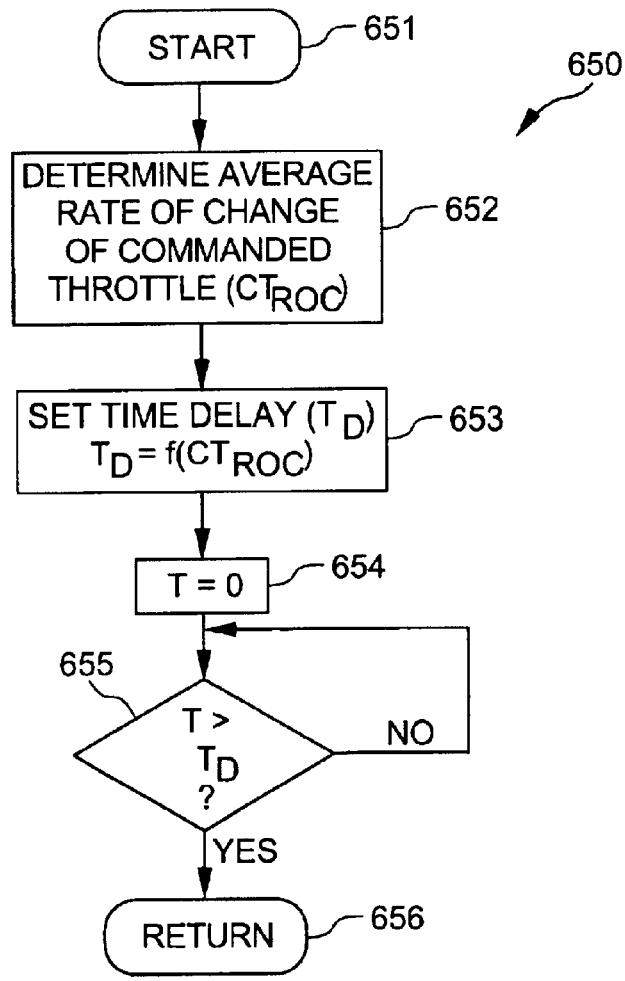
FIG. 25B is a flowchart illustrating an alternate embodiment of a software algorithm for executing the gear change routine of step 328 of FIG. 24.

Referring now to FIG. 25B, a flowchart is shown illustrating an alternate embodiment of a software algorithm 650 for executing the gear change routine of step 328 of algorithm 300'. Algorithm 650 begins at step 651 and at step 652, control computer 202 is operable to determine an average rate of change of commanded throttle ($CT_{ROC}$) Preferably, control computer 202 is operable to determine $CT_{ROC}$ by processing the accelerator pedal signal on signal path 214 according to well-known equations. Thereafter at step 653, control computer 202 is operable to set a time delay parameter $T_D$ as a function of $CT_{ROC}$. In one preferred embodiment, control computer 202 is operable at step 653 to compare $CT_{ROC}$ with a threshold $CT_{ROC}$ value. If $CT_{ROC}$ is below the threshold $CT_{ROC}$ value control computer 202 is operable to set the time delay parameter. $T_D$ to a high time value, whereas if $CT_{ROC}$ is at or above the threshold value control computer 202 is operable to set the time delay parameter $T_D$ to a low time value. In an alternate embodiment, control computer 202 is operable at step 653 to define $T_D$ as a continuous function that is inversely proportional to $CT_{ROC}$. Thus, as $CT_{ROC}$ increases in this embodiment, $T_D$ decreases. In any case, algorithm execution advances from step 653 to step 654 where control computer 202 is operable to reset a timer parameter (T) to an arbitrary value; e.g., zero, and thereafter at step 655 control computer 202 is operable to compare the timer parameter, T, to the time delay value $T_D$. If, at step 655, T is less than or equal to $T_D$, algorithm execution loops back to step 655. If, on the other hand, control computer 202 determines at step 655 that T has exceeded $T_D$, algorithm execution advances to step 656 where algorithm 650 is returned to step 328 of algorithm 300' of FIG. 24. This technique allows the engine operating conditions to advance closer to steady state before deciding whether to reestablish or disable the engine control (EC) routine by delaying for a definable time period following a downshift. In this embodiment, the time delay is a function of the average rate of change of commanded throttle. If a vehicle operator quickly accelerates after a downshift, this time delay will be generally short since steady state (or near-steady state) conditions will be achieved quickly. However, if the vehicle operator slowly accelerates after a downshift, this time delay will be longer since it will generally take longer to achieve steady state (or near-steady state) conditions.

Figure 25C:
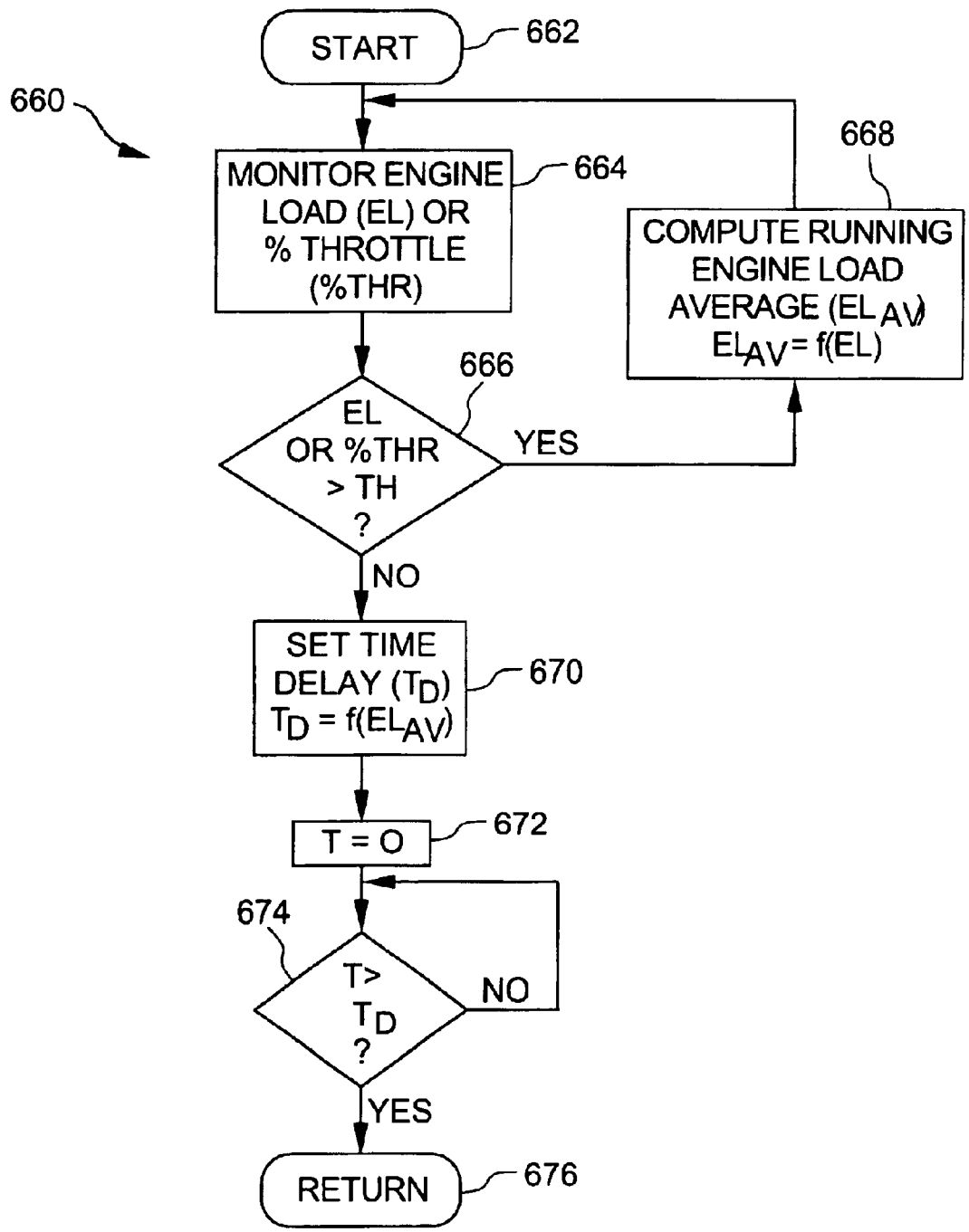
FIG. 25C is a flowchart illustrating another alternate embodiment of a software algorithm for executing the gear change routine of step 328 of FIG. 24.

Referring now to FIG. 25C, a flowchart is shown illustrating another alternate embodiment of a software algorithm 660 for executing the gear change routine of step 328 of algorithm 300'. Algorithm 660 begins at step 662 and at step 664, control computer 202 is operable to monitor engine load (EL) or throttle percentage (% THR). Thereafter at step 666, control computer 202 is operable to compare EL or % THR with a threshold value TH. If EL or % THR is above TH, algorithm execution advances to step 668 where control computer 202 is operable to compute a running engine load average $EL_{AV}$ of either EL or % THR. Preferably, control computer 202 is operable to compute the running average over a recent time interval, wherein the length of the time interval may be set as desired. Thereafter at step 668, algorithm execution loops back to step 664.

If, at step 666, EL or % THR drops below TH, algorithm execution advances to step 670 where control computer 202 is operable to set a time delay $T_D$ as a function of $EL_{AV}$. For example, if the running engine load average is low, the time delay $T_D$ may be short, whereas if the running engine load average is high, the time delay $T_D$ may be longer. Those skilled in the art will recognize that the time delay $T_D$ may alternatively be defined as any desired function of the running engine load average, and that any such function falls within the scope of the present invention. In any case, algorithm execution advances from step 670 to step 672 where control computer 202 is operable to reset a timer parameter (T) to an arbitrary value; e.g., zero, and thereafter at step 674 control computer 202 is operable to compare the timer parameter, T, to the time delay value $T_D$. If T is less than or equal to $T_D$, algorithm execution loops back to step 674. If, on the other hand, control computer 202 determines that T has exceeded $T_D$, algorithm execution advances to step 676 where algorithm 660 is returned to step 328 of algorithm 300' of FIG. 24.

With algorithm 660, control computer 202 is accordingly operable to compute and monitor a running engine load average following a transmission downshift, and to define a delay period when the instantaneous engine load (or throttle percentage) drops below a threshold value. The delay period, $T_D$, is preferably a definable time window based on the most recent value of the running engine load average. In any case, control computer 202 is operable to delay making a decision as to whether to reestablish or disable the engine control routine (EC) until after the delay period $T_D$ has expired. In this manner, the time delay following a transmission downshift depends on a running engine load average value following the downshift.

Figure 26:
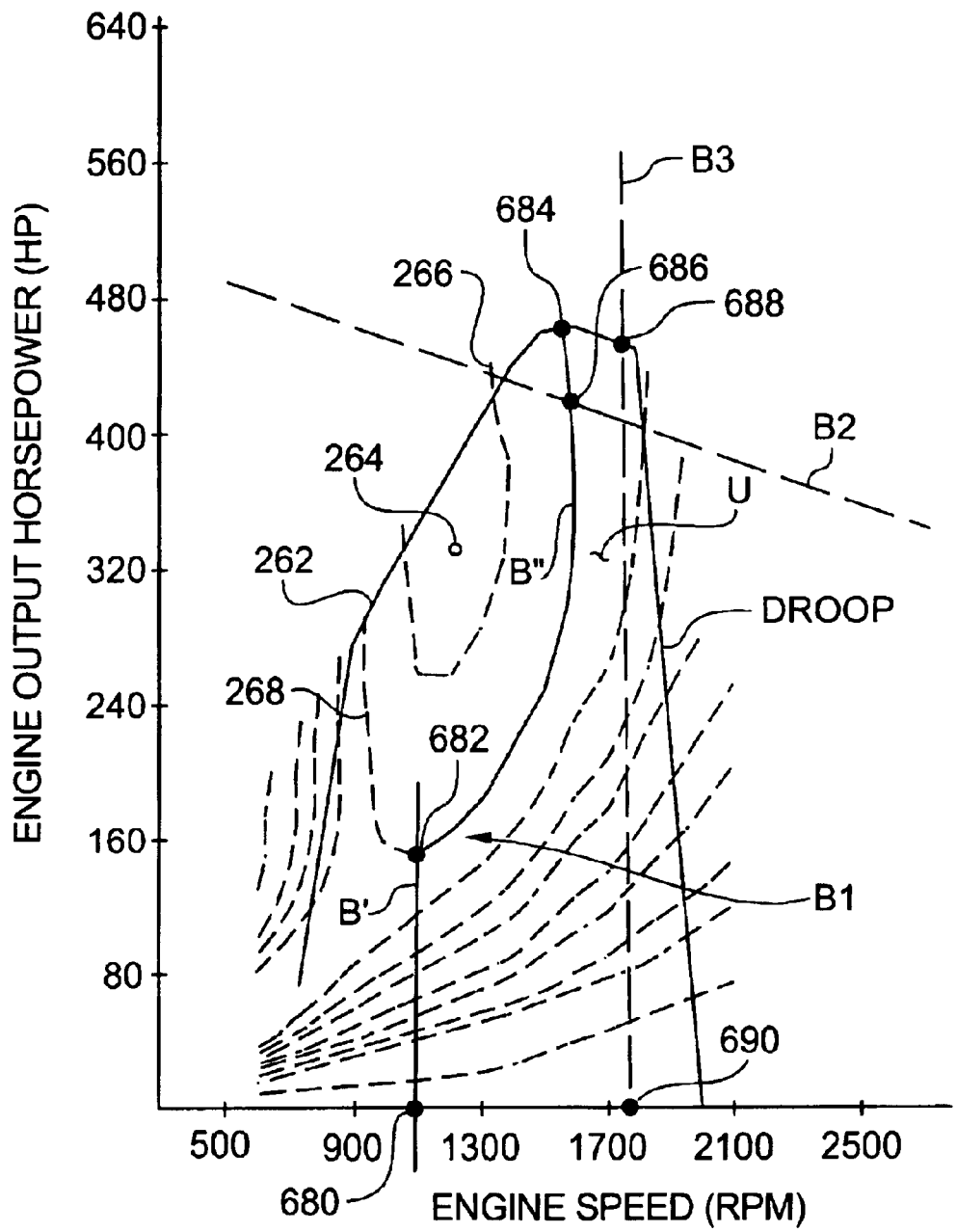
FIG. 26 is a plot of engine output power vs. engine speed illustrating another engine control strategy in accordance with another aspect of the present invention using the system of FIG. 12.

Referring now to FIG. 26, another technique for controlling an internal combustion engine, in accordance with the present invention, will be described in detail, wherein FIG. 26 shows one example of a typical engine output horsepower curve 262 vs. engine speed identical to that of FIG. 13. In the example shown, engine output horsepower increases rapidly to a peak horsepower at approximately 1500 RPM. Thereafter, the engine output horsepower decreases slightly with increasing engine RPM until engine speed reaches a "rated" or "governed" speed (approximately 1800 RPM in the example shown), wherein rated or governed speed corresponds to an engine speed at which the engine output horsepower characteristics achieve an advertised output horsepower. Thereafter, engine output horsepower drops sharply to zero in a region typically referred to as a "DROOP" region. As is known in the art, horsepower curve 262 typically forms part of the engine calibration software stored in memory 204 and executable by control computer 202.

Superimposed onto the engine output horsepower vs. engine speed curve 262 are a number of Brake Specific Fuel Consumption (BSFC) contours (shown in phantom), wherein the areas between each such BSFC contours define so-called BSFC islands as described hereinabove with respect to FIG. 13. Generally, BSFC contour 264 corresponds to an engine output horsepower/engine speed point (or range) where the engine 206 operates most efficiently; i.e., wherein the best fuel economy is achieved. The BSFC island defined between BSFC contours 264 and 266 corresponds to an engine output horsepower/engine speed range in which the engine 206 operates with less efficiency than at BSFC contour 264 yet with better efficiency than at engine horsepower/engine speed conditions outside this island. Similarly, the BSFC island defined between BSFC contour 266 and 268 corresponds to an engine output horsepower/engine speed range in which the engine 206 operates with less efficiency than within the island defined between BSFC contours 264 and 266, and so on.

In accordance with the present invention, a number of engine load/engine speed (load/speed) boundaries (e.g., B1, B2 and optionally B3) are defined in relation to curve 262 to form a region "U" of undesirable engine operation, whereby control computer 202 is operable to control the operation of engine 206, particularly while upshifting through at least some of the gear ratios of transmission 208, to thereby maintain or encourage engine operation outside of the undesirable engine operation region U as described hereinabove with respect to FIGS. 13–19. For example, region U may be defined as the region surrounded by boundary B1, boundary B2 and the DROOP region of horsepower curve 262. Alternatively, region U may be defined as the region surrounded by boundaries B1, B2 and B3 (shown in phantom). The present invention contemplates defining other regions U within and/or including horsepower curve 262, and by using a control strategy of the type just described, the operation of engine 206, in relation to engine output horsepower curve 262, may be optimized to thereby achieve fuel efficiency goals. It is to be understood that such a control strategy may alternatively be used to control the operation of engine 206 in relation to an engine output torque vs. engine speed curve, wherein engine output, torque is related to engine output horsepower as is well known in the art, and that such alternate control is intended to fall within the scope of the present invention. Hereinafter, the engine output horsepower vs. engine speed curve 262 and/or the related engine output torque vs. engine speed curve may broadly be referred to as an "engine output characteristics map" for the purposes of the present invention. Those skilled in the art will thus understand that the present invention is directed to controlling the operation of engine 206 in relation to an engine output characteristics map.

As with the embodiment described and illustrated with respect to FIGS. 13–19, the number of boundaries in this embodiment may be variable and may be defined according to a number of preferred techniques as will be described in greater detail hereinafter. Similarly, control of engine 206 to maintain or encourage operation outside of the undesirable engine operating region U may be accomplished according to a number of preferred techniques, and a number of preferred operating or other conditions may be recognized by control computer 202 to temporarily override such control, all of which has been or will be described in greater detail herein. In any case, the present invention also contemplates a number of techniques for establishing or defining the number of boundaries. For example, such boundaries may form part of an original engine calibration whereby such boundaries are stored in memory 204 of control computer 202. Preferably, the boundaries residing in memory 204 may thereafter be adjusted or "trimmed" via service/recalibration tool 258. Alternatively, the boundaries may be established or defined entirely via service/recalibration tool 258, whereby such boundaries are stored in memory 204. Alternatively still, the boundaries may be established/defined and/or modified as a function of external information, such as GPS receiver 252, signal transceiver 254, and the like, as described hereinabove with respect to FIGS. 13–19.

Unlike the embodiment described and illustrated with respect to FIGS. 13–19, boundary B1 is, in accordance with another aspect of the present invention, preferably defined as at least a partial function, or estimate of, a desired one or more of the BSFC contours 264, 266, 268. An example of one preferred technique for defining boundary B1 is illustrated in FIG. 26 wherein boundary B1 is formed of two boundary segments B' and B". In one embodiment, segment B' is preferably defined as a straight vertical line (e.g., constant engine speed) intersecting a desired low engine speed/low engine load value and a minimum load point of a desired one of the BSFC contours. For example, in the embodiment illustrated in FIG. 26, boundary segment B' extends as a constant engine speed line between a no-load point 680 and a minimum load point 682 of BSFC contour 268, wherein the constant engine speed value corresponds to approximately 1100 RPM. Segment B", on the other hand, preferably follows the BSFC contour from its minimum load point intersecting B1 to a desired high load point. For example, in the embodiment illustrated in FIG. 26, boundary B" extends along BSFC contour 268 from low load point 682 (intersection of B') to the point 684 at which contour 268 intersects the horsepower curve 262. Alternatively, as shown in the embodiment illustrated in FIG. 26, boundary B" may extend along BSFC contour 268 from low load point 682 to a predefined high load point 686. In either case, boundary B1 is defined as the combination of segments B' and B"; i.e., B1 extends along B' at low engine loads and engine speeds and, with increasing engine load and engine speed values, follows B".

Boundary B2 may be defined as described hereinabove with respect to FIGS. 13–19 as any desired high load (or high throttle percentage) value including 100% throttle; i.e., the horsepower curve 262. B3 may likewise be defined as described hereinabove with respect to FIGS. 13–19 as intersecting a high speed/high load point and a high speed/low load point. For example, as illustrated in FIG. 26, boundary B3 may be defined to intersect high speed/high load point 688 and high speed/low load point 690.

Figure 27:
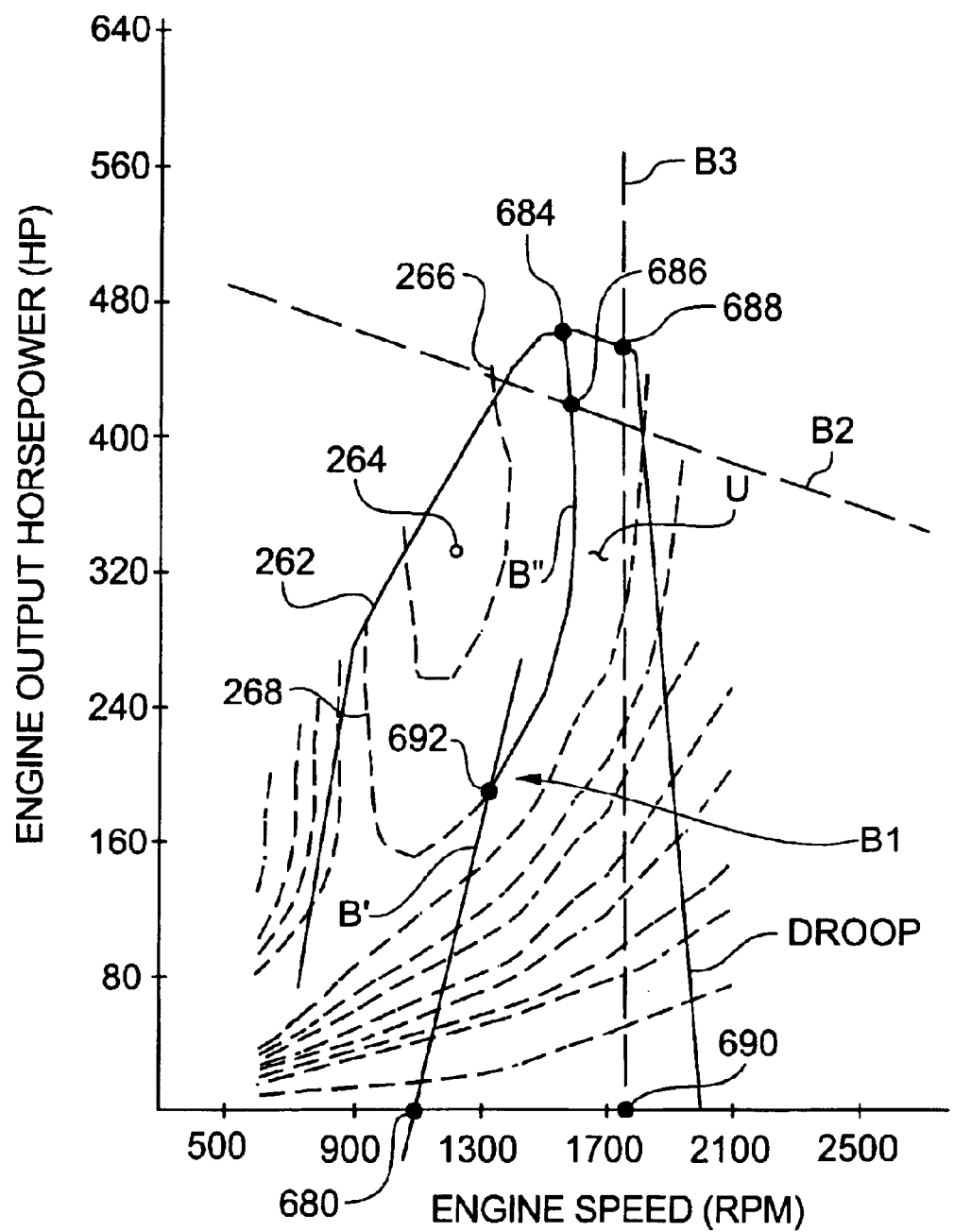
FIG. 27 is a plot of engine output power vs. engine speed illustrating one alternate technique for accomplishing the engine control strategy illustrated in FIG. 26.

Referring now to FIG. 27, boundary B1 may alternatively be defined as a combination of segments B' and B" wherein segment B' does not necessarily define a constant engine speed line segment. In this embodiment, segment B' may define any desired function intersecting a low engine speed/low engine load point and a desired one of the BSFC contours anywhere along the contour. For example, in the embodiment illustrated in FIG. 27, segment B' extends from low engine speed (e.g., 1100 RPM)/no-load point 680 through BSFC contour 268 at point 692, wherein segment B' defines a relatively straight line therebetween. In this embodiment, segment B" extends from point 692 (intersection of B') to a low engine speed/high engine load point 684 or 686, and boundaries B2 and B3 may be defined as described with respect to FIG. 26.

Figure 28:
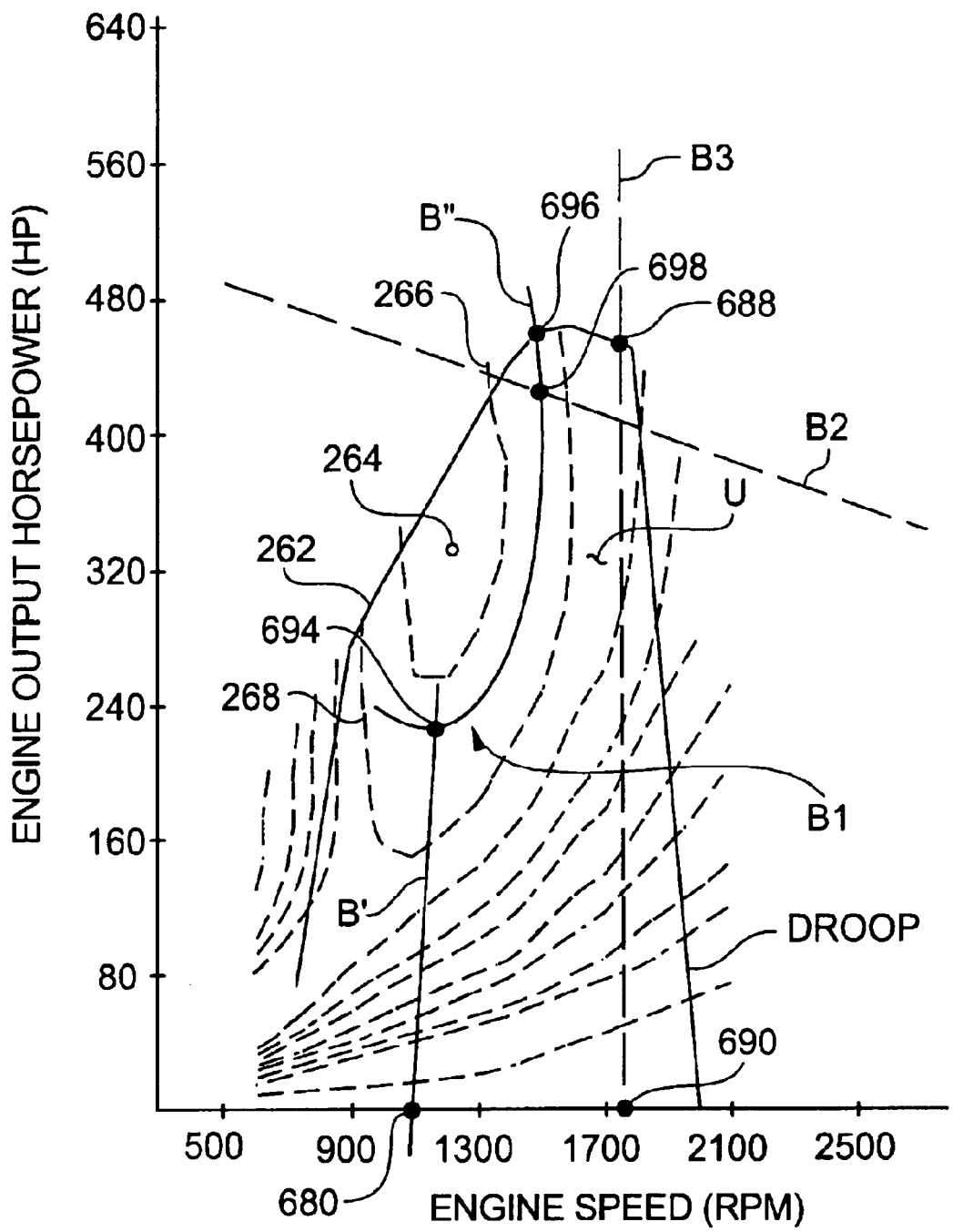
FIG. 28 is a plot of engine output power vs. engine speed illustrating another alternate technique for accomplishing the engine control strategy illustrated in FIG. 26.

Referring now to FIG. 28, boundary B1 may alternatively be defined as a combination of segments B' and B" wherein segment B' does not necessarily define a constant engine speed line segment and wherein boundary B" falls between two desired BSFC contours and is an estimate of a BSFC contour therebetween. In this embodiment, segment B' may define any desired function intersecting a low engine speed/low engine load point and a desired low speed/higher engine load point between two desired BSFC contour. For example, in the embodiment illustrated in FIG. 28, segment B' extends from low engine speed (e.g., 1100 RPM)/no-load point 680 through low engine speed/higher engine load point 694, wherein segment B' defines a relatively straight line therebetween. In this embodiment, segment B" is an estimate of a BSFC contour existing between the two BSFC contours 266 and 268 and passing through point 694 (intersection of B') and either of points 696 and 698. In one embodiment, segment B" may be estimated by interpolating between contours 266 and 268 such that the resulting estimated contour passes through point 694, wherein point 694 may correspond to any desired load value relative to the estimated contour. In the example illustrated in FIG. 28, for example, point 694 corresponds to the minimum load point of the estimated contour B". In another embodiment, segment B" may be estimated by modeling B" as any mathematical function (e.g., nth order polynomial) passing through point 694 and either of points 696 and 698. In any case, boundaries B2 and B3 may be defined as described with respect to FIG. 26.

Figure 29:
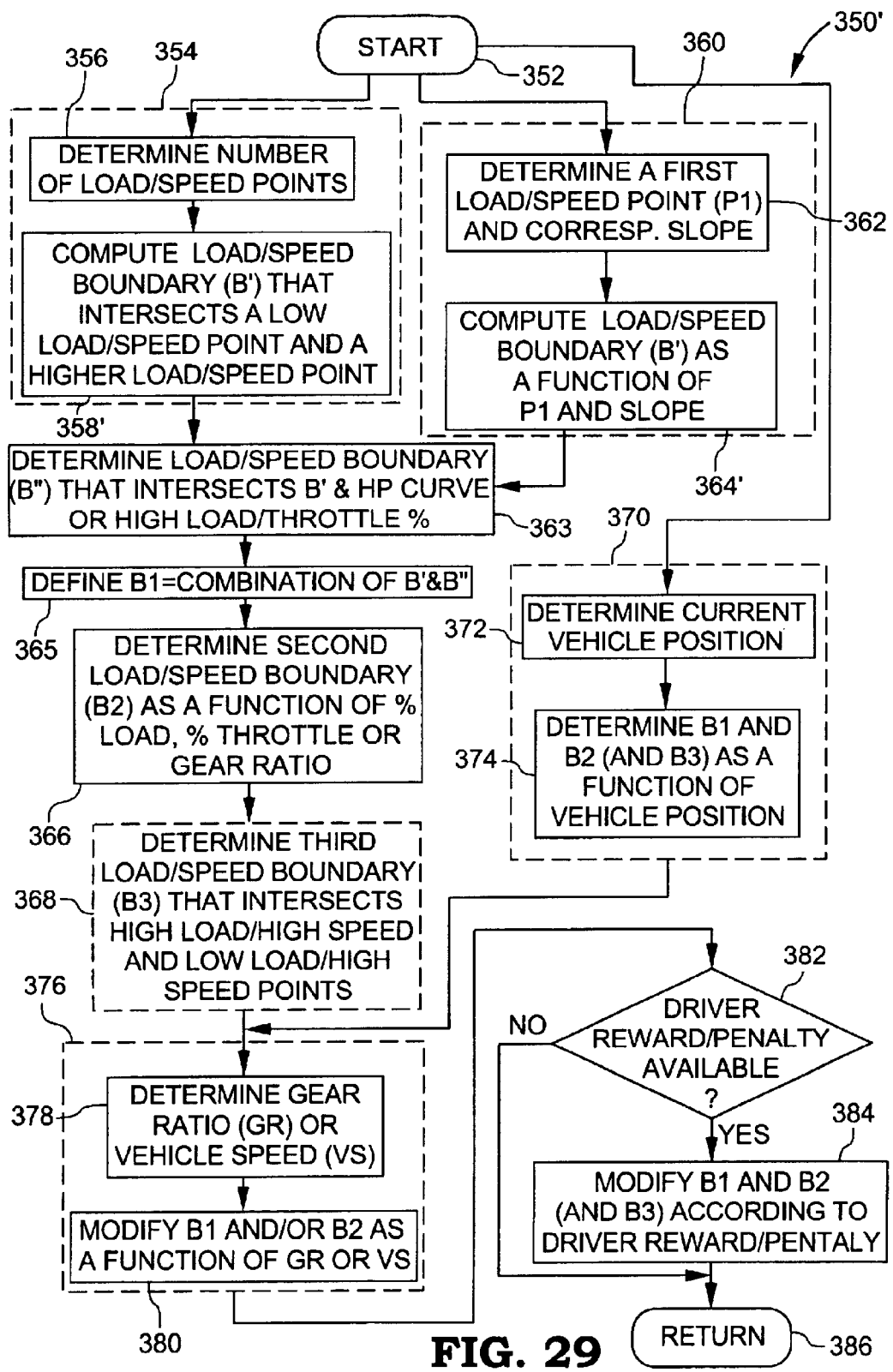
FIG. 29 is a flowchart illustrating one preferred embodiment of a software algorithm similar to that shown in FIG. 15 for executing step 304 of either of FIG. 14 or 24.

Referring now to FIG. 29, a flowchart is shown illustrating an algorithm 350' that may be used to replace the boundary determining algorithm 350 of FIG. 15 (i.e., step 304 of algorithm 300 or algorithm 300') when defining boundary B1 as illustrated in FIGS. 26–28. Algorithm 350' is similar in many respects to algorithm 350 of FIG. 15 and like numbers are therefore used to identify like steps and a detailed description thereof will be omitted here for brevity.

Unlike algorithm 350, algorithm 350' of FIG. 29 advances from step 356 to step 358' where control computer 202 is operable to compute a load/speed boundary B' that intersects a low load/speed point and a low speed/higher load point as described with respect to any of FIGS. 26–28. Likewise, algorithm 350' advances from step 362 to step 364' where control computer 202 is operable to compute boundary B' as a function of P1 and SLOPE (from step 362). Both of steps 358' and 360' advance to step 363 where control computer 202 is operable to determine a load/speed boundary B" that intersects B' and either the horsepower curve 262 or a predetermined high engine load or throttle percentage as described with respect to any of FIGS. 26–28. Thereafter at step 365, boundary B1 is defined as a combination of B' and B" as described hereinabove. The remaining steps of algorithm 350' are identical to like numbered steps of algorithm 350 of FIG. 15.

Figure 30:
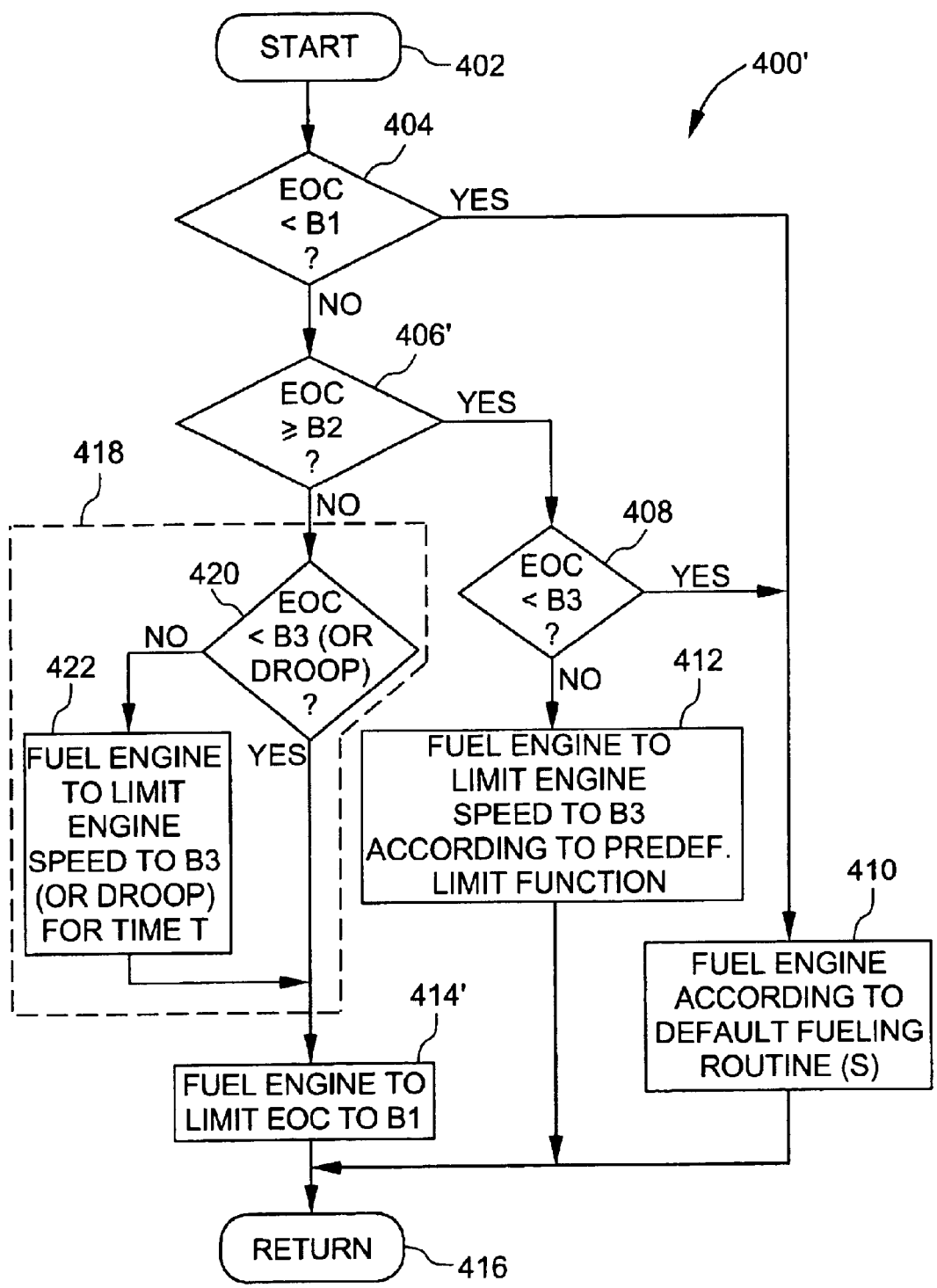
FIG. 30 is a flowchart illustrating one preferred embodiment of a software algorithm similar to that shown in FIGS. 17A and 17B for executing step 314 of FIG. 14 or step 330 of FIG. 24.

Referring now to FIG. 30, a flowchart is shown illustrating an algorithm 400' that may be used to replace the engine control routine 400 or 450 of FIG. 17A or 17B respectively (i.e., step 314 of algorithm 300 or step 330 of algorithm 300') when defining boundary B1 as illustrated in FIGS. 26–28. Algorithm 400' is similar in many respects to algorithm 400 of FIG. 17A and like numbers are therefore used to identify like steps and a detailed description thereof will be omitted here for brevity. Unlike algorithm 400, algorithm 400' of FIG. 30 advances from step 404 to step 406' where control computer 202 is operable to determine whether the engine output conditions (EOC) are greater than or equal to boundary B2; i.e., whether EOC correspond to an engine load or throttle % greater than or equal to B2. Algorithm 400' is likewise different than algorithm 400 at step 414' where control computer 202 is operable to fuel engine 206 to limit engine operating conditions; whether engine load and/or engine speed, and/or other engine operating condition(s), to boundary B1. All other steps of algorithm 400' are identical to like numbered steps of algorithm 400 of FIG. 17A.

Figure 31:
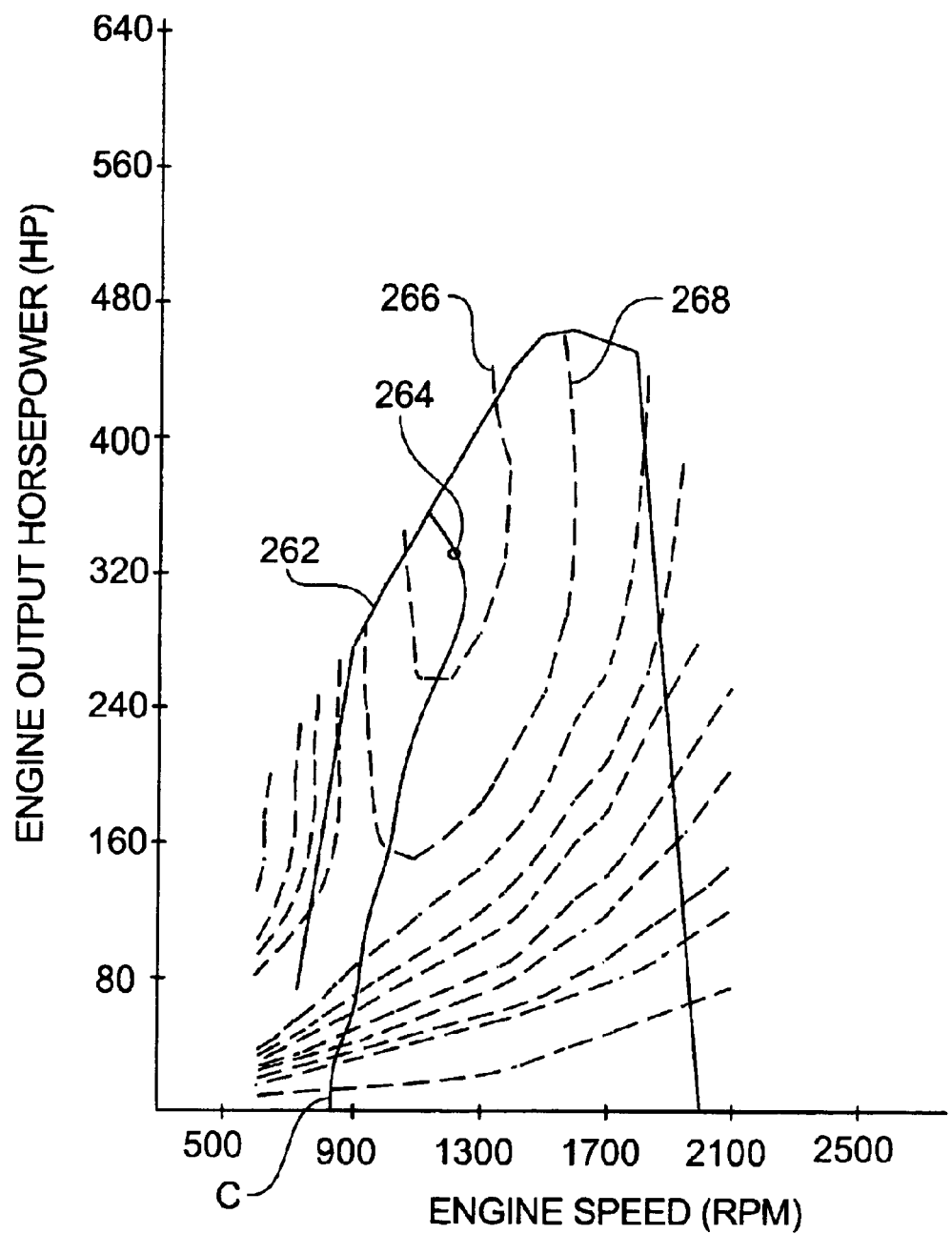
FIG. 31 is a plot of engine output power vs. engine speed illustrating one preferred fuel efficient transition from low to high load engine operation, in accordance with yet another aspect of the present invention.

Referring now to FIGS. 31–36, yet another technique for controlling an internal combustion engine, in accordance with the present invention, will be described in detail. FIG. 31 shows an example of a typical engine output horsepower curve 262 vs. engine speed identical to that of FIGS. 13 and 26. Superimposed onto the engine output horsepower vs. engine speed curve 262 are a number of Brake Specific Fuel Consumption (BSFC) contours (shown in phantom), wherein the areas between each such BSFC contours define so-called BSFC islands as described hereinabove with respect to FIG. 13. Generally, BSFC contour 264 corresponds to an engine output horsepower/engine speed point (or range) where the engine 206 operates most efficiently; i.e., wherein the best fuel economy is achieved. The BSFC island defined between BSFC contours 264 and 266 corresponds to an engine output horsepower/engine speed range in which the engine 206 operates with less efficiency than at BSFC contour 264 yet with better efficiency than at engine horsepower/engine speed conditions outside this island. Similarly, the BSFC island defined between BSFC contour 266 and 268 corresponds to an engine output horsepower/engine speed range in which the engine 206 operates with less efficiency than within the island defined between BSFC contours 264 and 266, and so on.

In accordance with the present invention, an engine load/engine speed contour, such as contour C illustrated in FIG. 31, is defined between low load, preferably 0% load, and high engine load, preferably 100% load, conditions. The engine load/speed contour is then used as a base-line for defining automatic shift points relative thereto in the case of automatically selectable transmission gears, for defining effective gear ratios in the case that transmission 208 is a continuous variable transmission (CVT), or for limiting engine speed relative thereto in the case of manually selectable gear ratios, so that engine operation is maintained within a desired proximity to contour C. In one embodiment, contour C extends between 0–100% engine load values according to the most fuel efficient path therebetween. Such a contour C may, for example, be computed according to the SAE J1939/71 asymmetry adjust standard. Alternatively, contour C may be defined so as to begin at low or zero load at a predefined engine speed value and progress to 100% load (defined by horsepower curve 262) according to the most fuel efficient path therebetween. This latter scenario is illustrated in FIG. 31 wherein the zero load engine speed is defined to be approximately 850 RPM, and wherein contour C traverses the most fuel efficient path from 850 RPM to the horsepower curve 262. It should be noted that contour C, in this embodiment, travels through the lowest load point of each of the BSFC contours 264, 266 and 268, thereby exemplifying the most fuel efficient path therethrough. It is to be understood, however, that the present invention contemplates defining contour C according to any desired criteria, and basing transmission shift points (automatically selectable transmission gears), effective gear ratios (CVT), or limiting engine speed (manually selectable transmission gears) around such a contour to thereby maintain engine operating conditions within a desired proximity of the contour C. With a CVT, however, it should be noted that the effective gear ratios thereof can be controlled in accordance with the concepts described herein, such that engine operation is maintained on, or very near, contour C under all operating conditions less than full power (e.g., on horsepower curve 262) to thereby maximize fuel economy.

By controlling shift points of one or more automatically selectable transmission gears, the embodiment of FIGS. 31–36 is applicable to systems wherein transmission 208 includes a number of automatically selectable gears. In such embodiments, transmission 208 typically includes a transmission control module 242 having an auxiliary control computer connected to control computer 202 via communications link 244 as described hereinabove with respect to FIG. 12. In such systems, algorithms for controlling transmission shift points about contour C of FIG. 31 may thus be executed either by control computer 202 or by the auxiliary control computer within transmission control module 242, wherein the two computers may share information via data link 242 in a known manner. In one embodiment, for example, the auxiliary control computer within transmission control module 242 may execute algorithms for controlling the shift points of the automatically selectable gears of transmission 208, which algorithms will be described in greater detail hereinafter with respect to FIGS. 32, 34A–34B and 36A–36B, wherein any data or other information required from or by control computer 202 may be obtained or broadcast by the auxiliary control computer within the transmission control module 242 via communications link 244. Alternatively, control computer 202 may execute such algorithms wherein data or other information required from or by the auxiliary control computer within transmission control module 242 may be obtained or broadcast by control computer 202 via communications link 244. It should be noted that the foregoing discussion relating to the computer operable to execute the one or more algorithms applies also to the case where transmission 208 is a CVT.

Figure 32:
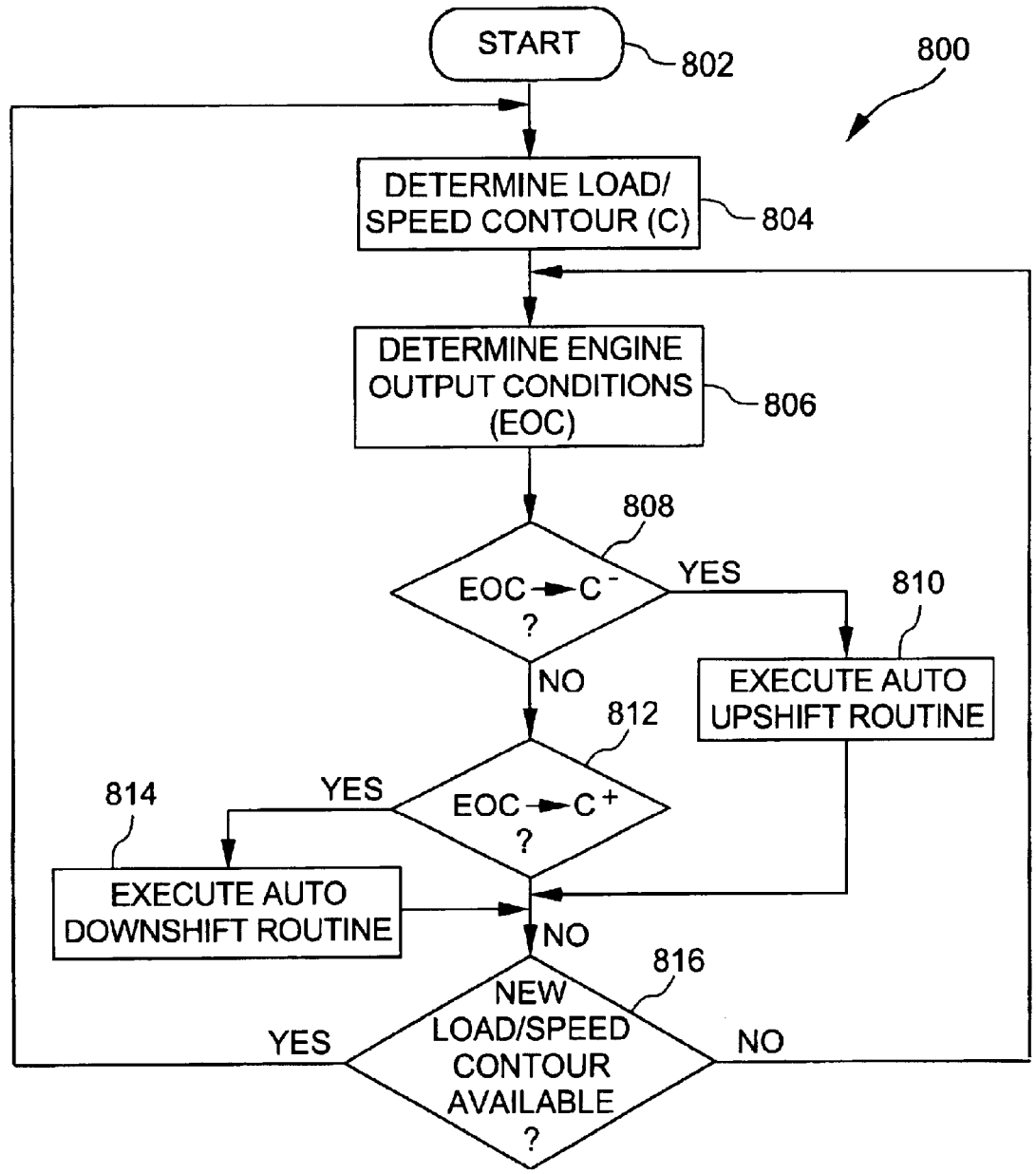
FIG. 32 is a flowchart illustrating one preferred embodiment of a software algorithm for controlling transmission gear shifting in a fuel efficient manner using the system of FIG. 12 and the concepts illustrated in FIG. 31.

Referring now to FIG. 32, a flowchart showing one preferred embodiment of a software algorithm 800 for controlling shift points of an automatic transmission about an engine load/speed contour C and/or for limiting engine speed to thereby encourage manual shifting about the contour C, in accordance with the present invention, is shown. While algorithm 800 will be described hereinafter as being executed by control computer 202, it is to be understood that algorithm 800 may alternatively be executed by the auxiliary control computer within transmission control module 242, if one exists, as described above. In any case, algorithm 800 begins at step 802 and at step 804, control computer 202 is operable to determine an engine load/engine speed contour C preferably using one or more of the techniques described hereinabove. Thereafter at step 806, control computer 202 is operable to determine engine output conditions (EOC) also preferably using one or more of the techniques described hereinabove (e.g., with respect to algorithm 300 or 300'). Thereafter at step 808, control computer 202 is operable to determine whether the engine operating conditions (EOC) determined at step 806 indicate that engine operation is approaching contour C from the left; i.e., engine speed increasing with present engine speed and load less than contour C. If so, algorithm execution advances to step 810 where control computer 202 is operable to execute an upshift routine and advance therefrom to step 816. If, on the other hand, control computer 202 determines at step 808 that EOC is not approaching contour C from the left, algorithm execution advances to step 812.

At step 812, control computer 202 is operable to determine whether the engine operating conditions (EOC) determined at step 806 indicate that engine operation is approaching contour C from the right; i.e., engine speed decreasing with present engine speed and load greater than contour C. If so, algorithm execution advances to step 814 where control computer 202 is operable to execute a downshift routine and advance to step 816 of algorithm 800. If, on the other hand, control computer 202 determines at step 812 that EOC is not approaching contour C from the right, algorithm advances to step 816 where control computer 202 is operable to determine whether a new load/speed contour, or data relating thereto, is available. For example, if system 200 (FIG. 12) includes GPS system 250, signal transceiver 254 and/or interface module 246, new load/speed contour data may be available via any one or more of these sources. If such new or updated load/speed contour data is available at step 816, algorithm execution loops back to step 804. Otherwise, algorithm execution loops back to step 806. Those skilled in the art will recognize that algorithm 800 may be readily adapted to an embodiment wherein transmission 208 is a CVT by omitting steps 812 and 814, and by modifying steps 808 and 810. In this embodiment, for example, control computer 202 is operable at step 808 to determine whether EOC is on (or within some predefined engine speed difference of) contour C. If so, algorithm execution advances to step 816. If, on the other hand, control computer 202 determines at step 808 that EOC is not on (or near) contour C, control computer 202 is operable to instruct the auxiliary computer within transmission control module 242 to adjust the effective gear ratio of CVT 208, in a manner known in the art, to thereby maintain EOC on (or near) contour C.

Figure 33:
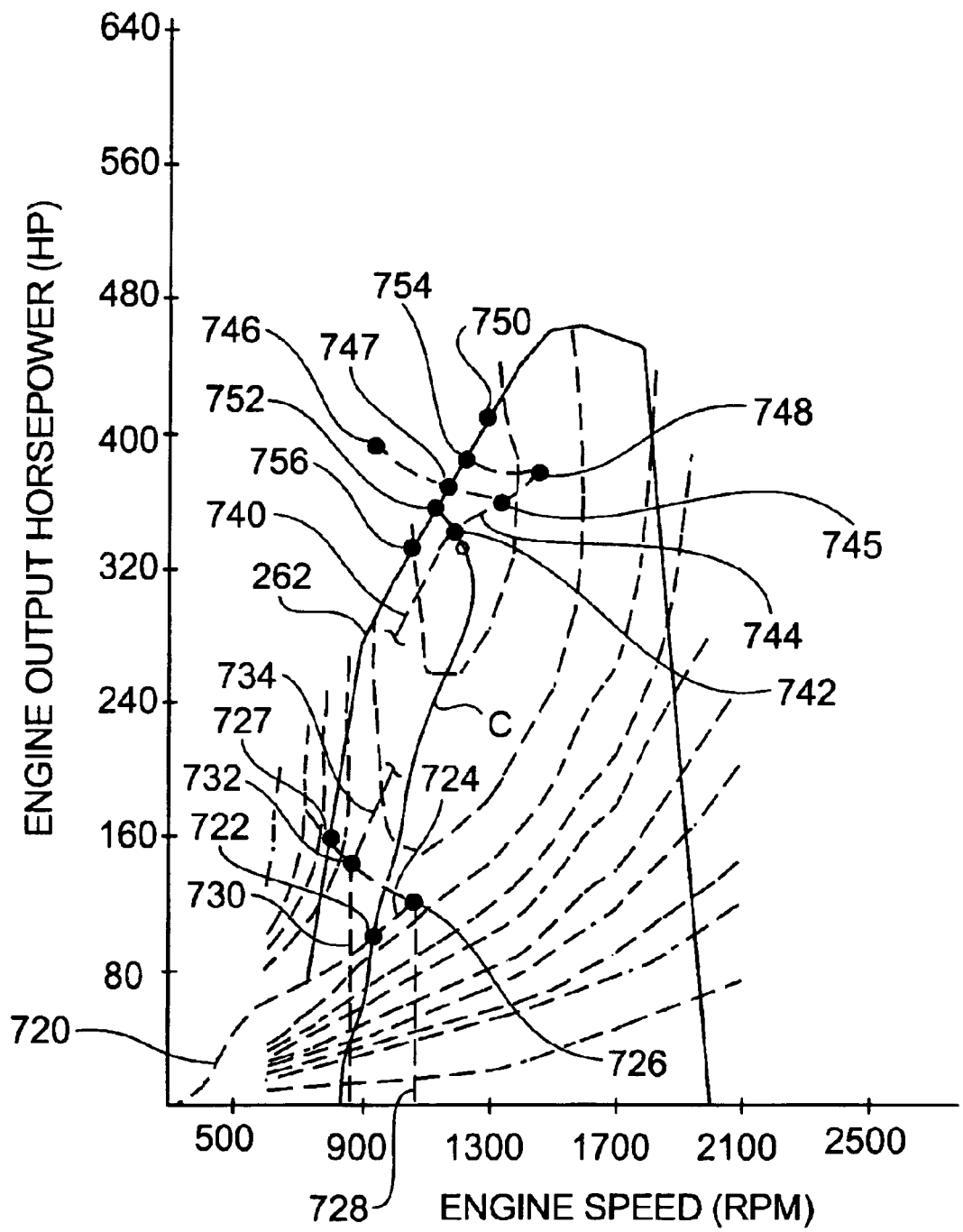
FIG. 33 is a plot of engine output power vs. engine speed similar to that of FIG. 31 and illustrating one preferred upshift control strategy for controlling transmission gear shifting in a fuel efficient manner in accordance with the present invention.
Figure 34A:
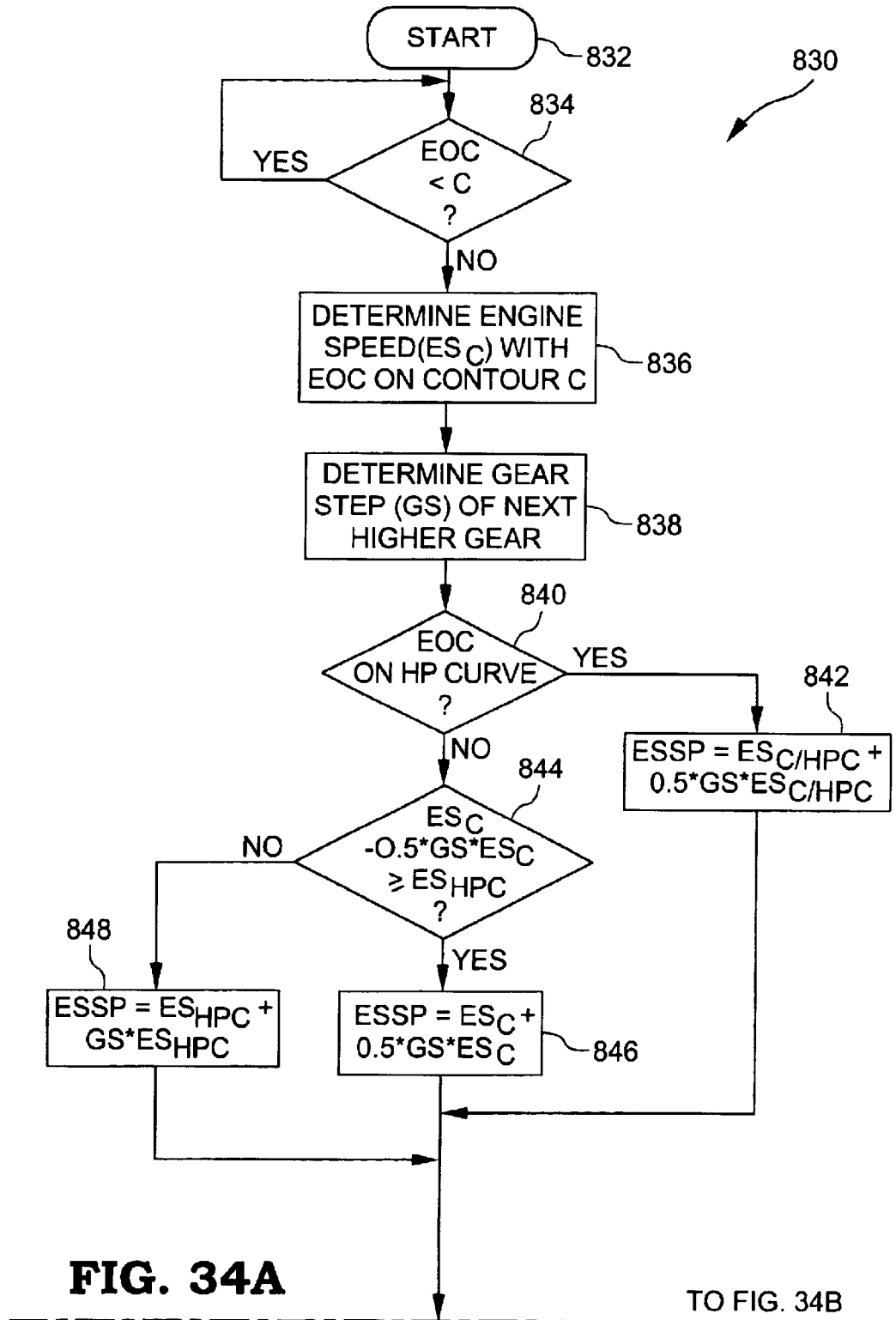
FIG. 34 is composed of FIGS. 34A and 34B and is a flowchart illustrating one preferred embodiment of a software algorithm for executing step 810 of the algorithm of FIG. 32 to thereby control transmission gear upshifting as illustrated in FIG. 33.
Figure 34B:
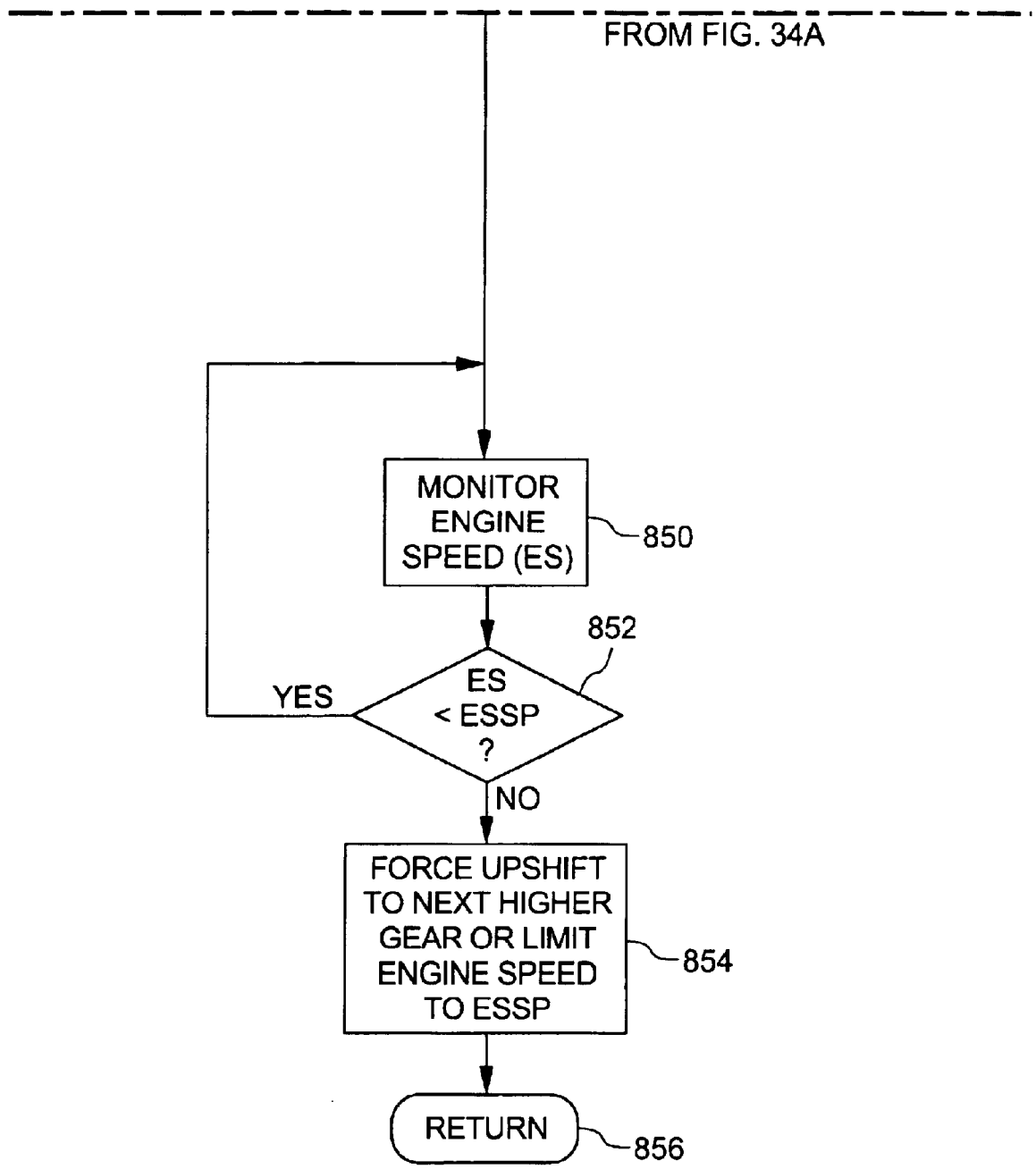

Referring now to FIGS. 33 and 34A–34B, a flowchart (FIGS. 34A–34B) and graphical illustration thereof (FIG. 33) are shown, wherein the flowchart of FIG. 34 illustrates one preferred embodiment of a software algorithm 830 for executing the upshift routine of step 810 of algorithm 800 in the event that transmission 208 includes one or more automatically selectable gear ratios and/or one or more manually selectable gear ratios. Algorithm 830 will be described with the aid of FIG. 33 to illustrate various upshift scenarios in relation to contour C and horsepower curve 262. Algorithm 830 begins at step 832 and at step 834, control computer 202 is operable to determine whether EOC is less than; i.e., to the left of, contour C. If so, algorithm execution loops back to step 834. If, at step 834, control computer 202 determines that EOC is not less than contour C; i.e., EOC is equal to or lies on C, algorithm execution continues at step 836 where control computer is operable to determine an engine speed ($ES_C$) at which the engine operating conditions cross or intersect contour C.

From step 836, algorithm execution advances to step 838 where control computer 202 is operable to determine a gear step (GS) from the presently engaged transmission gear to the next numerically higher transmission gear. In one embodiment, the various gear steps of transmission 208 are stored in memory 204, or in a similar memory unit within transmission control module 242. In an alternative embodiment, control computer 202 is operable to periodically learn the various gear steps of transmission 208, preferably by periodically computing such steps as a function of engine and tailshaft speeds, or by other known techniques, during normal shifting operations and then storing the learned gear steps in memory. In either case, control computer 202 is accordingly operable to determine GS at step 838 by determining a presently engaged transmission gear (preferably via a ratio of engine and tailshaft speeds or other known technique) and then by retrieving a corresponding gear step to the next numerically higher transmission gear from memory.

Algorithm execution advances from step 838 to step 840 where control computer 202 is operable to determine whether the engine operating conditions (EOC) are located on the horsepower curve; i.e., on curve 262. If so, algorithm execution advances to step 842 where an engine speed shift point (ESSP) is calculated as a function of the engine speed that intersects contour C and lies on the horsepower curve ($ES_{C/HPC}$) and also as a function of gear step (GS). In one embodiment, as illustrated at step 842 in FIG. 34A, ESSP= $ES_{C/HPC}+0.5*GS*ES_{C/HPC}$. In other words, the engine speed shift point ESSP is set equal to the current engine speed $ES_{C/HPC}$ plus ½ of the gear step GS times the current engine speed, although the present invention contemplates that ESSP may alternatively be computed as a function of any desired fraction of $ES_{C/HPC}*GS$. For example, in cases where it is desirable to maintain full power when engine operating conditions (EOC) are located on the horsepower curve 262, step 842 may be modified such that ESSP=$ES_{C/HPC}+GS*ES_{C/HPC}$. In any case, algorithm execution advances from step 842 to step 850 (FIG. 34B).

If, at step 840, control computer 202 determines that EOC is not on the horsepower curve 262, algorithm execution advances to step 844 to compare an engine speed ($ES_C$− $0.5*GS*ES_C$) that would occur after a shift using a preferred engine speed shift point value; i.e., ($ES_C+0.5*GS*ES_C$) with a horsepower curve engine speed value $ES_{HPC}$ corresponding to an engine speed point on the horsepower curve 262 that lies on the trajectory between the preferable engine speed shift point value ($ES_C+0.5*GS*ES_C$) and the resulting engine speed ($ES_C−0.5*GS*ES_C$) that would occur after the shift. If the engine value ($ES_C−0.5*GS*ES_C$) is greater than or equal to $ES_{HPC}$, algorithm execution advances to step 846 where control computer 202 is operable to set the engine speed shift point (ESSP) to the preferred engine speed shift point value ($ES_C+0.5*GS*ES_C$) that is a function of the engine speed that intersects with the contour C and also as a function of gear step (GS). Preferably, as just described, ESSP=$ES_C$+0.5*GS*$ES_C$ so that the engine speed shift point ESSP is set equal to the current engine speed $ES_C$ plus ½ of the gear step GS times the current engine speed, although it is to be understood that the present invention contemplates that ESSP may alternatively be computed as a function of any desired fraction of $ES_C$*GS. In any case, algorithm execution advances from step 846 to step 850 (FIG. 34B).

If, at step 844, the engine speed value ($ES_C$−0.5*GS*$ES_C$) is less than $ES_{HPC}$, algorithm execution advances to step 848 where control computer 202 is operable to compute the engine speed shift point (ESSP) as a function of the horsepower engine speed $E_{HP}$ and also as a function of gear step (GS). In one embodiment, as illustrated at step 846 in FIG. 34A, ESSP=$ES_{HP}$+GS*$ES_{HP}$. In other words, the engine speed shift point ESSP is set equal to the horsepower engine speed value $ES_{HP}$ plus the gear step GS times the horsepower engine speed value $ES_{HP}$, although the present invention contemplates that ESSP may alternatively be computed as a function of any desired fraction of $ES_C$*GS. In any case, algorithm execution advances from step 848 to step 850 (FIG. 34B).

Steps 842, 846 and 848 each advance to step 850 (FIG. 34B) where control computer 202 is operable to monitor engine speed (ES), and thereafter at step 852 to compare the current engine speed ES with the computed engine speed shift point ESSP. If, at step 852, the current engine speed is less than ESSP, algorithm execution loops back to step 850. If, however, control computer 202 determines at step 852 that the engine speed is not less than ESSP (and is therefore at least equal to ESSP), algorithm execution advances to step 854.

If the next numerically higher transmission gear is an automatically selectable transmission gear, control computer 202 is preferably operable at step 854 to force an automatic upshift to the next numerically higher transmission gear using one or more known techniques therefore. If, on the other hand, the next numerically higher transmission gear is a manually selectable transmission gear, control compute 202 is preferably operable at step 854 to limit engine speed to ESSP to therefore encourage a manual shift to the next higher transmission gear. Algorithm execution advances from step 854 to step 856 where algorithm 830 is returned to step 810 of algorithm 800.

Referring now to FIG. 33, examples of algorithm 800 are illustrated for three different upshift scenarios; namely those separately involving steps 842, 846 and 848. According to a first upshift scenario, engine operation is shown in FIG. 33 traversing path 720 toward contour C, wherein control computer 202 is operable at step 834 to monitor EOC. When engine operation reaches contour C, control computer 202 is operable at step 836 to determine the engine speed value $ES_C$, corresponding to the engine speed at which engine operating conditions intersect contour C, as the point 722. Since the current engine operating conditions EOC do not lie on the horsepower curve 262, control computer 202 is operable to execute step 844 and compare the engine speed ($ES_C$−0.5*GS*$ES_C$); e.g., point 732, that would occur after a shift using a preferred engine speed shift point value of ($ES_C$+0.5*GS*$ES_C$), e.g., point 726, with a horsepower curve engine speed value $ES_{HPC}$, e.g., point 727, corresponding to an engine speed point on the horsepower curve 262 that lies on the trajectory between the preferable engine speed shift point value ($ES_C$+0.5*GS*$ES_C$); e.g., point 726, and the resulting engine speed, e.g., point 732, that would occur after the shift. Since the engine speed value ($ES_C$−0.5*GS*$ES_C$) is less than $E_{HP}$; i.e., the engine speed corresponding to point 727 is less than the engine speed corresponding to point 732, control computer 202 is operable at step 846 to compute the engine speed shift point ESSP according to the preferred engine speed shift point equation ESSP=$ES_C$+0.5*GS*$ES_C$.

Thereafter at step 850, control computer 202 is operable to monitor engine speed as engine operation traverses along path 724. At step 852, control computer 202 has determined that engine speed has reached ESSP, and in one embodiment wherein the next numerically higher transmission gear is an automatically selectable transmission gear, control computer is operable at step 854 to force an upshift to the next numerically higher transmission gear. In an alternate embodiment wherein the next numerically higher transmission gear is a manually selectable transmission gear, control computer 202 is operable at step 854 to limit engine speed to ESSP; e.g., point 726 to thereby encourage a manual upshift. In either case, if an upshift occurs, engine operation follows path 728 and 730 to point 732 which corresponds to engine operating conditions after the upshift, after which engine operating conditions follow path 734 toward contour C for another upshift scenario.

According to a second upshift scenario illustrated in FIG. 33, engine operation is shown traversing path 740 toward contour C, wherein control computer 202 is operable at step 834 to monitor EOC. When engine operation reaches contour C, control computer 202 is operable at step 836 to determine the engine speed value $ES_C$, corresponding to the engine speed at which engine operating conditions intersect contour C, as the point 742. Since the current engine operating conditions EOC do not lie on the horsepower curve 262, control computer 202 is operable to execute step 844 and compare the engine speed ($ES_C$−0.5*GS*$ES_C$); e.g., point 746, that would computationally occur after a shift using a preferred engine speed shift point value of ($ES_C$+0.5*GS*$ES_C$), e.g., point 744, with a horsepower curve engine speed value $ES_{HPC}$, e.g., point 747, corresponding to an engine speed point on the horsepower curve 262 that lies on the trajectory between the preferable engine speed shift point value ($ES_C$+0.5*GS*$ES_C$); e.g., point 744, and the resulting engine speed, e.g., point 746, that would computationally occur after the shift. Since the control computer 202 is operable to determine at step 844, in this scenario, that the engine speed value ($ES_C$−0.5*GS*$ES_C$); e.g., point 746, is less than $E_{HP}$; i.e., point 747, control computer 202 is thereafter operable at step 848 to compute the engine speed shift point ESSP according to the engine speed shift point equation ESSP=$ES_{HPC}$+GS*$ES_{HPC}$, wherein this new engine speed shift point ESSP is illustrated by point 748 in FIG. 3.

Thereafter at step 850, control computer 202 is operable to monitor engine speed as engine operation traverses along path 744. At step 852, control computer 202 has determined that engine speed has reached ESSP; e.g., point 748, and in one embodiment wherein the next numerically higher transmission gear is an automatically selectable transmission gear, control computer is operable at step 854 to force an upshift to the next numerically higher transmission gear. In an alternate embodiment wherein the next numerically higher transmission gear is a manually selectable transmission gear, control computer 202 is operable at step 854 to limit engine speed to ESSP; e.g., point 748, to thereby encourage a manual upshift. In either case, if an upshift occurs, engine operation following the upshift is illustrated by point 750 in FIG. 33. It should now be apparent that in this scenario control computer 202 is operable to modify the preferred engine speed shift point when the resulting engine speed after the upshift would computationally be located outside horsepower curve 262. In this case, control computer is operable to allow engine speed to increase more so than in the preferable case so as to establish an engine speed upshift point after which engine operation will be located on the horsepower curve 262.

According to a third upshift scenario illustrated in FIG. 33, engine operation is traversing along the horsepower curve 262 toward point 752 from the left. After control computer 202 determines that EOC is no longer less than contour C at step 834, control computer 202 is operable at step 840 to determine that the current engine speed $ES_{C/HPC}$ that intersects contour C also lies on the horsepower curve 262, which corresponds to point 752. Since control computer 202 is operable to determine at step 840 that EOC is on the horsepower curve 262, control computer 202 is thereafter operable at step 842 to compute the engine speed shift point ESSP as $ES_{C/HPC}+0.5*GS*ES_{C/HPC}$, corresponding to point 754 in FIG. 33. Thereafter at step 850, control computer 202 is operable to monitor the movement of engine speed toward point 754. Thereafter at step 852, control computer 202 has determined that engine speed has reached ESSP; e.g., point 750, and in one embodiment wherein the next numerically higher transmission gear is an automatically selectable transmission gear, control computer is operable at step 854 to force an upshift to the next numerically higher transmission gear. In an alternate embodiment wherein the next numerically higher transmission gear is a manually selectable transmission gear, control computer 202 is operable at step 854 to limit engine speed to ESSP; e.g., point 750, to thereby encourage a manual upshift. In either case, if an upshift occurs, engine operation following the upshift is illustrated by point 756 in FIG. 33. It is to be understood that the engine operating points illustrated and described with respect to FIG. 33 are given only by way of example, and that actual pre-shift and/or post-shift engine operating points will typically be dictated by a number of engine operating conditions with respect to horsepower curve 262, wherein such engine operating conditions may typically include, but are not limited to, engine load and/or % throttle.

Figure 35:
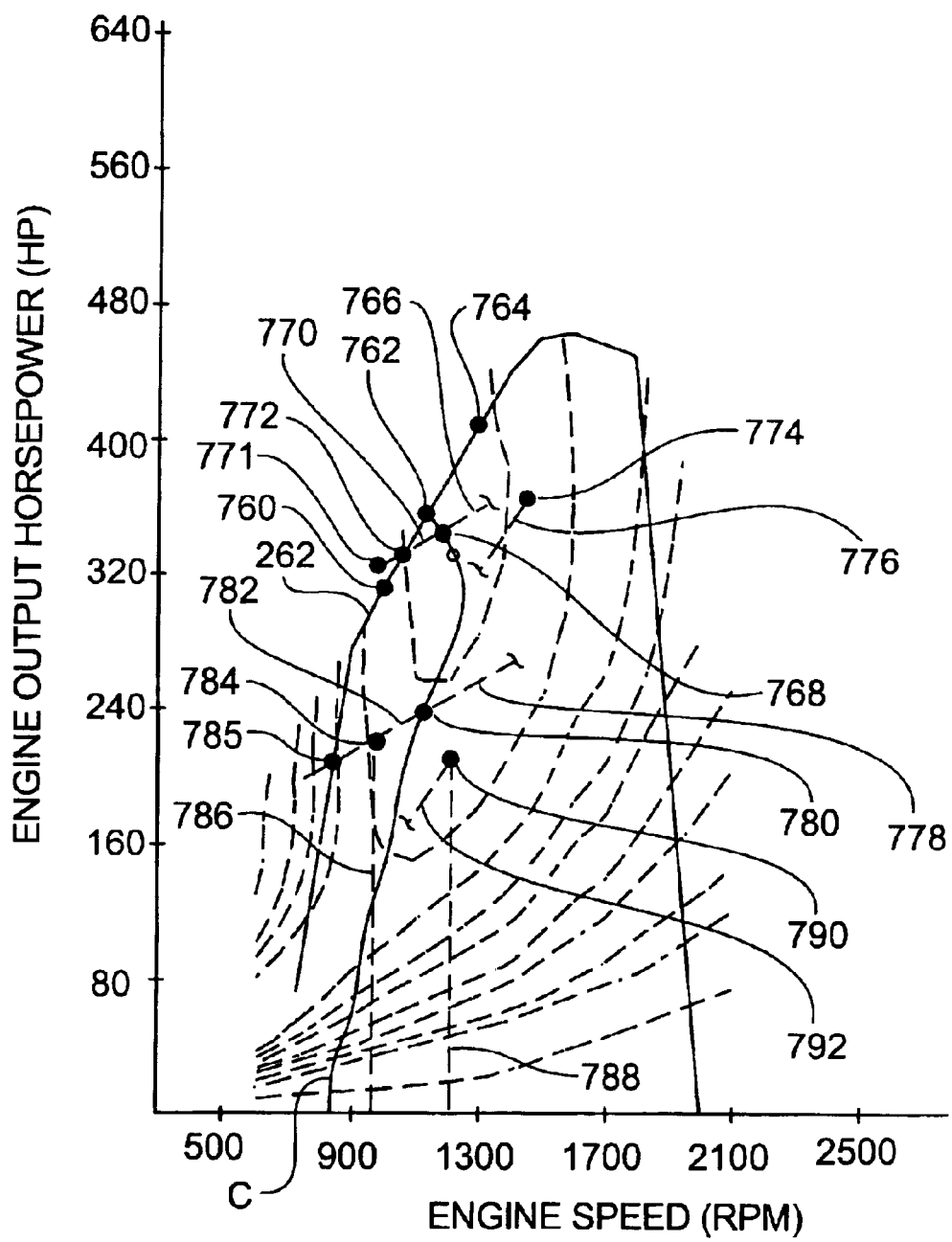
FIG. 35 is a plot of engine output power vs. engine speed similar to that of FIG. 31 and illustrating one preferred downshift control strategy for controlling transmission gear shifting in a fuel efficient manner in accordance with the present invention.
Figure 36A:
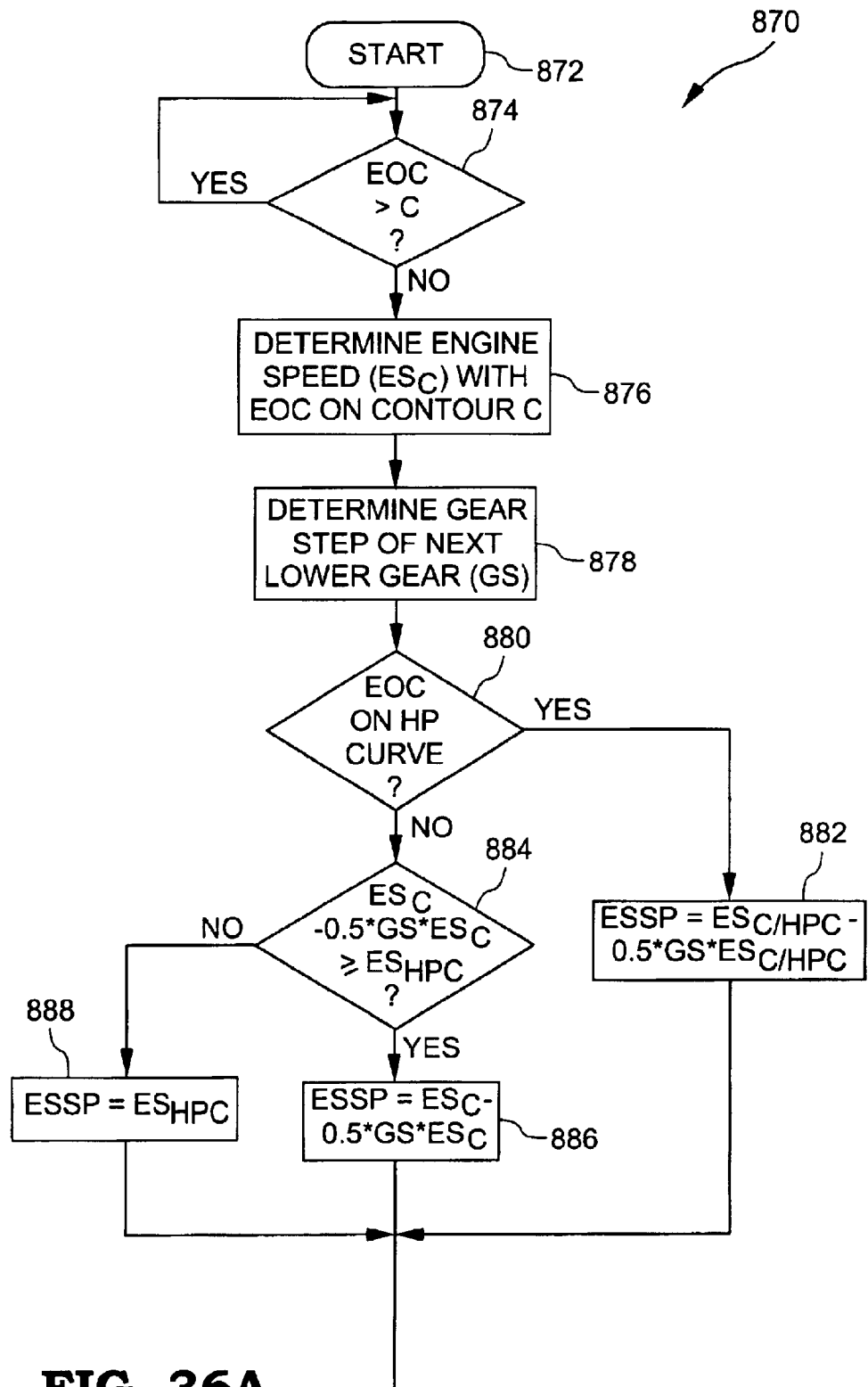
FIG. 36 is composed of FIGS. 36A and 36B and is a flowchart illustrating one preferred embodiment of a software algorithm for executing step 814 of the algorithm of FIG. 32 to thereby control transmission gear downshifting as illustrated in FIG. 35.
Figure 36B:
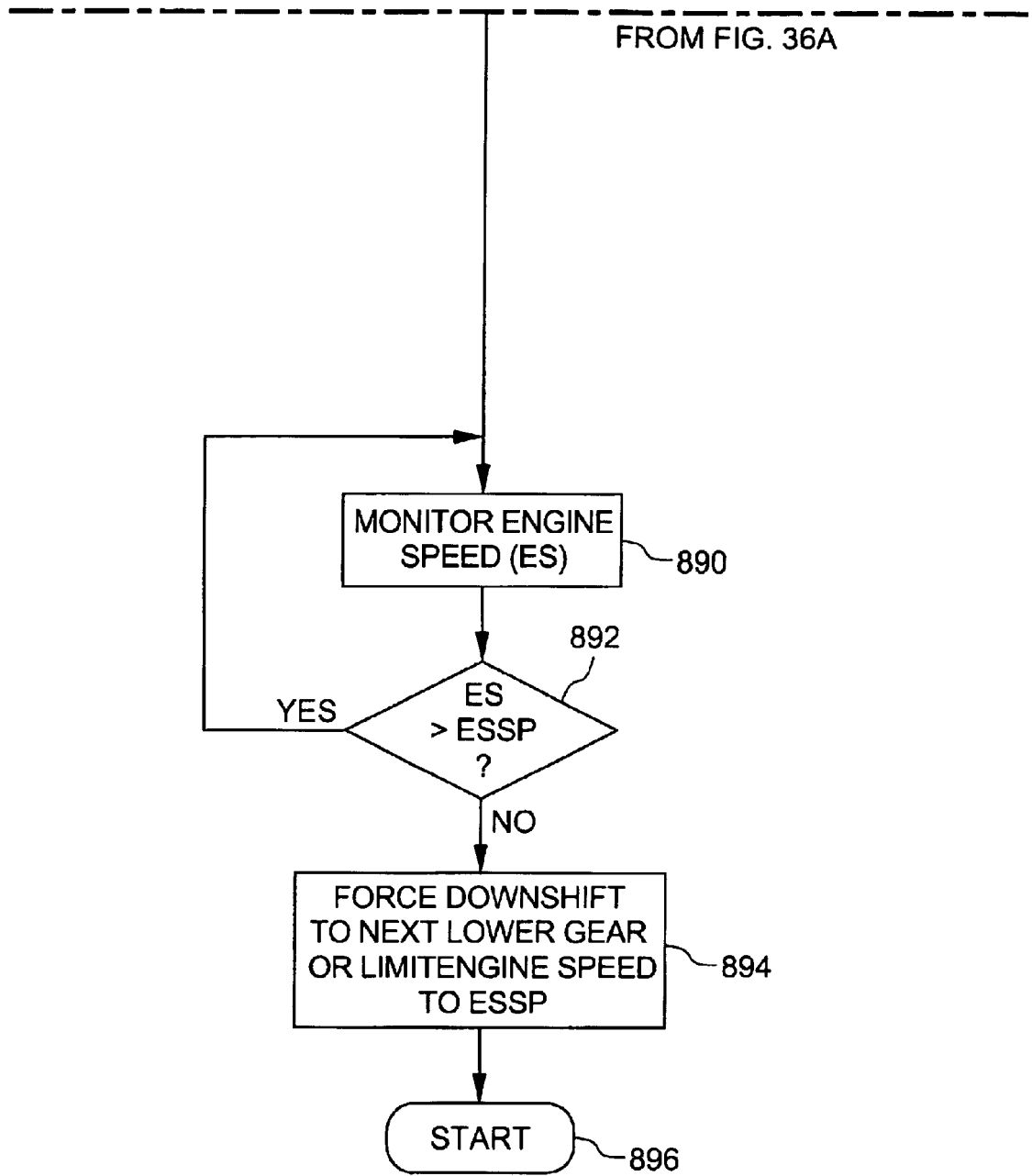

Referring now to FIGS. 35 and 36A–36B, a flowchart (FIGS. 36A–36B) and graphical illustration thereof (FIG. 35) are shown, wherein the flowchart of FIG. 36 illustrates one preferred embodiment of a software algorithm 870 for executing the downshift routine of step 814 of algorithm 800 in the event that transmission 208 includes one or more automatically selectable gear ratios and/or one or more manually selectable gear ratios. Algorithm 870 will be described with the aid of FIG. 35 to illustrate various downshift scenarios in relation to contour C and horsepower curve 262. Algorithm 870 begins at step 872 and at step 874, control computer 202 is operable to determine whether EOC is greater than; i.e., to the right of, contour C. If so, algorithm execution loops back to step 874. If, at step 874, control computer 202 determines that EOC is not greater than contour C; i.e., EOC is equal to or lies on C, algorithm execution continues at step 876 where control computer is operable to determine an engine speed ($ES_C$) at which the engine operating conditions cross or intersect contour C.

From step 876, algorithm execution advances to step 878 where control computer 202 is operable to determine a gear step (GS) from the presently engaged transmission gear to the next numerically lower transmission gear. In one embodiment, the various gear steps of transmission 208 are stored in memory 204, or in a similar memory unit within transmission control module 242. In an alternative embodiment, control computer 202 is operable to periodically learn the various gear steps of transmission 208, preferably by periodically computing such steps as a function of engine and tailshaft speeds, or by other known techniques, during normal shifting operations and then storing the learned gear steps in memory. In either case, control computer 202 is accordingly operable to determine GS at step 878 by determining a presently engaged transmission gear (preferably via a ratio of engine and tailshaft speeds or other known technique) and then by retrieving a corresponding gear step to the next numerically lower transmission gear from memory.

Algorithm execution advances from step 878 to step 880 where control computer 202 is operable to determine whether the engine operating conditions (EOC) are located on the horsepower curve; i.e., on curve 262. If so, algorithm execution advances to step 882 where an engine speed shift point (ESSP) is calculated as a function of the engine speed that intersects contour C and that lies on the horsepower curve ($ES_{C/HPC}$) and also as a function of gear step (GS). In one embodiment, as illustrated at step 882 in FIG. 36A, $ESSP=ES_{C/HPC}-0.5*GS*ES_{C/HPC}$. In other words, the engine speed shift point ESSP is set equal to the current engine speed $ES_{C/HPC}$ minus ½ of the gear step GS times the current engine speed, although the present invention contemplates that ESSP may alternatively be computed as a function of any desired fraction of $ES_{C/HPC}*GS$. For example, in cases where it is desirable to maintain full power when engine operating conditions (EOC) are located on the horsepower curve 262, step 882 may be modified such that $ESSP=ES_{C/HPC}-GS*ES_{C/HPC}$. In any case, algorithm execution advances from step 882 to step 890 (FIG. 36B).

If, at step 880, control computer 202 determines that EOC is not on the horsepower curve 262, algorithm execution advances to step 884 to compare a preferred engine speed shift point value ($ES_C-0.5*GS*ES_C$) with a horsepower curve engine speed value $ES_{HPC}$ corresponding to an engine speed point on the horsepower curve 262 that lies on the trajectory between the preferable engine speed shift point value ($ES_C-0.5*GS*ES_C$) and the engine speed $ES_C$ on the contour C. If the preferred engine speed shift point value ($ES_C-0.5*GS*ES_C$) is greater than or equal to $ES_{HPC}$, algorithm execution advances to step 886 where control computer 202 is operable to set the engine speed shift point (ESSP) to the preferred engine speed shift point value ($ES_C-0.5*GS*ES_C$) that is a function of the engine speed $ES_C$ that intersects the contour C and also as a function of gear step (GS). Preferably, as just described, $ESSP=ES_C-0.5*GS*ES_C$ so that the engine speed shift point ESSP is set equal to the current engine speed $ES_C$ minus ½ of the gear step GS times the current engine speed, although it is to be understood that the present invention contemplates that ESSP may alternatively be computed as a function of any desired fraction of $ES_C*GS$. In any case, algorithm execution advances from step 886 to step 890 (FIG. 36B).

If, at step 884, the preferred engine speed shift point value ($ES_C-0.5*GS*ES_C$) is less than $ES_{HPC}$, algorithm execution advances to step 888 where control computer 202 is preferably operable to set the engine speed shift point (ESSP) to $ES_{HPC}$. Alternatively, control computer 202 may set the engine speed shift point value ESSP to any desired engine speed between $ES_C$ and $ES_{HP}$ that lies on the trajectory therebetween. In any case, algorithm execution advances from step 888 to step 890 (FIG. 36B).

Steps 882, 886 and 888 each advance to step 890 (FIG. 36B) where control computer 202 is operable to monitor engine speed (ES), and thereafter at step 892 to compare the current engine speed ES with the computed engine speed shift point ESSP. If, at step 892, the current engine speed is greater than ESSP, algorithm execution loops back to step 890. If, however, control computer 202 determines at step 892 that the engine speed is not greater than ESSP (and is therefore at least equal to ESSP), algorithm execution advances to step 894.

If the next numerically lower transmission gear is an automatically selectable transmission gear, control computer 202 is preferably operable at step 894 to force an automatic downshift to the next numerically lower transmission gear using one or more known techniques therefore. If, on the other hand, the next numerically lower transmission gear is a manually selectable transmission gear, control compute 202 is preferably operable at step 894 to limit engine speed to ESSP to therefore encourage a manual shift to the next lower transmission gear. Algorithm execution advances from step 894 to step 896 where algorithm 870 is returned to step 814 of algorithm 800.

Referring now to FIG. 35, examples of algorithm 800 are illustrated for three different upshift scenarios; namely those separately involving steps 842, 846 and 848. According to a first downshift scenario, engine operation is shown in FIG. 35 traversing path 778 toward contour C, wherein control computer 202 is operable at step 874 to monitor EOC. When engine operation reaches contour C, control computer 202 is operable at step 876 to determine the engine speed value $ES_C$, corresponding to the engine speed at which engine operating conditions intersect contour C, as the point 780. Since the current engine operating conditions EOC do not lie on the horsepower curve 262, control computer 202 is operable to execute step 884 and compare the preferred engine speed shift point value ($ES_C$–0.5*GS*$ES_C$); e.g., point 784, with a horsepower curve engine speed value $ES_{HPC}$, e.g., point 785, corresponding to an engine speed point on the horsepower curve 262 that lies on the trajectory between the preferable engine speed shift point value ($ES_C$–0.5*GS*$ES_C$); e.g., point 784, and the current engine speed value $ES_C$; e.g., point 780. Since the preferred engine speed shift point value ($ES_C$–0.5*GS*$ES_C$) is less than $E_{HP}$; i.e., the engine speed corresponding to point 784 is less than the engine speed corresponding to point 785, control computer 202 is operable at step 886 to compute the engine speed shift point ESSP according to the preferred engine speed shift point equation ESSP=$ES_C$–0.5*GS*$ES_C$.

Thereafter at step 890, control computer 202 is operable to monitor engine speed as engine operation traverses along path 782. At step 892, control computer 202 has determined that engine speed has reached ESSP, and in one embodiment wherein the next numerically lower transmission gear is an automatically selectable transmission gear, control computer is operable at step 894 to force a downshift to the next numerically lower transmission gear. In an alternate embodiment wherein the next numerically lower transmission gear is a manually selectable transmission gear, control computer 202 is operable at step 894 to limit engine speed to ESSP; e.g., point 784 to thereby encourage a manual downshift. In either case, if a downshift occurs, engine operation follows path 786 and 788 to point 790 which corresponds to engine operating conditions after the downshift, and after which engine operation follows path 792 toward contour C for another downshift scenario.

According to a second downshift scenario illustrated in FIG. 35, engine operation is shown traversing path 766 toward contour C, wherein control computer 202 is operable at step 874 to monitor EOC. When engine operation reaches contour C, control computer 202 is operable at step 876 to determine the engine speed value $ES_C$, corresponding to the engine speed at which engine operating conditions intersect contour C, as the point 768. Since the current engine operating conditions EOC do not lie on the horsepower curve 262, control computer 202 is operable to execute step 884 and compare the preferred engine speed shift point value ($ES_C$–0.5*GS*$ES_C$); e.g., point 771, with a horsepower curve engine speed value $ES_{HPC}$, e.g., point 772, corresponding to an engine speed point on the horsepower curve 262 that lies on the trajectory between the preferable engine speed shift point value ($ES_C$–0.5*GS*$ES_C$); e.g., point 771, and the current engine speed $ES_C$; e.g., point 768. Since the control computer 202 is operable to determine at step 884, in this scenario, that the preferred engine speed shift point value ($ES_C$–0.5*GS*$ES_C$); e.g., point 771, is less than $E_{HP}$; i.e., point 772, control computer 202 is thereafter operable at step 888 to compute the engine speed shift point ESSP according to the engine speed shift point equation ESSP=$ES_{HPC}$ illustrated by point 772 in FIG. 35.

Thereafter at step 890, control computer 202 is operable to monitor engine speed as engine operation traverses along path 770. At step 892, control computer 202 has determined that engine speed has reached ESSP; e.g., point 772, and in one embodiment wherein the next numerically lower transmission gear is an automatically selectable transmission gear, control computer is operable at step 894 to force a downshift to the next numerically lower transmission gear. In an alternate embodiment wherein the next numerically lower transmission gear is a manually selectable transmission gear, control computer 202 is operable to limit engine speed to ESSP; e.g., point 772, to thereby encourage a manual downshift. In either case, if a downshift occurs, engine operation following the downshift is illustrated by point 774 in FIG. 35, after which engine operation follows path 776 toward contour C for another downshift scenario. It should now be apparent that in this scenario control computer 202 is operable to modify the preferred engine speed shift point when the preferred engine speed shift point would computationally be located outside horsepower curve 262. In this case, control computer is operable to set the engine speed shift point at an engine speed located on the horsepower curve 262.

According to a third downshift scenario illustrated in FIG. 35, engine operation is traversing along the horsepower curve 262 toward point 762 from the right. After control computer 202 determines that EOC is no longer greater than contour C at step 874, control computer 202 is operable at step 880 to determine that the current engine speed $ES_{C/HPC}$ that intersects contour C also lies on the horsepower curve 262, which corresponds to point 762. Since control computer 202 is operable to determine at step 880 that EOC is on the horsepower curve 262, control computer 202 is thereafter operable at step 882 to compute the engine speed shift point ESSP as $ES_{C/HPC}$–0.5*GS*$ES_{C/HPC}$, corresponding to point 760 in FIG. 35. Thereafter at step 890, control computer 202 is operable to monitor the movement of engine speed toward point 760. Thereafter at step 892, control computer 202 has determined that engine speed has reached ESSP; e.g., point 760, and in one embodiment wherein the next numerically lower transmission gear is an automatically selectable transmission gear, control computer is operable at step 894 to force a downshift to the next numerically lower transmission gear. In an alternate embodiment wherein the next numerically lower transmission gear is a manually selectable transmission gear, control computer 202 is operable at step 894 to limit engine speed to ESSP;

e.g., point 760, to thereby encourage a manual downshift. In either case, if a downshift occurs, engine operation following the downshift is illustrated by point 764 in FIG. 35. It is to be understood that the engine operating points illustrated and described with respect to FIG. 35 are given only by way of example, and that actual pre-shift and/or post-shift engine operating points will typically be dictated by a number of engine operating conditions with respect to horsepower curve 262, wherein such engine operating conditions may typically include, but are not limited to, engine load and/or % throttle.

Figure 37:
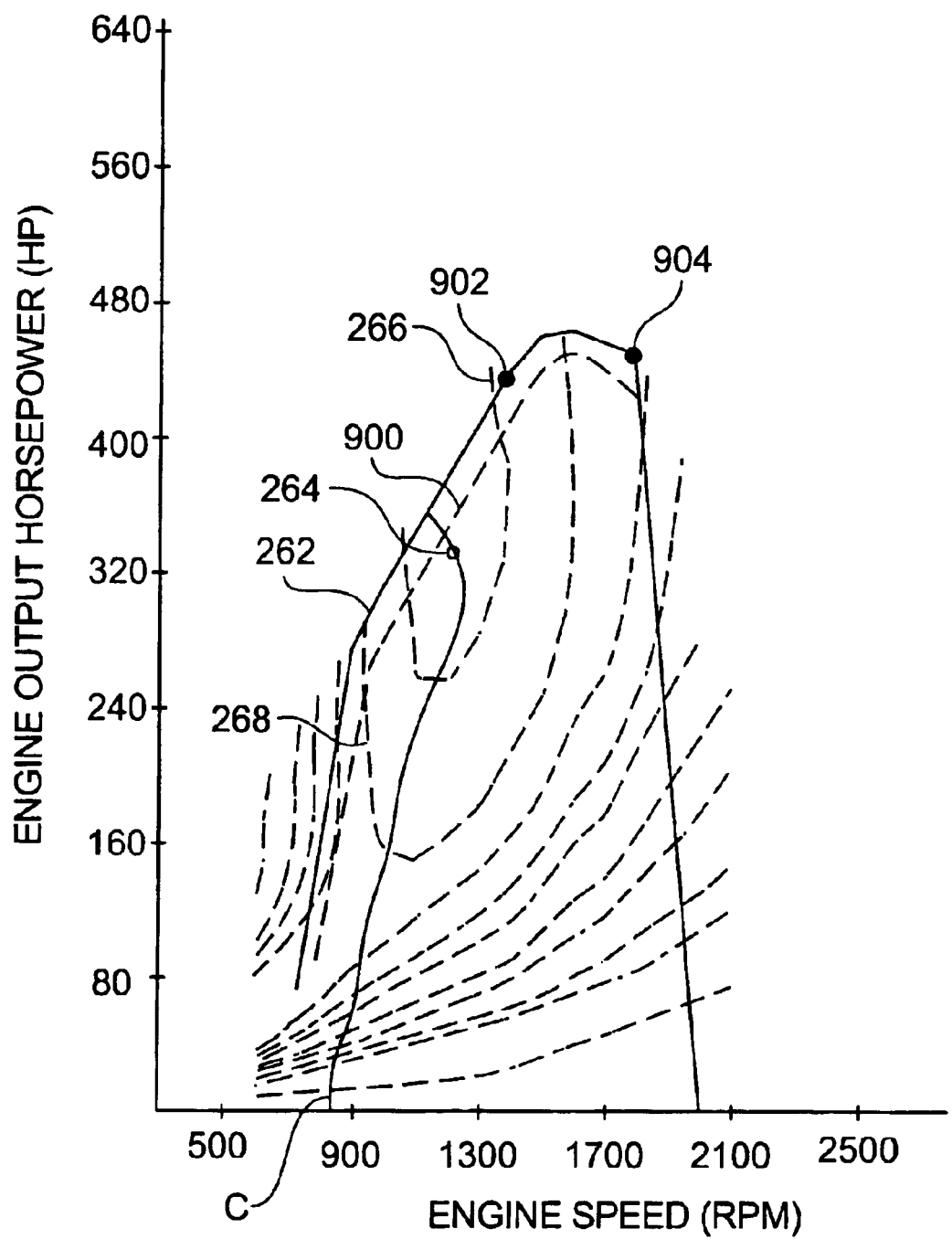
FIG. 37 is a plot of engine output power vs. engine speed illustrating one preferred technique for controlling transmission gear shifting in a performance operational mode using the system of FIG. 12, in accordance with still another aspect of the present invention.
Figure 38:
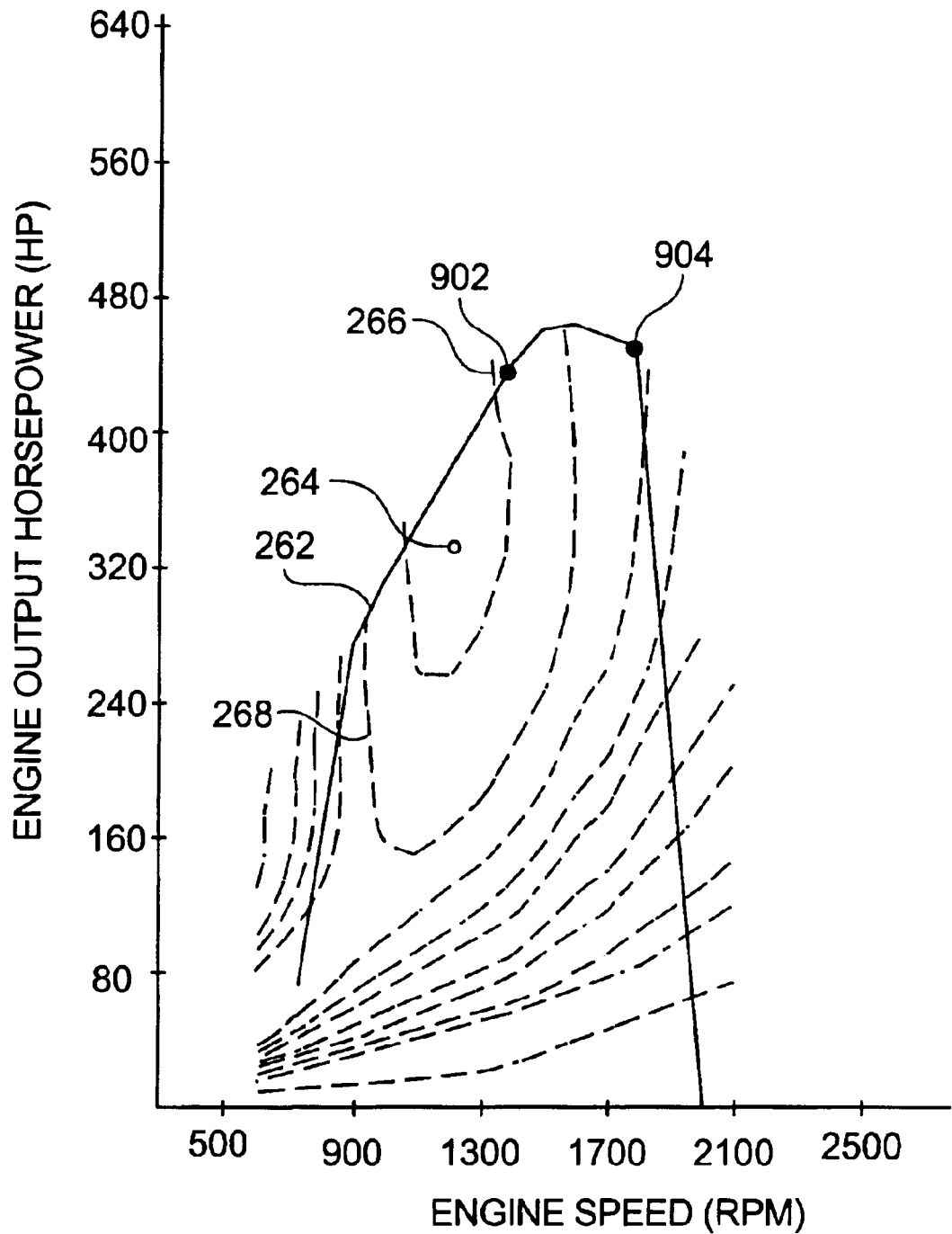
FIG. 38 is a plot of engine output power vs. engine speed illustrating an alternate technique for controlling transmission gear shifting in a performance operational mode using the system of FIG. 12, in accordance with the present invention.

Referring now to FIGS. 37–40B, still another technique for controlling an internal combustion engine, in accordance with the present invention, will be described in detail. FIGS. 37 and 38 show examples of a typical engine output horsepower curve 262 vs. engine speed identical to that of FIGS. 13 and 26. Superimposed onto the engine output horsepower vs. engine speed curves 262 are a number of Brake Specific Fuel Consumption (BSFC) contours (shown in phantom), wherein the areas between each such BSFC contours define so-called BSFC islands as described hereinabove with respect to FIG. 13. Generally, BSFC contour 264 corresponds to an engine output horsepower/engine speed point (or range) where the engine 206 operates most efficiently; i.e., wherein the best fuel economy is achieved. The BSFC island defined between BSFC contours 264 and 266 corresponds to an engine output horsepower/engine speed range in which the engine 206 operates with less efficiency than at BSFC contour 264 yet with better efficiency than at engine horsepower/engine speed conditions outside this island. Similarly, the BSFC island defined between BSFC contour 266 and 268 corresponds to an engine output horsepower/engine speed range in which the engine 206 operates with less efficiency than within the island defined between BSFC contours 264 and 266, and so on.

In accordance with the present invention, engine operation, once located on the horsepower curve 262, is controlled in a performance mode of operation wherein transmission shift points are defined relative to the horsepower curve 262 to provide for enhanced engine performance. Referring to FIG. 37, for example, one preferred embodiment of the present aspect of the invention is shown having a contour C extending between a low load condition and horsepower curve 262, wherein contour C is identical to that illustrated in, and described with respect to, FIG. 31. A dashed line 900 indicative of a predefined engine load level (e.g., 90% engine load, although other engine load percentage values are contemplated) is superimposed onto FIG. 37, and two engine operation points 902 and 904 are illustrated on the horsepower curve 262. Point 904 is located on horsepower curve 262 at an engine speed corresponding to rated or governed engine speed, as this term is known in the art, and point 902 is located on horsepower curve at an engine speed less than rated or governed speed. FIG. 38, by contrast, shows an identical horsepower curve with points 902 and 904 thereon, but wherein contour C and engine load line 900 are omitted.

The present invention contemplates at least two different techniques for controlling or encouraging transmission gear shifting in a performance mode of operation. A first technique is illustrated in FIG. 37 wherein transmission gear shifting is preferably controlled or encouraged in an economy operational mode about contour C according to any of the techniques described hereinabove with respect to FIGS. 31–36 as long as engine operation is maintained below the predefined engine load value 900 (or alternatively, predefined throttle percentage value). Above the predefined engine load value (or predefined throttle percentage value) 900, transmission gear shifting is controlled or encouraged in a performance mode on the horsepower curve 262 between points 902 and 904. A second alternate technique for controlling or encouraging transmission gear shifting in a performance mode of operation is illustrated in FIG. 38, wherein transmission gear shifting during engine operation below the horsepower curve 262 is preferably carried out according to default shifting routines or practices, and wherein transmission gear shifting is controlled in a performance mode between points 902 and 904 when engine operation is located on the horsepower curve 262.

By controlling shift points of one or more automatically selectable transmission gears, the embodiment of FIGS. 37–40B is applicable to systems wherein transmission 208 includes a number of automatically selectable gears. In such embodiments, transmission 208 typically includes a transmission control module 242 having an auxiliary control computer connected to control computer 202 via communications link 244 as described hereinabove with respect to FIG. 12. In such systems, algorithms for controlling transmission shift points may thus be executed either by control computer 202 or by the auxiliary control computer within transmission control module 242, wherein the two computers may share information via data link 242 in a known manner. In one embodiment, for example, the auxiliary control computer within transmission control module 242 may execute algorithms for controlling the shift points of the automatically selectable gears of transmission 208 in a performance mode of operation, which algorithms will be described in greater detail hereinafter with respect to FIGS. 39 and 40A–40B, wherein any data or other information required from or by control computer 202 may be obtained or broadcast by the auxiliary control computer within the transmission control module 242 via communications link 244. Alternatively, control computer 202 may execute such algorithms wherein data or other information required from or by the auxiliary control computer within transmission control module 242 may be obtained or broadcast by control computer 202 via communications link 244.

Figure 39:
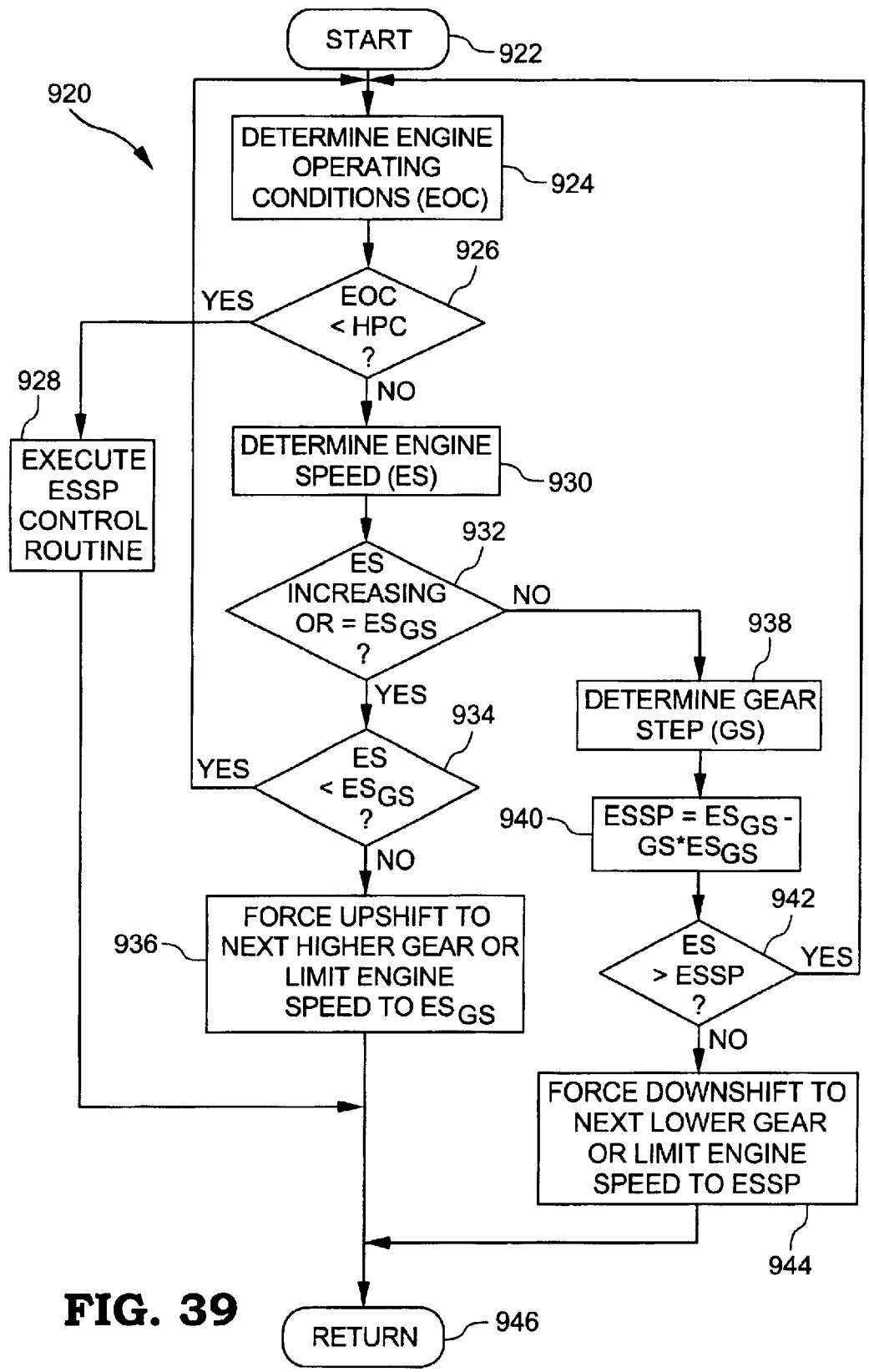
FIG. 39 is a flowchart illustrating one preferred embodiment of a software algorithm for controlling transmission gear shifting in a performance operational mode using the system of FIG. 12 and the concepts illustrated in FIGS. 37 and/or 38.

Referring now to FIG. 39, a flowchart showing one preferred embodiment of a software algorithm 920 for controlling shift points of an automatic transmission in a performance mode between points 902 and 904 and/or for limiting engine speed to thereby encourage manual shifting between points 902 and 904, in accordance with the present invention, is shown. While algorithm 920 will be described hereinafter as being executed by control computer 202, it is to be understood that algorithm 920 may alternatively be executed by the auxiliary control computer within transmission control module 242, if one exists, as described above. In any case, algorithm 920 begins at step 922 and at step 924, control computer 202 is operable to determine engine operating conditions (EOC) preferably as described hereinabove with respect to steps 306 of algorithm 300 (FIG. 14) and step 330 of algorithm 300' (FIG. 24). There after at step 926, control computer 202 is operable to compare EOC to the horsepower curve 262. If, at step 926, control computer 202 determines that EOC is less than the horsepower curve 262, indicating that engine operation is occurring within the boundary 262 of the horsepower map, algorithm execution advances to step 928 where an engine speed shift point (ESSP) routine is executed.

Figure 40A:
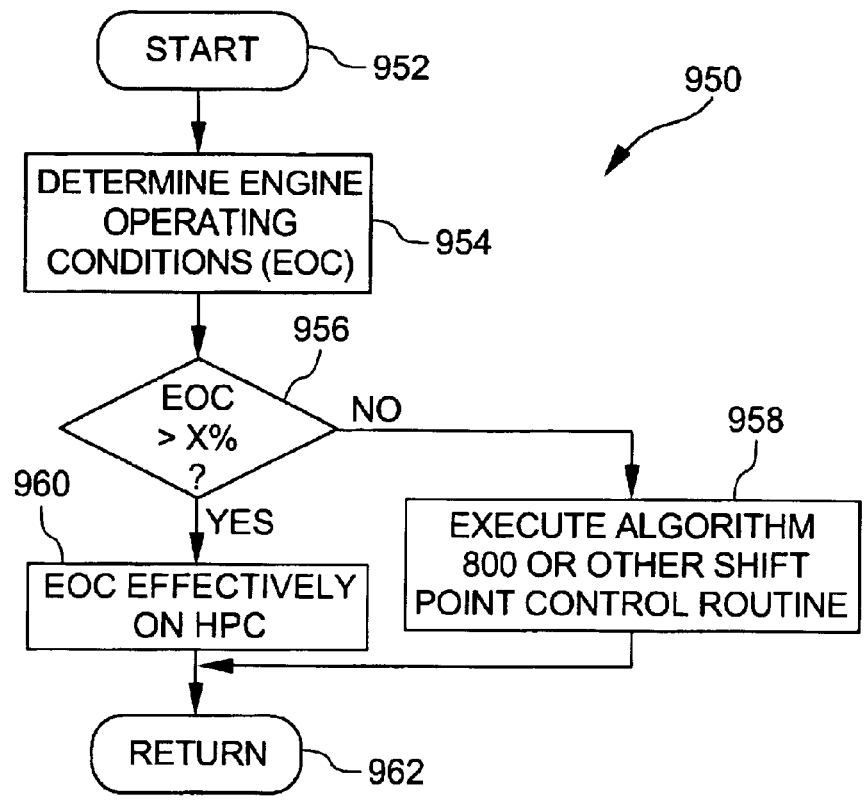
FIG. 40A is a flowchart illustrating one preferred embodiment of a software algorithm for executing step 928 of the algorithm of FIG. 39 using the concepts illustrated in FIG. 37.
Figure 40B:
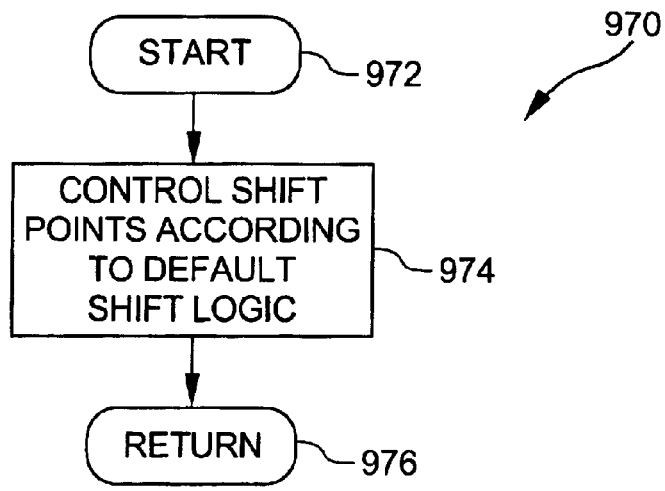
FIG. 40B is a flowchart illustrating an alternate embodiment of a software algorithm for executing step 928 of the algorithm of FIG. 39 using the concepts illustrated in FIG. 38.

Two preferred embodiments of such a routine are illustrated in FIGS. 40A and 40B, wherein such routines correspond to the embodiments illustrated in FIGS. 37 and 38 respectively when engine operation is below the horsepower curve 262. Referring to FIG. 40A, for example, a flowchart illustrating one preferred embodiment of a software algorithm 950 for executing step 928 of FIG. 39, in accordance with the present invention, is shown. Algorithm 950 corresponds to the graphical representation shown in FIG. 37, and FIG. 37 will therefore be used to illustrate and describe the operation of algorithm 950. In any case, algorithm 950 begins at step 952 and at step 954, control computer 202 is operable to again determine EOC as before and compare EOC to a predefined engine load or throttle percentage, X %; i.e., dashed line 900 in FIG. 37, at step 956. In one preferred embodiment, X=90, although the present invention contemplates that X may be any integer between 0 and 100. In any case, if control computer 202 determines at step 956 that EOC is less than or equal to X %, algorithm execution advances to step 958 where control computer 202 is operable to execute algorithm 800 (FIG. 32) or other routine for controlling and/or encouraging transmission shift points. Preferably, algorithm 800 is executed at step 958 so that transmission shift points are controlled and/or encouraged with respect to contour C shown in FIG. >37 and as described hereinabove. If, at step 956, control computer 202 determines that EOC is greater than X %, algorithm execution advances to step 960 where control computer 202 is operable to declare that EOC is effectively on the horsepower curve 262 so that step 926 of algorithm 920 will follow the "NO" branch the during the a subsequent execution thereof. In any case, algorithm execution advances from either of steps 958 and 960 to step 962 where algorithm 950 is returned to step 928 of algorithm 920.

Referring now to FIG. 40B, for example, a flowchart illustrating another embodiment of a software algorithm 970 for executing step 928 of FIG. 39, in accordance with the present invention, is shown. Algorithm 970 corresponds to the graphical representation shown in FIG. 38, and FIG. 38 will therefore be used to illustrate and describe the operation of algorithm 970. In any case, algorithm 970 begins at step 972 and at step 974, control computer 202 is operable to control shift points of at least any automatically selectable transmission gears according to default logic. This scenario is illustrated in FIG. 38 wherein no shift point control is shown below horsepower curve 262. Algorithm execution advances from step 974 to step 976 where algorithm 970 is returned to step 928 of algorithm 920.

Returning again to FIG. 39, if, at step 926, control computer 202 determines that EOC not less than the horsepower curve 262 and is therefore on the horsepower curve 262, algorithm execution advances to step 930 where control computer 202 is operable to determine engine speed (ES) preferably via engine speed sensor 218 (FIG. 12). Thereafter at step 932, control computer 202 is operable to determine whether ES is increasing or otherwise equal to rated or governed engine speed $ES_{GS}$. If so, algorithm execution advances to step 934 where control computer 202 is operable to determine whether ES is less than $ES_{GS}$. If so, then engine speed is increasing but is not yet equal to governed speed $ES_{GS}$, and algorithm execution consequently loops back to step 924. If, however, control computer 202 determines at step 934 that ES is not less than $ES_{GS}$, and is therefore at least equal to $ES_{GS}$, algorithm execution advances to step 936. In one embodiment wherein the next numerically higher transmission gear is an automatically selectable transmission gear, control computer is operable at step 936 to force an upshift to the next numerically higher transmission gear. In an alternate embodiment wherein the next numerically higher transmission gear is a manually selectable transmission gear, control computer 202 is operable at step 936 to limit engine speed to $ES_{GS}$; e.g., point 904 in either of FIGS. 37 and 38, to thereby encourage a manual upshift.

If, at step 932, control computer 202 determines that engine speed ES is neither increasing nor equal to governed speed $ES_{GS}$, then engine speed is assumed to be decreasing and algorithm execution advances to step 938 where control computer 202 is operable to determine a gear step (GS) of transmission 208 using any of the techniques described hereinabove or any other known techniques therefore. Thereafter at step 940, control computer is operable to determine an engine speed shift point (ESSP) as a function of governed speed $ES_{GS}$ and gear step GS. In one embodiment, as illustrated at step 940 in FIG. 39, control computer 202 is operable to compute ESSP according to the equation $ESSP=ES_{GS}-GS*ES_{GS}$, although the present invention contemplates otherwise computing ESSP as any desired fraction of $GS*ES_{GS}$. In any case, algorithm execution advances from step 940 to step 942 where control computer 942 is operable to compare engine speed ES with the computed engine speed shift point ESSP. If, at step 942, engine speed ES is greater than ESSP, algorithm execution loops back to step 922. If, however, control computer 202 determines at step 942 that engine speed ES is not less than ESSP and is therefore at least equal to ESSP, algorithm execution advances to step 944. In one embodiment wherein the next numerically lower transmission gear is an automatically selectable transmission gear, control computer is operable at step 944 to force a downshift to the next numerically lower transmission gear. In an alternate embodiment wherein the next numerically lower transmission gear is a manually selectable transmission gear, control computer 202 is operable at step 944 to limit engine speed to $ES_{GS}$; e.g., point 902 in either of FIGS. 37 and 38, to thereby encourage a manual downshift.

Algorithm execution advances from any of steps 928, 936 and 944 to step 946 where execution of algorithm 920 is returned to its calling routine. Alternatively, algorithm 920 may be modified such that steps 928, 936 and 944 loop back to step 924 for continual execution of algorithm 920. Those skilled in the art will recognize that in the case where transmission 208 is a CVT, steps 930–944 may be replaced by a single step that requires control computer 202 to control CVT in a known manner to maintain engine speed at peak power.

Figure 41:
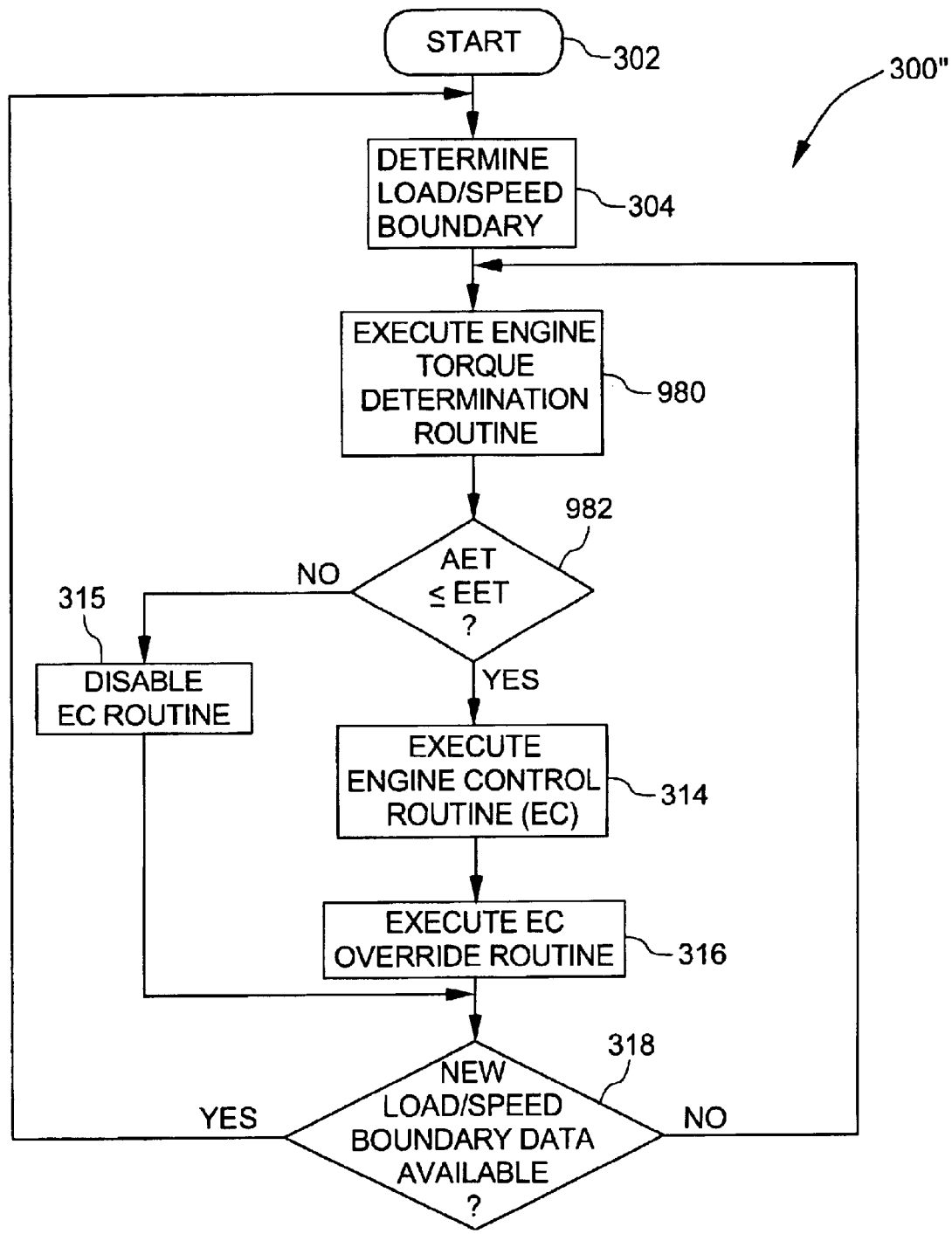
FIG. 41 is a flowchart illustrating another alternative embodiment of the software algorithm shown in FIG. 14 including an engine torque determination feature in accordance with another aspect of the present invention.

Referring now to FIG. 41, a flowchart is shown illustrating another algorithm 300" that may be used to replace the main engine control algorithm 300 of FIG. 14, wherein algorithm 300" includes an enhancement for determining when to execute the engine control (EC) routine of the present invention and when to disable the routine and therefore provide default engine operation. Algorithm 300" of FIG. 41 is similar in many respects to algorithm 300 of FIG. 14 and like numbers are therefore used to identify like steps. Thus, for example, steps 302, 304 and 314–318 of algorithm 300" are identical to such steps of algorithm 300, and a detailed description thereof will be omitted here for brevity. It should be noted, however, that in the execution of step 304, control computer 202 may be operable to determine load/speed boundary information according to any one or more of the techniques described hereinabove with respect to FIGS. 13, 15–16 and 26–29. Also, in the execution of step 314, control computer 202 may be operable to execute an engine control according to any one or more of the techniques described hereinabove with respect to FIGS. 17A–18B and 30. Additionally, in the execution of step 316, control computer 202 is preferably operable to execute an engine control override routine in accordance with the flowchart illustrated in FIGS. 19A–19C with the exception that steps 532–538 thereof are preferably omitted because algorithm 300" includes a strategy that accounts for road grade.

In any case, unlike algorithm 300, algorithm 300" of FIG. 41 advances from step 304 to step 980 where control computer 202 is operable to execute an engine torque determination routine. One preferred embodiment of such a routine will be described hereinafter with respect to FIGS. 42A and 42B. The engine torque determination routine of step 980 will preferably return two values; namely an estimated engine torque value (EET) and an actual engine torque value (AET). Thereafter at step 982, control computer 202 is operable to compare AET with EET. If AET is less than or equal to EET, algorithm execution advances to step 314 where control computer 202 is operable to execute any of the engine control (EC) routines described hereinabove. If, however, control computer 202 determines at step 982 that AET is greater than EET, algorithm execution advances to step 315 wherein control computer 202 is operable to disable the EC routine.

Figure 42A:
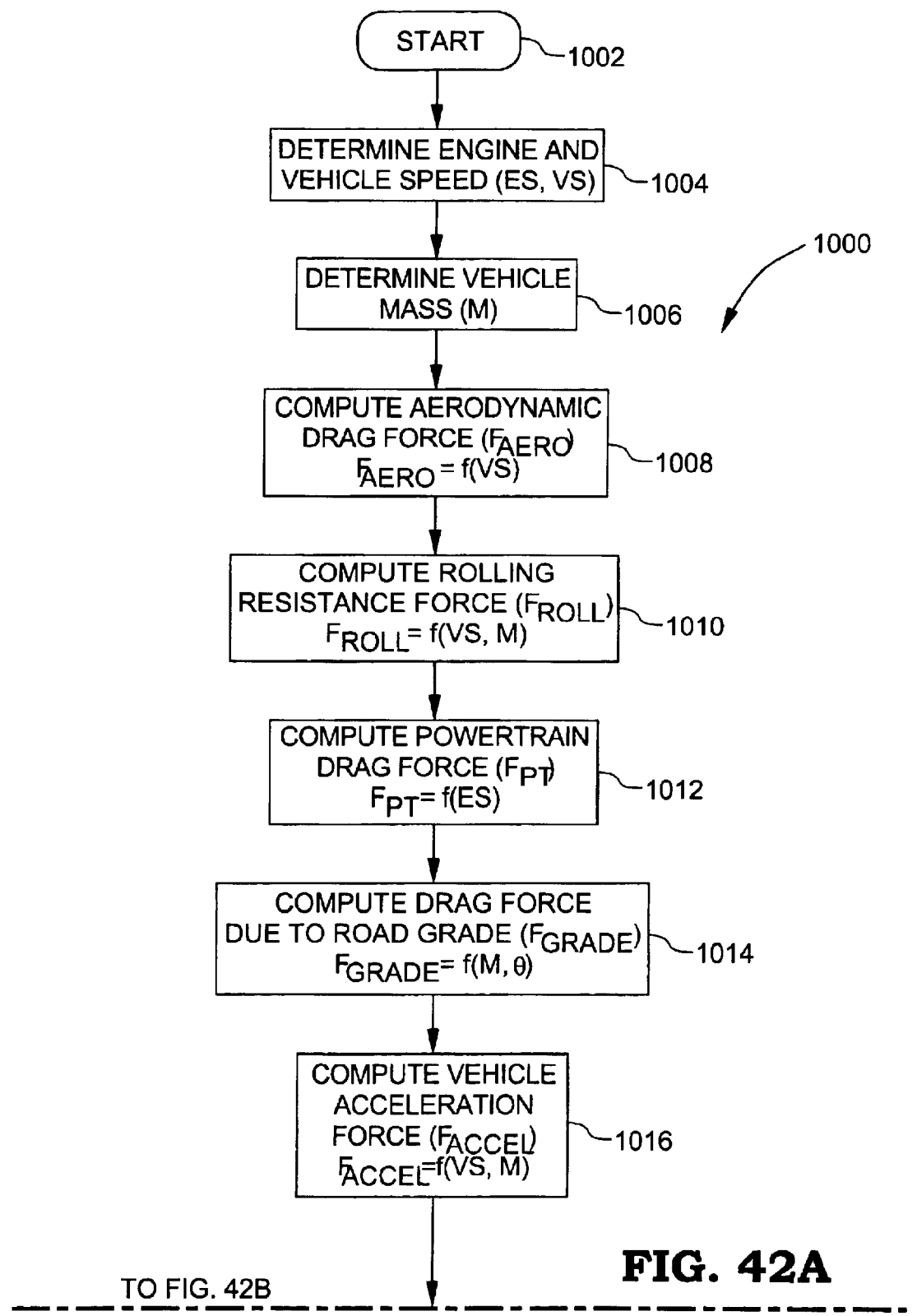
FIG. 42 is composed of FIGS. 42A and 42B and is a flowchart illustrating one preferred embodiment of an engine torque determination algorithm in accordance with step 986 of the algorithm of FIG. 41.
Figure 42B:
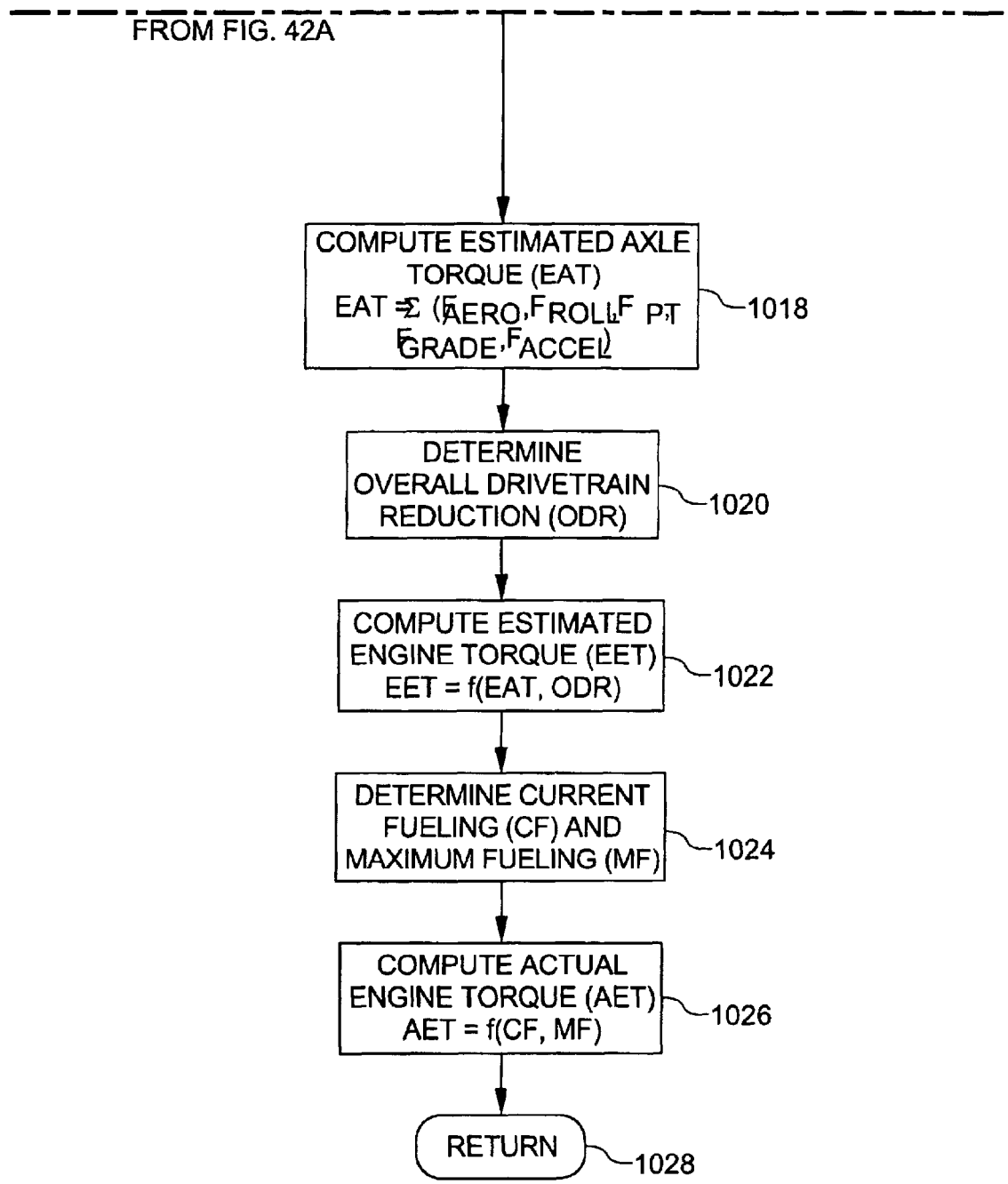

Referring now to FIGS. 42A and 42B, a flowchart is shown illustrating one preferred embodiment of a software algorithm 1000 for executing the engine torque determination routine of step 980 of algorithm 300", in accordance with the present invention. Preferably, algorithm 300" is executable by control computer 202 and will be described as such hereinafter, although the present invention contemplates that the auxiliary control computer within transmission control module 242 may alternatively execute algorithm 300" wherein such the auxiliary control computer is configured to share data and other information with control compute 202 via communications link 244 as described hereinabove. In any case, algorithm 1000 begins at step 1002 and at step 1004, control computer 202 is operable to determine engine speed ES, preferably via engine speed sensor 218, and vehicle speed, preferably via sensor 230, as shown in FIG. 12. Thereafter at step 1006, control computer 202 is operable to determine vehicle mass (M). In one embodiment, control computer 202 is operable to execute step 1006 by recalling a vehicle mass value from memory. In this embodiment, a default vehicle mass is preferably stored in memory 204, wherein this value may be adjusted or "trimmed" via service/recalibration tool 258. In an alternate embodiment, control computer 202 may include a vehicle mass estimation algorithm from which a vehicle mass estimate may be obtained. In either case, algorithm execution advances from step 1006 to step 1008.

At step 1008, control computer 202 is operable to compute an aerodynamic drag force ($F_{AERO}$), preferably as a function of vehicle speed VS. In one embodiment, the aerodynamic drag force is computed at step 1008 according to the equation $F_{AERO}=0.5*p*A*K_{AERO}*VS^2$, wherein "p" is air density, "A" is the frontal area of the vehicle and $K_{AERO}$ is an aerodynamic drag coefficient. Preferably, "P", "A" and $K_{AERO}$ are stored as constants in memory 204, wherein any one or more of these values may be adjusted via service/recalibration tool 258, and wherein example values for these constants are p=1.202 kg/m$^3$, A=10.968 m$^2$ and $K_{AERO}$=0.646. It is to be understood, however, that the aerodynamic drag force $F_{AERO}$ may alternatively be computed at step 1008 according to one or more other known equations therefore, and that any such alternative computational strategies are intended to fall within the scope of the present invention.

Thereafter at step 1010, control computer 202 is operable to compute a rolling resistance force ($F_{ROLL}$), preferably as a function of vehicle speed VS and vehicle mass M. In one embodiment, the rolling resistance force is computed at step 1010 according to the equation $F_{ROLL}=(K_{STATIC}+K_{DYNAMIC}*VS)*M$), wherein "$K_{STATIC}$" is a static rolling resistance coefficient and "$K_{DYNAMIC}$" is a dynamic rolling resistance coefficient. Preferably, "$K_{STATIC}$" and "$K_{DYNAMIC}$" are stored as constants in memory 204, wherein either of these values may be adjusted via service/recalibration tool 258, and wherein example values for the constants are $K_{STATIC}$=0.042 N/kg, $K_{DYNAMIC}$=0.000899 (N*sec)/(meter*kg) and M=80000 lbs. It is to be understood, however, that the rolling resistance force $F_{ROLL}$ may alternatively be computed at step 1010 according to one or more other known equations therefore, and that any such alternative computational strategies are intended to fall within the scope of the present invention.

Thereafter at step 1012, control computer 202 is operable to compute a powertrain drag force ($F_{PT}$), preferably as a function of at least engine speed ES. In one embodiment, the powertrain drag force is computed at step 1012 by taking into account resistive forces due to engine accessory use as well as powertrain mechanical efficiencies including friction (i.e., bearing, seal face, etc.), gear mesh, spin, churning and windage. Those skilled in the art will recognize that the powertrain drag force term may be calculated according to a number of known techniques and may include any number of desired terms corresponding to any number of engine accessories and/or power train mechanical components. For example, the engine alternator is known to require constant power independent of engine speed, whereas engine cooling fan loss is inversely proportional to $ES^3$, air conditioning loss, if an air conditioning unit is activated, is inversely proportional to $ES^2$, power steering loss is inversely proportional to $ES^2$, and so on. Preferably, all such parameters are stored as constants in memory 204, wherein any one or more of these values may be adjusted via service/recalibration tool 258. It is to be understood, however, that the powertrain drag force $F_{PT}$ may be computed at step 1012 according to one or more known equations therefore, and that any such computational strategies are intended to fall within the scope of the present invention.

Thereafter at step 1014, control computer 202 is operable to compute a drag force due to road grade ($F_{GRADE}$), preferably as a function of vehicle mass M and angle θ. In one embodiment, the road grade drag force is computed at step 1014 according to the equation $F_{GRADE}=M*g*sin(θ)$, wherein "g" is the gravitational constant 9.8 m/s$^2$ and θ is the angle given by the inverse tangent of the assumed grade. In one embodiment, a grade of 1.5% is used and M=80000 lbs, although either of these values may be adjusted via service/recalibration tool 258. It is to be understood, however, that the road grade drag force $F_{GRADE}$ may alternatively be computed at step 1014 according to one or more other known equations therefore, and that any such alternative computational strategies are intended to fall within the scope of the present invention.

Thereafter at step 1016, control computer 202 is operable to compute a vehicle resistance to acceleration force ($F_{ACCEL}$), preferably as a function of vehicle speed VS and vehicle mass M. In one embodiment, the vehicle resistance to acceleration force is computed at step 1016 according to the equation $F_{ACCEL}=Mi*VS$, wherein Mi is the mass at the tires due to inertia, and wherein $Mi=[(M*R^2)+(IE*GR^2*RAR^2)]/R^2$. In this equation, "M" is vehicle mass, "R" is the radius of the tires, "Ie" is engine inertia, "GR" is transmission gear ratio and RAR is rear axle ratio. Preferably, "R", "RAR" and "Ie" are stored as constants in memory 204, wherein either of these values may be adjusted via service/recalibration tool 258, and wherein example values for the constants are R=0.496 at 514 revs/mile, Ie=2.85 kg*m² and M=80000 lbs. Gear ratio GR is preferably computed as a ratio of engine speed ES and vehicle speed VS as is known in the art, although the present invention contemplates determining gear ratio GR in accordance with any other one or more known techniques. It is to be understood, however, that the vehicle resistance to acceleration force $F_{ACCEL}$ may alternatively be computed at step 1016 according to one or more other known equations therefore, and that any such alternative computational strategies are intended to fall within the scope of the present invention.

Referring now to FIG. 42B, algorithm execution advances from step 1016 to step 1018 where control computer 202 is operable to compute an estimated axle torque (EAT), corresponding to a resistance torque at the vehicle axle, as a summation of all of the foregoing resistance forces $F_{AERO}$, $F_{ROLL}$, $F_{PT}$, $F_{GRADE}$ and $F_{ACCEL}$. Thereafter at step 1020, control computer 202 is operable to determine an overall drivetrain reduction term (ODR) corresponding to torque reduction through the entire drivetrain. In one embodiment wherein the vehicle drivetrain includes a single transmission coupled at one end to an internal combustion engine and at an opposite end to a vehicle axle (see FIG. 12), the overall drivetrain reduction (ODR) is preferably computed according to the equation ODR=GR*RAR, wherein "GR" is the transmission gear ratio and "RAR" is the rear axle ratio. Those skilled in the art will recognize that the vehicle drivetrain may alternatively include other drivetrain components including one or more transmissions, etc., and that the equation defining the overall drivetrain reduction term (ODR) will change as a result. It is intended that any such alternative drivetrain structure will fall within the scope of the present invention.

In any case, algorithm execution advances from step 1020 to step 1022 where control computer 202 is operable to compute an estimated engine torque (EET), corresponding to a total resistance torque seen by the engine 206 (FIG. 12), as a function of the estimated axle torque EAT and overall drivetrain reduction value ODR. In one embodiment, EET=EAT/ODR, although the present invention contemplates computing EET in accordance with other known techniques therefore. Algorithm execution advances from step 1022 to step 1024 where control computer 202 is operable to determine a current fueling value (CF) and a maximum fueling value (MF) via known techniques. Thereafter at step 1026, control computer 202 is operable to compute an actual engine output torque AET as a function of CF and MF using well known equations. Thereafter at step 1028, algorithm 1000 is returned to step 980 of algorithm 300".

In accordance with the strategy illustrated in FIGS. 41–42B, control computer 202 is operable to compute a total resistance force at the engine (EET) as well as an actual engine output torque (AET), and to compare these two values to determine whether to impose the engine control routine of the present invention. If AET is less than or equal to EET, engine 206 is not working sufficiently hard and the engine control routine of the present invention is therefore imposed. If, however, EET is greater than AET, this indicates that the vehicle is working and traversing a larger grade than set in the foregoing computations (e.g., 1.5%). In this case, a legitimate need for engine output power exists, and control computer 202 is accordingly operable to disable the engine control routine of the present invention and provide for default engine operation.

While the invention has been illustrated and described in detail in the foregoing drawings and description, the same is to be considered as illustrative and not restrictive in character, it being understood that only the preferred embodiments have been shown and described and that all changes and modifications that come within the spirit of the invention are desired to be protected. For example, in the embodiments illustrated in FIGS. 1–11, control computer 20' has been illustrated and described as controlling engine speed and engine (or vehicle) acceleration via a fuel limit value FL, although the present invention contemplates that control computer 20' could alternatively be configured to control engine speed and engine (or vehicle) acceleration via an engine speed limit value using some of the concepts described with respect to FIG. 7. Likewise, while control computer 20" has been illustrated and described as controlling engine speed and engine (or vehicle) acceleration via an engine speed limit value ESL, control computer 20" could alternatively be configured to control engine speed and engine (or vehicle) acceleration via a fuel limit value FL using some of the concepts described with respect to FIG. 3. In either case, the control computer of FIGS. 1–11 is ultimately operable to control engine operation via control of the commanded fueling signal. Those skilled in the art will recognize that any of a variety of known techniques may be used to effectuate the engine control concepts of the present invention, the importance of any such techniques lying not in the specifics of the techniques themselves but rather in their ability to carry out the engine control concepts of the present invention. As another example, in embodiments wherein transmission 208 includes a transmission control module 242 including an auxiliary computer operable to electronically control the operation of transmission 208, and wherein control computer 202 is operable to encourage or maintain engine operation outside a region U of undesirable engine operation, the present invention contemplates that control computer 202 may in such cases be configured to broadcast one or more messages to the auxiliary computer via data link 244 indicative of the limited engine operation. The auxiliary computer is then preferably responsive to such a message or messages to base automatic transmission shift points thereon. As one specific example of this strategy, control computer 202 may, in accordance with one embodiment of the engine control routine of the present invention (e.g., step 316 of algorithm 300, step 330 of algorithm 300' or step 316 of algorithm 300"), limit engine speed to engine speeds outside of the region U of undesirable engine operation. In such cases, control computer 202 is preferably operable to broadcast a message to the transmission control module 242 via datalink 244 wherein the message includes information that engine speed is currently being limited and that engine speed will not be allowed to exceed a specified engine speed based on current engine operating conditions (e.g., current engine load, % throttle, etc.). The auxiliary computer within transmission control module 242 is preferably operable in such cases to modify its current transmission shift point strategy and force an upshift to a numerically higher gear when engine speed reaches its established limit to thereby provide for the availability of additional engine speed at the higher transmission gear. Those skilled in the art will recognize other transmission shift point strategy modification scenarios, and any such scenarios are intended to fall within the scope of the present invention. As yet another example, the present invention contemplates modifying the estimated and actual engine torque determination algorithm of FIGS. 42A–42B to include more, less and/or different terms as would occur to a skilled artisan. As a specific example, it may be desirable in some applications to modify the estimated engine torque determination such that the drag force due to road grade utilizes values other than 1.5% for an imposed road grade angle. Additionally or alternatively, it may be desirable to include in the estimated torque determination an engine acceleration component. Those skilled in the art will recognize that either of the estimated engine torque and actual engine torque calculations illustrated in FIGS. 42A–42B may accordingly include more, less and/or different variables, wherein such variables are generally known in the art as factors that may contribute to the respective torque calculations, and that such modifications are intended to fall within the scope of the present invention.

What is claimed is:

1. A system for controlling a vehicle drivetrain, comprising:

a memory having stored therein an engine output characteristics map of an internal combustion engine and a contour associated with said map extending from a low engine load value to a high engine load value thereof;

means for determining at least one engine operating parameter; and a control computer responsive to said at least one engine operating parameter to control shift points of a transmission coupled to said engine as said at least one engine operating parameter approaches said contour.

2. The system of claim 1 wherein said contour corresponds to a substantially fuel efficient path extending between said low engine load value and said high engine load value.

3. The system of claim 2 wherein said low engine load value corresponds to a substantially zero engine load value and said high engine load value corresponds to a boundary of said engine output characteristics map.

4. The system of claim 1 wherein said control computer is operable to control upshift points of said transmission as said at least one engine operating parameter approaches said contour from a first side thereof and to control downshift points of said transmission as said at least one engine operating parameter approaches said contour from a second opposite side of said contour.

5. The system of claim 4 wherein said means for determining at least one engine operating parameter includes means for determining a rotational speed of said engine and producing an engine speed signal corresponding thereto;

and wherein said control computer is operable to control upshift points of said transmission if said engine speed signal indicates that current engine speed is approaching said contour with increasing engine speed, and wherein said control computer is operable to control downshift points of said transmission if said engine speed signal indicates that current engine speed is approaching said contour with decreasing engine speed.

6. The system of claim 5 wherein said means for determining at least one engine operating parameter further includes means for determining an engine load value;

and wherein said control computer is operable to control upshift points of said transmission if said engine speed signal and said engine load value indicate that current engine operating conditions are approaching said contour with increasing engine speed, and wherein said control computer is operable to control downshift points of said transmission if said engine speed signal and said engine load value indicate that current engine operating conditions are approaching said contour with decreasing engine speed.

7. The system of claim 5 wherein said transmission includes a number of automatically selectable gears;

and wherein said control computer is operable to control upshifting and downshifting between said automatically selectable gears by forcing upshifts and downshifts based on said engine speed signal to thereby maintain engine speed within predefined engine speed ranges of said contour.

8. The system of claim 7 wherein said control computer is an engine control computer operable to manage and control the overall operation of said engine.

9. The system of claim 7 wherein said control computer is a transmission control computer operable to manage and control the overall operation of said transmission.

10. The system of claim 5 wherein said transmission includes a number of manually selectable gears;

and wherein said control computer is operable to control upshifting and downshifting between said manually selectable gears by limiting engine speed about said contour to thereby encourage upshifting and downshifting with engine speed maintained within predefined engine speed ranges of said contour.

11. A method of controlling a vehicle drivetrain, comprising the steps of:

providing an engine output characteristics map for an internal combustion engine;

establishing a contour in relation to said map extending from a low engine load point to a high engine load point thereof;

determining an engine operating parameter;

controlling upshift points of a transmission coupled to said engine if said engine operating parameter approaches said contour from a first side thereof; and controlling downshift points of said transmission if said engine operating parameter approaches said contour from a second opposite side thereof.

12. The method of claim 11 wherein said establishing step includes establishing said contour in accordance with a fuel efficient criterion to thereby establish a fuel efficient path between said low engine load point and said high engine load point.

13. The method of claim 11 wherein the step of controlling upshift points includes the steps of:

monitoring engine speed of said engine;

determining a first engine speed value when said engine operating parameter reaches said contour;

determining a gear step of a next higher gear of said transmission;

determining an engine speed shift point to said next higher gear as a function of said first engine speed and said gear step; and when said engine speed reaches said engine speed shift point performing one of forcing an upshift to said next higher gear and limiting engine speed of said engine to said engine speed shift point.

14. The method of claim 11 wherein the step of controlling downshift points includes the steps of:

monitoring engine speed of said engine;

determining a first engine speed value when said engine operating parameter reaches said contour;

determining a gear step of a next lower gear of said transmission;

determining an engine speed shift point to said next lower gear as a function of said first engine speed and said gear step; and when said engine speed reaches said engine speed shift point performing one of forcing a downshift to said next lower gear and limiting engine speed of said engine to said engine speed shift point.

15. A system for controlling a vehicle drivetrain, comprising:

a memory having stored therein an engine output characteristics map of an internal combustion engine and a contour associated with said map extending from a low engine load value to a high engine load value thereof;

means for determining at least one engine operating parameter; and a control computer responsive to said at least one engine operating parameter to control an effective gear ratio of a continuous variable transmission (CVT) coupled to said engine to thereby maintain said at least one engine operating parameter within a predefined engine speed deviation from said contour.

16. The system of claim 15 wherein said contour corresponds to a substantially fuel efficient path extending between said low engine load value and said high engine load value.

17. The system of claim 16 wherein said low engine load value corresponds to a substantially zero engine load value and said high engine load value corresponds to a boundary of said engine output characteristics map.

18. The system of claim 15 wherein said engine speed deviation corresponds to zero engine speed deviation such that said control computer is operable to control an effective gear ratio of said CVT to thereby maintain said at least one engine operating parameter on said contour.

19. The system of claim 15 wherein said control computer is an engine control computer operable to manage and control the overall operation of said engine.

20. The system of claim 15 wherein said control computer is a transmission control computer operable to manage and control the overall operation of said CVT.

21. A method of controlling a vehicle drivetrain, comprising the steps of:

providing an engine output characteristics map for an internal combustion engine;

establishing a contour in relation to said map extending from a low engine load point to a high engine load point thereof;

determining an engine operating parameter; and controlling an effective gear ratio of a continuous variable transmission (CVT) coupled to said engine to thereby maintain said engine operating parameter within a predefined engine speed deviation from said contour.

22. The method of claim 21 wherein said establishing step includes establishing said contour in accordance with a fuel efficient criterion to thereby establish a fuel efficient path between said low engine load point and said high engine load point.

23. The method of claim 21 wherein said predefined engine speed deviation is zero such that said controlling step comprises controlling said effective gear ratio of said CVT to thereby maintain said engine operating parameter on said contour.

24. A method of controlling a vehicle drivetrain, comprising the steps of:

providing an engine output characteristics map for an internal combustion engine;

determining at least one engine operating parameter in relation to said map;

monitoring engine speed of said engine;

if said engine speed is increasing along a boundary of said map, performing one of the following steps when said engine speed reaches a governed speed value:

forcing an upshift to a higher gear of a transmission coupled to said engine; and limiting engine speed of said engine to said governed engine speed value.

25. A method of controlling a vehicle drivetrain, comprising the steps of:

providing an engine output characteristics map for an internal combustion engine;

determining at least one engine operating parameter in relation to said map;

monitoring engine speed of said engine;

if said engine speed is decreasing along a boundary of said map, determining an engine speed shift point as a function of a gear step between a presently engaged gear and a next lower gear of a transmission coupled to said engine and performing one of the following steps when said engine speed reaches said engine speed shift point:

forcing a downshift to said next lower gear of said transmission; and limiting engine speed of said engine to said engine speed shift point.

* * * * *